(12) United States Patent
Xie et al.

(10) Patent No.: US 9,361,094 B1
(45) Date of Patent: *Jun. 7, 2016

(54) MINING APPLICATION REPOSITORIES

(71) Applicant: Accenture Global Services Limited, Dublin (IE)

(72) Inventors: Qing Xie, Chicago, IL (US); Mark Grechanik, Chicago, IL (US); Chen Fu, Lisle, IL (US)

(73) Assignee: Accenture Global Services Limited, Dublin (IE)

( * ) Notice: Subject to any disclaimer, the term of this patent is extended or adjusted under 35 U.S.C. 154(b) by 13 days.

This patent is subject to a terminal disclaimer.

(21) Appl. No.: 14/148,914

(22) Filed: Jan. 7, 2014

Related U.S. Application Data

(63) Continuation of application No. 13/194,101, filed on Jul. 29, 2011, now Pat. No. 8,635,204.

(60) Provisional application No. 61/369,592, filed on Jul. 30, 2010.

(51) Int. Cl.
 *G06F 17/30* (2006.01)
 *G06F 9/44* (2006.01)

(52) U.S. Cl.
 CPC .................................. *G06F 8/71* (2013.01)

(58) Field of Classification Search
 CPC combination set(s) only.
 See application file for complete search history.

(56) References Cited

U.S. PATENT DOCUMENTS

| | | | |
|---|---|---|---|
| 7,971,180 B2 | 6/2011 | Kreamer | |
| 8,001,527 B1 * | 8/2011 | Qureshi | G06N 5/048 717/100 |
| 2006/0277200 A1 | 12/2006 | Weiss | |
| 2008/0126349 A1 | 5/2008 | Venkatraman | |
| 2009/0178031 A1 * | 7/2009 | Zhao | G06F 8/427 717/143 |
| 2010/0106705 A1 * | 4/2010 | Rush | G06F 8/36 707/709 |
| 2010/0332475 A1 * | 12/2010 | Birdwell | G06F 17/30333 707/737 |

OTHER PUBLICATIONS

Basili, et al. "Software Errors and Complexity: An Empirical Investigation", Communication of the ACM, vol. 27, No. 1, Jan. 1984. pp. 42-52.
Baxter, et al. "Understanding the Shape of Java Software", OOPSLA '06 Not., 41(10), Oct. 22-26, 2006, pp. 397-412.
Chen, et al. "CVSSearch: Searching Through Source Code using CVS Comments", In IEEE International Conference Software Maintenance (ICSM 2001), Nov. 7-9, 2001, 13 pages.
Chidamber, et al. "A Metrics Suite for Object Oriented Design", IEEE Trans. Softw. Eng., 20(6), Jun. 1994, pp. 476-493.

(Continued)

*Primary Examiner* — Shyue Jiunn Hwa
(74) *Attorney, Agent, or Firm* — Fish & Richardson P.C.

(57) ABSTRACT

A system includes a database that stores attributes of applications that are descriptive of source code included in the applications and identification data that identifies the applications to which the attributes apply. The attributes are mined through a programmatic analysis of one or more repositories in which the applications are stored, and the programmatic analysis includes programmatic analysis of the source code included in the applications to derive the attributes. The system also includes a computer system configured to handle queries against the attributes of the applications stored in the database and provide output based on the handling of queries against the attributes of the applications stored in the database.

20 Claims, 64 Drawing Sheets

(56) References Cited

OTHER PUBLICATIONS

Cubranic, et al. "HIPIKAT:A Project Memory for Software Development", IEEE Trans. Software Engineering, vol. 31, No. 6, Jun. 2005, pp. 446-465.

Draheim, et al. "Process-Centric Analytical Processing of Version Control Data", In Proceedings of the 6th IEEE International Workshop on Principles of Software Evolution, Helsinki, Finland, Sep. 2003, 6 pages.

Gall, et al. "CVS Release History Data for Detecting Logical Couplings", In Proceedings of the 6th IEEE International Workshop on Principles of Software Evolution, Helsinki, Finland, Sep. 2003, 11 pages.

Gall, et al. "Detection of logical coupling based on product release history", In Proceedings of the 14th International Conference on Software Maintenance, Bethesda, Maryland Nov. 1998, 17 pages.

Grechanik, et al. "A search Engine for Finding Highly Relevant Applications" ICSE '10, May 2-8, 2010, 10 pages.

Grechanik, "An Empirical Investigation into a Large-Scale JAVA Open Source Code Repository", Proceedings of the 2010 ACM-IEEE International Symposium on Empirical Software Engineering and Measurement (ESEM '10), Sep. 16-17, 2010, 10 pages.

Hassan, "Mining Software Repositories to Assist Developers and Support Managers", University of Waterloo, 2004, 300 pages.

Henninger, "Supporting the Construction and Evolution of Component Repositories", Proceedings of the 18th international conference on Software engineering, 1996, pp. 279-288.

Hill, et al. "Automatic Method Completion", ASE, 2004, 8 pages.

Holmes, et al. "Strathcona Example Recommendation Tool", ESEC/SIGSOFT FSE, 2005, pp. 237-240.

Holmes, et al. "Using Structural Context to Recommend Source Code Examples", ICSE, 2005, pp. 117-125.

Howison, et al. "Flossmore:A Collaborative Repository for Floss Research Data and Analyses", International Journal of Information Technology and Web Engineering, 1(3), Jul. 2006, pp. 17-26.

Howison, et al. "The perils and pitfalls of mining Sourceforge", In MSR, 2004, 5 pages.

Jiau, et al. "Assessing the Efficacy of User and Developer Activities in Facilitating the Development of OSS Projects", J. Softw. Maint. Evol., 21(5), 2009, pp. 287-314.

Kiefer, et al. "Mining Software Repositories with iSPAROL and a Software Evolution Ontology", In MSR '07, 2007, 8 pages.

Kim, et al. "Properties of signature change patterns", In ICSM '06: Proceedings of the 22nd IEEE International Conference on Software Maintenance, 2006, 10 pages.

Koch, "Exploring the effects of sourceforge.net coordination and communication tools on the efficiency of open source projects using data envelopment analysis", Empirical Softw. Eng., 14(4), 2009, pp. 397-417.

Lehman, et al. "Metrics and laws of software evolution the nineties view", In Proceedings of the 4th International Software Metrics Symposium, Albuquerque, NM, 1997, 13 pages.

Leszak, et al. "Classification and evaluation of defects in a project retrospective", The Journal of Systems and Software, vol. 61, No. 3, New York, NY, USA 2002, pp. 173-187.

Mandelin, et al. "Jungloid mining: helping to navigate the API jungle", PLDI, 2005, pp. 48-61.

Mockus, "Amassing and Indexing a Large Sample of Version Control Systems: Towards the Census of Public Source Code History", In MSR '09, 2009, pp. 11-20.

Mockus, et al. "Two Case Studies of Open Source Software Development: Apache and Mozilla", ACM Trans. Softw. Eng. Methodol., 11(3), Jul. 2002, pp. 309-346.

Mockus, et al. Understanding and Predicting Effort in Software Projects, ICSE '03: Proceedings of the 25th International Conference on Software Engineering, 2003. 11 pages.

Ossher, et al. "SourcererDB: An Aggregated Repository of Statically Analyzed and Cross-Linked Open Source Java Projects", MSR Journal, 2009. pp. 183-186.

Perry, "Software Evolution and Light Semantics (extended abstract)" ICSE '99: Proceedings of the 21st international conference on Software engineering, New York, NY, USA 1999, pp. 587-590.

Perry, et al. "Software Faults in Evolving a Large, Real-Time System: a Case Study" In Proceedings of the 4th European Software Engineering Conference, Garmisch, Germany, Sep. 1993, 22 pages.

Reiss, "Semantics-Based Code Search", ICSE, 2009. pp. 243-253.

Robillard, "Automatic Generation of Suggestions for Program Investigation", ESEC/SIGSOFT FSE, 2005, 10 pages.

Sahavechaphan, et al. "XSnippet: Mining for Sample Code", OOPSLA, 2006, pp. 413-430.

Shang, et al. "Mapreduce as a General Framework to Support Research in Mining Software Repositories (MSR)", in MSR '09, Washington, DC, USA, 2009, pp. 21-30.

Stylos, et al. "MICA:A Web-Search Tool for Finding API Components and Examples", IEEE Symposium on Visual Languages and Human-Centric Computing, 2006, 8 pages.

Succi, et al. "An Empirical Exploration of the Distributions of the Chidamber and Kemerer Object-Oriented Metrics Suite", Empirical Softw. Eng., 10(1), 2005, pp. 81-103.

Ye, et al. "Supporting Reuse by Delivering Task-Relevant and Personalized Information", ICSE, 2002, pp. 513-523.

Zimmermann, et al. "Preprocessing CVS Data for Fine-Grained Analysis", In Proceedings of the 1st International Workshop on Mining Software Repositories, Edinburgh, UK, May 2004, 5 pages.

U.S. Final Office Action for U.S. Appl. No. 13/194,101 dated Jan. 9, 2013, 21 pages.

Graves, et al. "Predicting Fault Incidence using Software Change History," IEEE Transactions on Software Engineering, Jul. 2000, 26(7):653-661.

U.S. Notice of Allowance for U.S. Appl. No. 13/194,101, dated Sep. 16, 2013, 13 pages.

U.S. Notice of Allowance for U.S. Appl. No. 13/194,101, dated Jun. 27, 2013, 10 pages.

\* cited by examiner

600

| Id | Name | Size |
|---|---|---|
| 1 | Boolean | 1 |
| 2 | Char | 16 |
| 3 | Byte | 8 |
| 4 | Short | 16 |
| 5 | Int | 32 |
| 6 | Long | 64 |
| 7 | Float | 32 |
| 8 | Double | 64 |
| 9 | Void | NULL |

| class | number_methods |
|---|---|
| x0.oasisNamesTcOpendocumentXmlnsOffice1.impl.Styles... | 184 |
| x0.oasisNamesTcOpendocumentXmlnsOffice1.impl.Annota... | 166 |
| x0.oasisNamesTcOpendocumentXmlnsChart1.impl.PlotAre... | 146 |
| x0.oasisNamesTcOpendocumentXmlnsPresentation1.impl.... | 166 |
| x0.oasisNamesTcOpendocumentXmlnsDatastyle1.impl.Tim... | 122 |
| x0.oasisNamesTcOpendocumentXmlnsDatastyle1.impl.Dat... | 178 |
| x0.oasisNamesTcOpendocumentXmlnsDr3D1.impl.Scene... | 171 |
| org.hsqldb.jdbc.jdbcDatabaseMetaData | 171 |
| org.hsqldb.jdbc.jdbcResultSet | 146 |
| org.hsqldb.Table | 154 |

| Id | name | superpackage |
|---|---|---|
| 1 | org | NULL |
| 2 | sblim | 1 |
| 3 | cimclient | 2 |
| 4 | unittest | 3 |
| 5 | slp | 4 |
| 6 | internal | 5 |
| 7 | discovery | 4 |
| 8 | cim | 4 |
| 9 | cimxml | 4 |
| 10 | logging | 4 |
| 11 | http | 4 |
| 12 | util | 4 |
| 13 | wbem | 4 |
| 14 | data | 13 |
| 15 | samples | 3 |
| 16 | slp | 2 |
| 17 | example | 16 |
| 18 | javax | NULL |
| 19 | cim | 18 |

| Primitive types | | |
|---|---|---|
| Id | name | size |
| 1 | boolean | 1 |
| 2 | char | 16 |
| 3 | byte | 8 |
| 4 | short | 16 |
| 5 | int | 32 |
| 6 | long | 64 |
| 7 | float | 32 |
| 8 | double | 64 |
| 9 | void | NULL |

| Modifiers | |
|---|---|
| Id | name |
| 1 | public |
| 2 | private |
| 3 | abstract |
| 4 | final |
| 5 | static |
| 6 | protected |
| 7 | native |
| 8 | strictfp |
| 9 | synchronized |
| 10 | transient |
| 11 | volatile |

| Id | name |
|---|---|
| 1 | + |
| 2 | - |
| 3 | * |
| 4 | / |
| 5 | = |
| 6 | . |
| 7 | ++ |
| 8 | -- |
| 9 | ! |
| 10 | << |
| 11 | >> |
| 12 | == |
| 13 | < |
| 14 | > |
| 15 | <= |
| 16 | >= |
| 17 | != |
| 18 | \|\| |
| 19 | && |
| 20 | \| |
| 21 | & |

| Id | name |
|---|---|
| 22 | ? |
| 23 | new |
| 24 | instanceof |
| 25 | ^ |
| 26 | this |
| 27 | super |
| 28 | ~ |
| 29 | += |
| 30 | -= |
| 31 | *= |
| 32 | /= |
| 33 | %= |
| 34 | &= |
| 35 | \|= |
| 36 | ^= |
| 37 | <<= |
| 38 | >>= |
| 39 | >>>= |
| 40 | % |
| 41 | >>> |

| Id | type |
|---|---|
| 1 | Assignment |
| 2 | Conditional |
| 3 | NewObject |
| 4 | InstanceTest |
| 5 | MemberSelect |
| 6 | TypeCast |
| 7 | Identifier |
| 8 | Literal |
| 9 | MethodCall |

| # | RESEARCH QUESTION | TOTAL | MEAN | MED | MAX | MIN | $s^2$ | VAR | KUR | SKE | CI |
|---|---|---|---|---|---|---|---|---|---|---|---|
| 1 | CLASSES, PER APPLICATION | 270,973 | 96.8 | 33 | 2071 | 1 | 193.2 | 37,320 | 30.5 | 4.8 | 11.4 |
| 2 | STATIC CLASSES | 7,368 | 6.7 | 0 | 1,035 | 0 | 38.5 | 1484 | 488 | 19.7 | 2.3 |
| 3 | ANONYMOUS CLASSES | 29,237 | 0.036 | 0 | 136 | 0 | 0.4 | 0.16 | 38595 | 146 | 0.001 |
| 4 | NESTED CLASSES | 14,270 | 0.06 | 0 | 61 | 0 | 0.56 | 0.3 | 1819 | 30.1 | 0.002 |
| 5 | INHERITANCE HIERARCHIES (NO ZERO DEPTH) | 11,298 | 1.2 | 1 | 7 | 1 | 0.5 | 0.26 | 12.9 | 3.2 | 0.01 |
| 6 | CLASSES PER INHERITANCE TREE | 116,194 | 12.3 | 3 | 6,918 | 2 | 155 | 24,116 | 909 | 28.4 | 0.99 |
| 7 | INTERFACE IMPLEMENTATION TREES | 2026 | 1.2 | 1 | 5 | 1 | 0.54 | 0.3 | 8.7 | 2.8 | 0.03 |
| 8 | METHODS OF PARENT CLASSES THAT ARE OVERRIDDEN BY DERIVED CLASSES | 17,254 | 1.6 | 1 | 55 | 1 | 3.38 | 11.4 | 77.3 | 8.2 | 0.06 |
| 9 | ASSERT STATEMENTS PER METHODS | 2,047 | 0.0025 | 0 | 9 | 0 | 0.07 | 0.005 | 3426 | 47 | 0.002 |
| 10 | METHODS PER CLASSES | 938,779 | 3.5 | 4 | 1175 | 1 | 28.6 | 818 | 415 | 16.8 | 13.8 |
| 11 | RECURSIVE METHOD CALLS | 35,846 | 0.04 | 0 | 121 | 0 | 0.31 | 0.1 | 33830 | 108 | 0.001 |
| 12 | STATIC METHODS PER CLASS (EXCEPT FOR MAIN) | 231,647 | 0.36 | 0 | 289 | 0 | 2.7 | 7.5 | 1586 | 28.4 | 0.35 |
| 13 | METHODS PER INTERFACES | 84,130 | 3.4 | 3 | 558 | 1 | 15.1 | 229 | 345 | 14.8 | 0.26 |
| 14 | ARITIES OF METHODS | 544,324 | 1.5 | 1 | 30 | 1 | 1.06 | 1.1 | 39.5 | 4.2 | 1.5 |
| 15 | METHODS THAT RETURN VOID | 414,953 | 5.1 | 3 | 1172 | 1 | 13.4 | 178 | 655 | 45 | 5.1 |
| 16 | METHODS THAT RETURN NON-VOID | 523,826 | 5.8 | 3 | 888 | 1 | 14.1 | 199 | 655 | 20 | 5.7 |
| 17 | METHODS THAT RETURN ARRAYS | 24,744 | 2 | 1 | 137 | 1 | 2.7 | 7.3 | 761 | 18.8 | 2 |
| 18 | USING THIS, PER METHOD | 840,937 | 2.2 | 1 | 785 | 0 | 5.6 | 31.6 | 3983 | 48 | 2.2 |
| 19 | CLASS FIELDS | 448,898 | 1.9 | 0 | 1,457 | 0 | 8.4 | 71 | 5923 | 51 | 0.03 |
| 20 | VOLATILE FIELDS | 492 | 0.002 | 0 | 9 | 0 | 0.075 | 0.006 | 3892 | 54.4 | 0.0003 |
| 21 | STATIC FIELDS | 154,067 | 0.7 | 0 | 1457 | 0 | 6.3 | 39.3 | 15807 | 93 | 0.03 |
| 22 | FIELDS OF TYPE STRING, PER CLASS | 231,647 | 0.3 | 0 | 432 | 0 | 2.5 | 6.2 | 7738 | 65.3 | 0.3 |
| 23 | CONDITIONAL STATEMENTS, PER METHOD | 620,419 | 0.76 | 0 | 750 | 0 | 3.3 | 11 | 10417 | 65.7 | 0.007 |
| 24 | CONDITIONAL STATEMENTS THAT USE SIMPLE BOOLEAN VARIABLES AS THEIR CONDITIONS | 4,956 | 0.006 | 0 | 39 | 0 | 0.14 | 0.02 | 25482 | 114 | 0.0003 |
| 25 | TRY/CATCH STATEMENTS, PER METHOD | 93,714 | 0.11 | 0 | 90 | 0 | 0.51 | 0.26 | 4571 | 34.7 | 0.001 |
| 26 | EXCEPTIONS, PER METHOD | 818,358 | 0.9 | 0 | 40 | 0 | 0.26 | 0.07 | 2059 | 29.2 | 0.02 |
| 27 | EXCEPTIONS THAT ARE THROWN FROM CATCH BLOCKS | 110,740 | 0.26 | 0 | 5 | 0 | 0.45 | 0.2 | 3.9 | 1.6 | 0.26 |
| 28 | LOCAL VARIABLE PER METHOD | 818,358 | 0.87 | 0 | 1055 | 0 | 4.6 | 20.8 | 6023 | 43 | 1.35 |

MINING APPLICATION REPOSITORIES

CROSS REFERENCE TO RELATED APPLICATIONS

This application is a continuation (and claims the benefit of priority under 35 USC 120) of U.S. application Ser. No. 13/194,101, filed Jul. 29, 2011, now allowed, which claims the benefit of U.S. Provisional Application No. 61/369,592, filed Jul. 30, 2010. Both of these applications are incorporated herein by reference in their entirety for all purposes.

TECHNICAL FIELD

This disclosure relates to mining application repositories.

BACKGROUND

Companies, governments, and open source communities spend a great deal of resources to fix, adapt, and enhance the quality of their software systems. In the context of software engineering, software quality measures how well the software is designed (quality of design), and how well the software conforms to that design (quality of conformance), although there are several different definitions. Whereas quality of conformance is concerned with implementation, quality of design measures how valid the design and requirements are in creating a worthwhile product. Nowadays, a software product is necessary in most of the engineering fields and industrial processes since it helps to save time, space and consequently money. Therefore, as software spreads from computers into auto engines, factory robots, hospital X-ray machines and elsewhere, defects represent a problem to be managed. They are predicted and excised or else unanticipated uses will lead to unintended consequences.

SUMMARY

In one aspect, a system includes a database configured to store attributes of applications that are descriptive of source code included in the applications and identification data that identifies the applications to which the attributes apply. The attributes have been mined through a programmatic analysis of one or more repositories in which the applications are stored. The programmatic analysis includes programmatic analysis of the source code included in the applications to derive the attributes. The system also includes a computer system configured to handle queries against the attributes of the applications stored in the database and provide output based on the handling of queries against the attributes of the applications stored in the database. In another aspect, a method may include one or more of the operations recited above as being performed by the system. In yet another aspect, a computer-readable storage medium may be operable to cause a processor to perform one or more of the operations described above as being performed by the system.

Implementations may include one or more of the following features. For example, the computer system may be configured to mine the attributes of the applications from the one or more repositories in which the applications are stored by programmatically analyzing the source code included in the applications and deriving the attributes based on the analysis of the source code included in the applications. In this example, the computer system may use a crawler to detect source files for applications stored in the one or more repositories, parse syntax data from the source files detected by the crawler, and store, in the database, a representation of the syntax data parsed from the source files detected by the crawler with identification data that identifies the source files from which the syntax data was parsed. Further, the computer system may construct a syntax tree for each of the source files detected by the crawler and store, in the database, information describing nodes of the syntax tree constructed for each of the source files detected by the crawler with identification data that identifies the source file for which the syntax tree was constructed.

In some implementations, the computer system may use the crawler to browse a project directory from the one or more repositories, detect a project file in the project directory based on browsing of the project directory, and, based on detecting the project file, use the crawler to search for source files associated with the project file and store, in the database, attributes related to creation of the project file. In these implementations, the computer system may detect a source file associated with the project file based on searching for source files associated with the project file, store, in the database, attributes related to creation of the source file, and invoke a parser based on detecting the source file associated with the project file. Also, in these implementations, the computer system may determine whether source files associated with the project file remain unanalyzed, continue to use the crawler to search for source files associated with the project file based on a determination that source files associated with the project file remain unanalyzed, determine whether unanalyzed projects remain in the project directory based on a determination that all source files associated with the project file have been analyzed, continue to use the crawler to browse the project directory based on a determination that unanalyzed projects remain in the project directory, and end mining of the project directory based on a determination that unanalyzed projects do not remain in the project directory. Further, in these implementations, the computer system may use the invoked parser to create a syntax tree for the detected source file associated with the project file and may use the invoked parser to write, to the database, nodes of the syntax tree created for the detected source file associated with the project file.

The one or more repositories in which the applications are stored may include a repository of open source applications. The one or more repositories in which the applications are stored may include a repository of third party applications developed by a party other than a party maintaining the database and the identification data links to the third party applications stored in the repository. The database may be configured to store the applications and the identification data references a location of the applications stored in the database.

In some examples, the computer system may receive a query to identify applications having one or more specific source code attributes and search the attributes in the database based on the query. In these examples, the computer system may identify one or more applications that have the one or more specific source code attributes based on searching the attributes in the database and output a result based on the identified one or more applications that have the one or more specific source code attributes.

In some implementations, the computer system may query the database to collect information about the attributes of the applications, generate statistics descriptive of source code attributes of the applications based on the collected information, and output the generated statistics. In these implementations, the computer system may use the generated statistics to assess quality of an application being developed or being considered for usage. Also, in these implementations, the computer system may use the generated statistics to assess whether source code attributes of a computer-generated benchmark application fall within norms of source code attributes of applications developed by human programmers. Further, in these implementations, the computer system may access performance metrics for the applications, correlate the generated statistics with the accessed performance metrics, determine a set of source code attributes that are common for applications having relatively high performance based on the correlation of the generated statistics with the accessed performance metrics, and use the set of source code attributes to assess quality of an application being developed or being considered for usage.

In some examples, the computer system may query the database to collect information about source code attributes of multiple versions of each of one or more applications and analyze the collected information to determine how the source code attributes of the multiple versions of each of the one or more applications evolved over time. In these examples, the computer system may, based on the determination of how the source code attributes of the multiple versions of each of the one or more applications evolved over time, identify source code attributes of the multiple versions of each of the one or more applications that changed over time and use the identified source code attributes to assess quality of an application being developed or being considered for usage.

In some implementations, the computer system may identify new applications and new versions of existing applications in the one or more repositories and programmatically analyze source code included in the new applications and new versions of existing applications. In these implementations, the computer system may derive attributes of the new applications and new versions of existing applications based on the analysis of the source code included in the new applications and new versions of existing applications and store, in the database, the derived attributes of the new applications and new versions of existing applications with identification data that identifies the new applications and new versions of existing applications.

In addition, the attributes may include an inheritance hierarchy for each application. The inheritance hierarchy may have been derived through programmatic analysis of the source code included in the applications. The attributes also may include a number of recursive method calls for each application. The number of recursive method calls may have been derived through programmatic analysis of the source code included in the applications. The attributes further may include, for each application, a number of classes, a number of static classes, a number of anonymous classes, a number of nested classes, an inheritance hierarchy, a number of classes per inheritance tree, a number of interface implementation trees, a number of methods of parent classes that are overridden by derived classes, a number of assert statements per method, a number of methods per class, a number of recursive method calls, a number of static methods per class, a number of methods per interface, a number of arities of methods, a number of methods that return void, a number of methods that return non-void, a number of methods that return arrays, a number of usages of a this statement per method, a number of class fields, a number of volatile fields, a number of static fields, a number of field types of string per method, a number of conditional statements per method, a number of conditional statements that use simple Boolean variables as their conditions, a number of try/catch statements per method, a number of exceptions per method, a number of exceptions that are thrown from catch blocks, and a number of local variables per method.

The details of one or more example implementations are set forth in the accompanying drawings and the description, below. Other potential features of the disclosure will be apparent from the description and drawings, and from the claims.

DESCRIPTION OF DRAWINGS

FIGS. 6 and 7 are example query results.
FIGS. 9A-24B are diagrams of example database elements.
FIGS. 25-55 are diagrams illustrating example statistics for software applications.

DETAILED DESCRIPTION

Figure 1:
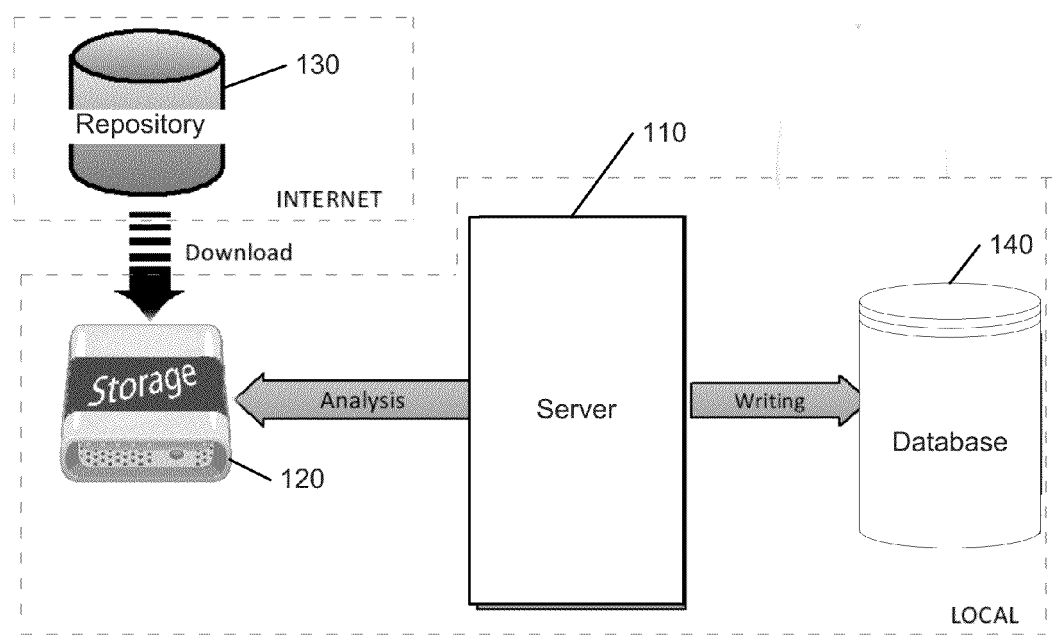
FIGS. 1-3, 5, and 56 are diagrams of example systems.

Software quality may be improved by using static analysis to extract information about patterns, dependencies and constructs from source code of applications. By putting together this information, it is possible to extract statistics about language constructs in many different applications. To perform this analysis, a system exploits a software repository (e.g., an open source software repository) to retrieve a large number of different projects (e.g., Java projects). The system iterates through source files of these projects, parses and analyzes these files, and stores representations of programs in a relational database. The relational database may be queried to identify projects having particular source code attributes and/or to derive statistics related to source code attributes of projects stored in the repository.

In some implementations, a system includes three main components: a Crawler detects and decompresses the projects to extract the source files, a Parser parses the source files and creates the related syntax tree and, finally, a Database contains source code constructs (e.g., Java constructs). The Database can be queried to extract information about projects (e.g., Java projects), and this information is used to produce statistics. For example, it is possible to answer general questions like: "What is the most frequent exception?", "How frequently is the class Arraylist used?", "How frequently is the Vector class used?". The system may be used to answer these and many other questions that represent general programmers' interests by also analyzing the evolution of software from its first version through its last release. The system may leverage a Java application that performs these operations. After testing and running the Java application, the system populates a Database and executes a wide range of queries to extract statistics and information.

In some examples, the system uses techniques, such as source code analysis, to ensure software quality and these techniques deal with two goals of software analysis which are: error detection and software evolution study. By analyzing source code, the system extracts interesting patterns and information which can help the analyst to report the quality of the software under analysis. The system may use the collected information to show statistics about source code usage (e.g., Java usage), on which programmers can rely on, in order to produce higher level software products. For example, a programmer may take advantage of the analysis of incremental versions of the same program since he can review how bugs have been detected and fixed going through the versions. This example shows benefits of a tool which is able to join software evolution and error detection through source code analysis. The greater the knowledge base is, the more interesting the extracted information.

In some implementations, the system exploits a large code storage, such as an open source software repository (e.g., Sourceforge), to extract interesting patterns and information from multiple versions of the same software product, in order to create statistics and formulate assertions which can be helpful for programmers to improve the quality of their code. The system may start from a large open-source code repository (e.g., Sourceforge) and may go through code stored in the repository to extract as much information as possible.

Structures which host source code data may include repositories and they may be located on a network-connected server that can receive requests from millions of users. Repositories may store software products and code in such a way to create a shared memory from which programmers can upload and download code according to their purposes. Some software repositories are free (such as Sourceforge) and allow the user to retrieve the desired programs created by other users and loaded to the repository. Programmers may access software repositories to retrieve open-source code or pieces of code and take advantage by adapting them to their programming purposes. Although repositories may be created for specific purposes, it is possible to exploit their structure in such a way to obtain more information than is usually extracted. By treating a huge amount of software products as information, the system extracts interesting statistics and patterns by analyzing software repositories. For example, the system may analyze the evolution of a software product from its first version until its last release, compare different programming styles, detect recurrent bugs, study how these bugs are fixed, evaluate the differences between different versions of the same program, and assess any other attribute of a software product or its evolution. The retrieved information represents added knowledge for programmers, which may be leveraged by software practitioners and researchers to support the maintenance of software systems, improve software design/reuse, and empirically validate novel ideas and techniques. Researchers may uncover ways in which mining these repositories can help to understand software development and software evolution, to support predictions about software development, and to exploit this knowledge concretely in planning future development.

In some examples, a system analyzes a large number of software products (e.g., open-source software products) downloaded from a repository. These software products may be written in the same programming language in order to exploit the language paradigm and structure to produce statistics and charts. The system is able to reliably and efficiently retrieve software projects (e.g., Java projects) from a repository (e.g., the Sourceforge repository) and manage the retrieved projects. The system goes through all of the retrieved projects and extracts the related source code and detects their different versions. The system parses the detected source code and writes the results of the parsing into a dedicated database. The dedicated database is suitable to be queried to locate types of programs with particular source code attributes, extract interesting information, and produce useful statistics and charts about a programming language (e.g., the Java programming language). The structure of the database is based on source code constructs (e.g., Java constructs), such as class declarations, statements, commands and expressions.

FIG. 1 illustrates an example system 100. The system 100 includes a server 110, a storage device 120, a repository 130, and a database 140. The server 110 retrieves software projects from the repository 130 and stores the retrieved software projects on the storage device 120. The server 110 analyzes the retrieved software projects when stored on the storage device 120 and stores results of the analysis in the database 140. When the repository 130 is maintained by a third party other than the party operating the server 110, the server 110 also may store the retrieved software projects in the database 140 or may store references to locations of the retrieved software projects in the database 140.

To retrieve and analyze software products, the server 110 may use a component which is able to analyze a given amount of data in a methodical and automatic manner. This process is known as crawling or spidering and it is widely used by search engines as a mechanism of indexing web sites. The server 110 may include a crawler with the capability of analyzing a large number of structured files and directories which represent the structures of the programs to be analyzed. Once the crawler has identified all the projects and their versions, it extracts the source code and invokes a parser operated by the server 110.

A parser is a syntax analyzer which is able to receive text as input (e.g., the source-code) and produce a syntax tree of the code as output, to recognize commands and keywords belonging to a specific programming language. The parser is able to analyze the source-code by identifying the programming language particularities, construct the related syntax tree and finally write the tree nodes on the database 140. The parser may use an existing library, making it suitable to work with the other components. Therefore, the information collection is performed by the parser which uses the database 140 to store data. The database 140 is created after studying the programming language features and commands set, with the intent of producing the most appropriate structure. The design of the database 140 takes into account all the possible construct usages within the source code. This helps to guarantee that all the information extracted from the source files is safely stored. For this reason the realization of the database 140 and the parser has been carried out in such a way to let them function together. Once the parser has fully populated the database 140, a large amount of information exists, which can be queried according to the interests of the user.

The system 100 may be used to populate the database 140 with the data retrieved by the crawler and analyzed by the parser. Once the information is stored in the database 140, it is possible to execute as many queries as wanted, according to the database structure. In order to adequately fill the database 140, both the crawler and the parser operate with reliability and capability to detect bugs and possibly correct them. Sometimes project archives are damaged or source-code files are corrupted, thus the crawler and the parser cope with these issues, in order to reduce the loss of information. As described in more detail below, the system 100 accounts for these issues. The system 100 may use existing tools for repairing damaged files and archives, or cope with damaged archives and corrupted files by simply skipping them and without blocking the execution flow.

The database 140 may be populated within acceptable values of time complexity in order to get the information in the database 140 relatively quickly to allow performance of queries on it. In this regard, the crawler and the parser are designed to "fit" with the performances of the computer on which they are running They are capable of exploiting all available processors of a machine, leaving the choice of the number of execution flows to be created to the user. Once the database 140 is ready to be queried, queries may be executed to extract information from the database 140. For example, a programmer may query the database 140 to evaluate the changes of the same software product across its different releases, or recurrent dependencies between classes within a project and so on.

Above, components of the system 100 have been described as the crawler, the parser, and the database 140. The database structure is based on the programming language features of the software projects being analyzed. Since the database 140 is basically a stand-alone component used by its connector driver, it has been integrated within the system 100. Moreover, although the crawler and the parser depend on each other, they have been designed in such a way to work together allowing an integration task.

In some examples, the repository 130 may include a large source-code repository based on the web (e.g., Sourceforge). In these examples, the repository 130 acts as a centralized location for software developers to control and manage open-source software development by providing free services that help programmers to upload projects and share them with a global audience. The repository 130 also offers free access to hosting and tools for developers of free/open-source software. The repository 130 may compete with other providers or include other providers, such as RubyForge, Tigris, BountySource, Launchpad, BerliOS, JavaForge, and GNU Savannah. The repository 130 may store more than 230,000 software projects written and/or used by more than two million registered users, making the repository 130 a large collection of open-source tools and applications. This vast number of users exposes prominent projects to a variety of developers, and can create a positive feedback loop. As a project's activity rises, an internal ranking system makes it more visible to other developers who may join and contribute to it. Given that many open-source projects fail due to lack of developer support, exposure to such a large community of developers can continually breathe new life into a project.

The system 100 may be used to mine one or more software repositories (e.g., the repository 130). The software repository 130 may include a storage from which software packages may be retrieved. Many software publishers and other organizations maintain servers on the Internet for this purpose, either free of charge or for a subscription fee. Repositories may be solely for particular programs, such as CPAN for the Perl programming language, or for an entire operating system. Operators of such repositories typically provide a package management system, tools intended to search for, install and otherwise manipulate software packages from the repositories.

Software repositories contain a wealth of valuable information regarding the evolutionary history of software projects. Historical information that is stored in software repositories provides a middle ground that reveals industrial development processes and products while not interfering with development deadlines. Such repositories contain a wealth of valuable information for empirical studies in software engineering: source control systems store changes to the source code as development progresses, defect tracking systems follow the resolution of software defects, and archived communications between project personnel record rationale for decisions throughout the life of a project. Such data is available for most software projects and represents a detailed and rich record of the historical development of a software system.

Moreover, current software engineering approaches and techniques may benefit from using such historical information. For example, historical information can assist developers in understanding the rationale for the current structure of a software system and its evolution.

In some implementations, the system 100 may use multithreaded software and architecture. An example architecture of the system 100 is described with respect to FIG. 2. As mentioned above, the crawler and the parser may fit with the hardware performances of the machines by dividing the execution into different flows. In this regard, the more powerful the computer is, the faster the analysis process is. This capability of the crawler and the parser to provide parallelism is obtained by using a multithreaded implementation on which it is based.

A multithreaded application may be a piece of software that is aware of more than one core/processor, and can use these to simultaneously complete multiple tasks. A common misconception is that single-core systems are not able to multithread. In reality, they simply perform multitasking among multiple threads or programs slowing down the whole program because of the interleaved usage of the same hardware resources. This is the reason the first multi-core processor was created, allowing a system to give full core support to a single thread. This not only allows multiple single threaded applications to be run at the same time, but also for the multithreaded software to be used. However, using multiple cores for a single application requires software to be coded specifically for this task. The crawler and the parser have been implemented as multithreaded programs in order to speed up the analysis process.

A disadvantage of multithreading is that multiple threads can interfere with each other when sharing an object such as a file: threads need to be synchronized to not interfere when accessing a memory space in order to avoid the creation of inconsistent memory states. As a solution, the system 100 manages thread concurrency, which is described in more detail below.

Figure 2:
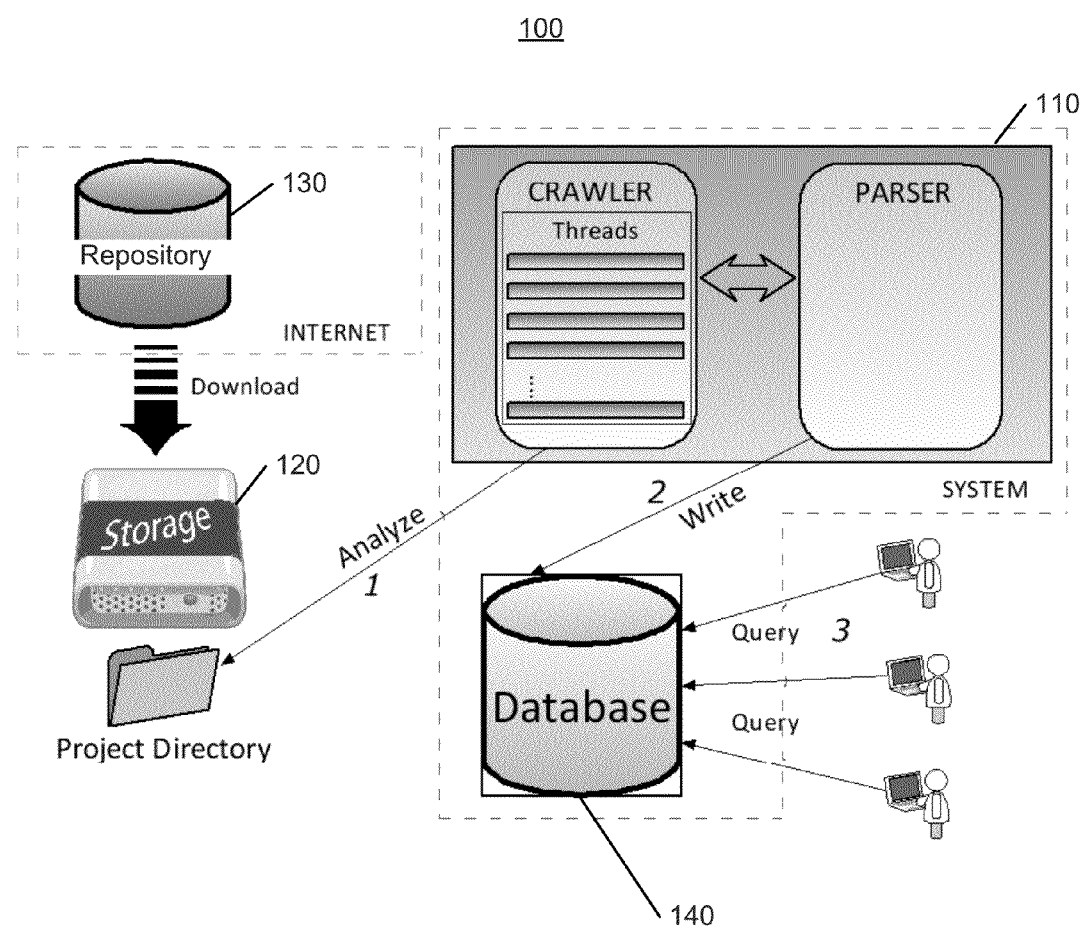

FIG. 2 illustrates an example architecture for the system 100. As mentioned above, the three main components which are part of the system 100 include the crawler, the parser and the database 140.

The crawler initiates the analysis process. For example, each one of its threads reads the content of the directory containing the projects to be analyzed and, once a project has been detected, the related source files are passed to the parser. Therefore, in this example, the crawler and the parser are joined by dependences; in fact as the crawler extracts source files, the parser is invoked. When this last component is invoked, it starts analyzing the structure of the source files and consequently builds up the related syntax trees. The nodes of those trees represent commands and keywords of the programming language which are the concepts stored into the database 140. Thus, as the parser has constructed a syntax tree, it writes the tree's nodes information on the database 140. When all the projects have been analyzed and the parser finishes parsing the last related source file, the system 100 has completed its task and thus it ends. At this point the database 140 is populated and it is ready to use.

The system 100 with the architecture shown in FIG. 2 may promote modularity and separation of concerns. For instance, the three main tasks the system 100 has to perform (e.g., Crawling, Parsing, and Storing information) are assigned to three different components: the Multithreaded Crawler, the Java Parser and the Java Language Structure Database. Although the crawler and the parser are related, they are treated as two separate concerns since their functionalities do not overlap, promoting high cohesion and low coupling. Moreover the database 140 is a separate concern itself and belongs to a different layer with respect to the crawler and the parser. The database 140 is a part of the Data Model Layer while the crawler and the parser are part of the Business Logic Layer. The separation may achieve good system Robustness. If the project data to be analyzed changes in its structure, it is sufficient to modify or substitute the crawler leaving the other components unchanged; or if some features of the programming languages change, it is sufficient to modify or substitute the parser; or finally if the database structure becomes obsolete and inappropriate, changing its structure is enough to cope with the variations. Moreover, the system 100 may be able to detect bugs and quickly recover after having encountered an unexpected error. Errors can negatively affect the performance of the system 100 in terms of execution time. For example, if the crawler cannot open a corrupted project file, it raises an exception which takes some time to be handled.

The system 100 may reduce this recovery time by leveraging relatively fast error recovery procedures. A multithreaded architecture is useful when dealing with errors because, even if a thread encounters an error, the other threads are not affected. The thread runs the error handler and then waits for a task or it terminates.

This functioning may provide a relatively good level of time performance, which also is promoted by the capability of the system 100 to work as fast as the machine on which it is run, using the multithreaded crawler and parser design. In terms of space complexity, the system 100 uses some temporary memory space on which the database 140 will take place. The crawler's threads allocate some memory to store temporary files, but this memory is immediately freed when it is no longer needed, thereby reducing an undesirable waste of memory space.

The system 100 also may have relatively good reliability. Reliability may be important for the system 100 in order to extract as much information as possible from the projects stored in the repository 130. If either the crawler fails to extract projects or the parser encounters an error while creating a syntax tree, the system 100 loses useful information. Below, techniques are described for attempting to guarantee the correct functioning of the system 100 in order to populate the database 140 with all the information.

Figure 3:
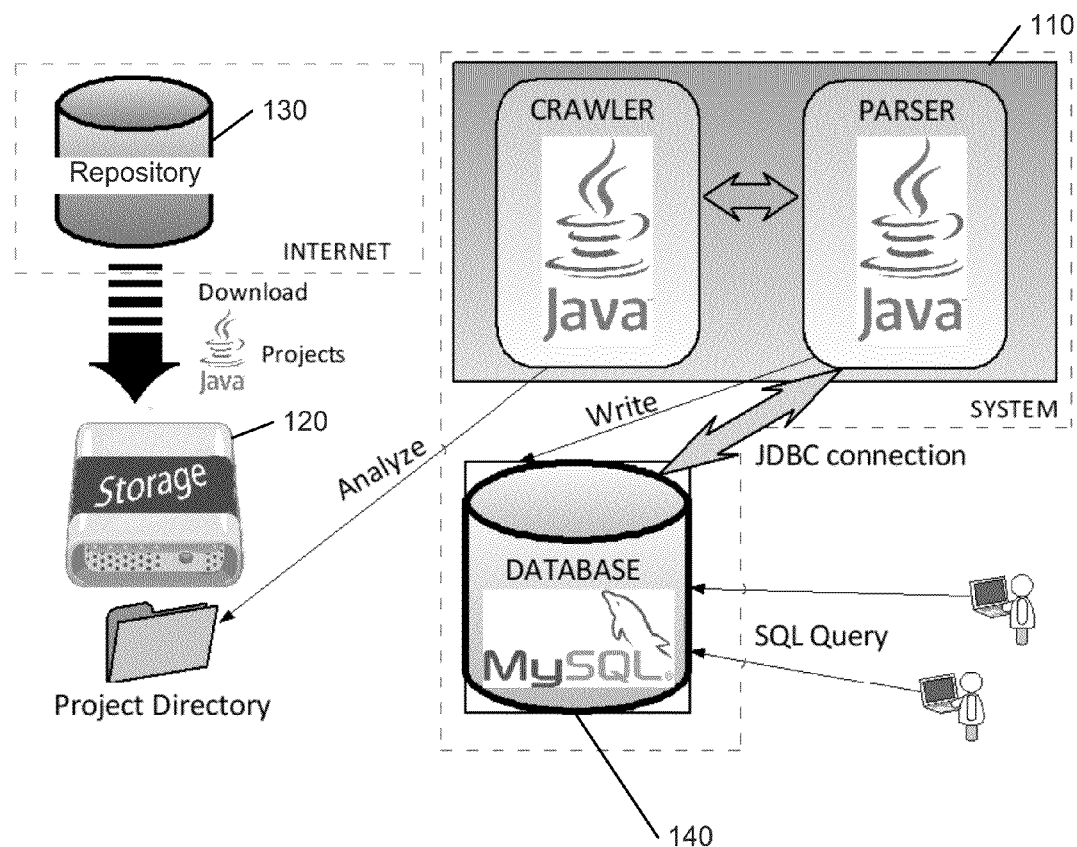

FIG. 3 illustrates an example implementation of the architecture of the system 100. As shown, in this example, the system 100 has been constructed using the Java programming language. Since Java is built upon an object-oriented programming paradigm, it may allow high level modularization and abstraction. Further, Java may offer a straightforward methodology to create multithreaded applications which may reduce time complexity. Both the crawler and the parser are defined by various software modules (modularization) and are multithreaded.

In the example shown in FIG. 3, the database 140 uses MySQL DBMS, which is a database management system that is fast, robust, reliable, and has a good feature set. The crawler and the parser connect to the database 140 using the JDBC driver for MySQL, which is available to download from the MySQL web site. JDBC allows the crawler and the parser to query the database 140 to either retrieve or write data during the analysis process using a database approach technique.

In some examples, the JDBC API is used to establish a connection with a database or access any tabular data source, send SQL statements, and process the results. The system 100 allows queries to be performed by the two components in order to fill out the database with the extracted software (e.g., Java) concepts. The crawler may utilize the Java package java.io to deal with the project directories stored on the hard drive. The Java package provides for system input and output through data streams, serialization and the file system.

Figure 4:
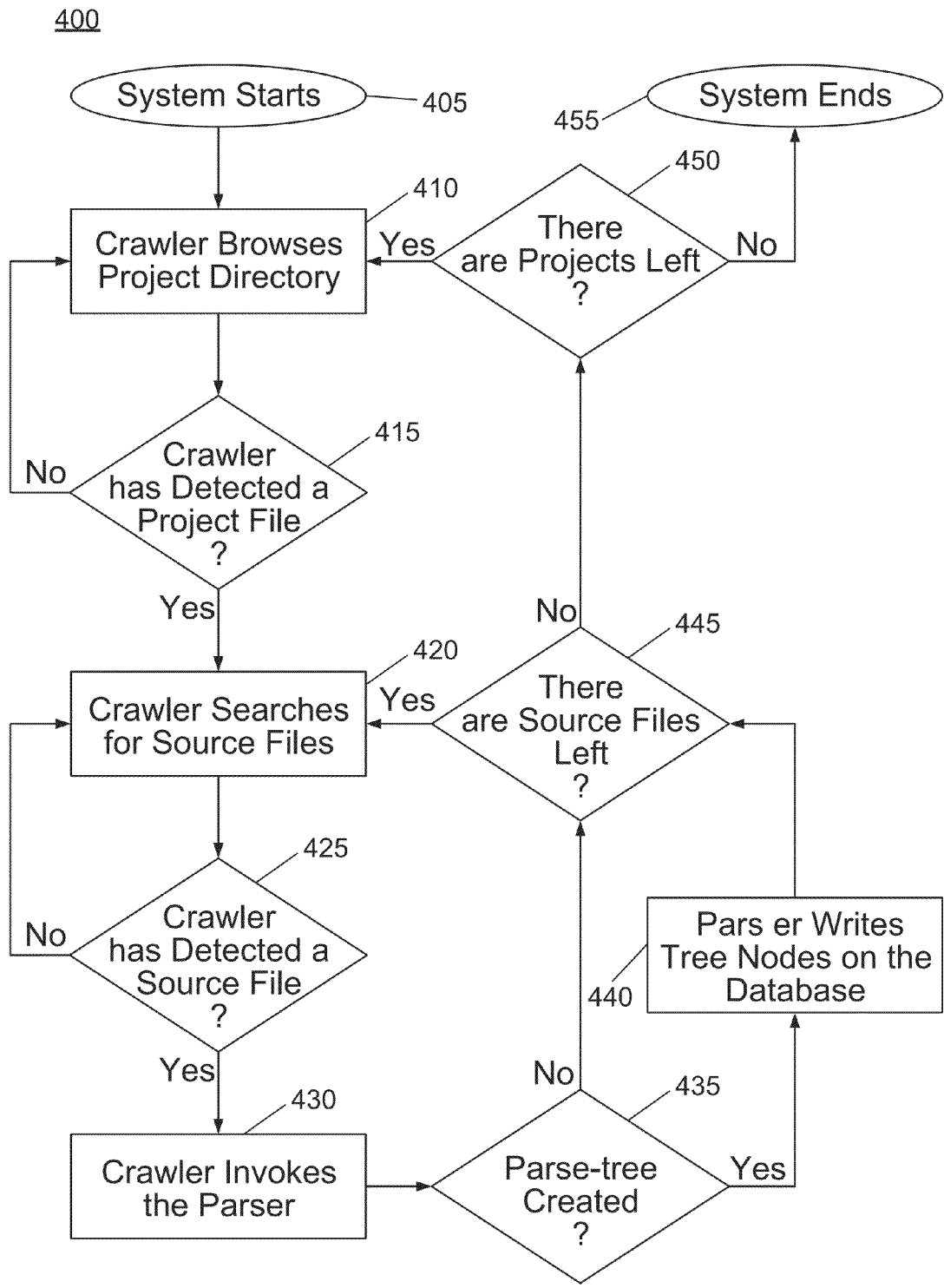
FIG. 4 is a flowchart of an example process.

FIG. 4 illustrates an example process 400. The process 400 shows how the system 100 works for a single thread of a crawler. In multithreaded implementations, the process 400 is executed by each thread at the same time.

After the process 400 starts (405), the system 100 uses a crawler to browse the project directory for project detection (410). Based on browsing the project directory, the system 100 determines whether the crawler has detected a project file (415). Based on a determination that the crawler has not detected a project file, the system 100 continues to use the crawler to browse the project directory for project detection.

Based on a determination that the crawler has detected a project file, the system 100 uses the crawler to browse the detected project to search for source files (420). Based on search for source files, the system 100 determines whether the crawler has detected a source file (425). Based on a determination that the crawler has not detected a source file, the system 100 continues to use the crawler to browse the detected project to search for source files.

Based on a determination that the crawler has detected a source file, the system 100 invokes a parser for parsing the detected source file to construct a syntax tree for the detected source file (430). The system 100 determines whether the parser successfully created a syntax tree for the detected source file (435). Based on a determination that the crawler has not successfully created a syntax tree for the detected source file, the system 100 continues to operate without writing information for the detected source file to the database 140. Based on a determination that the crawler has successfully created a syntax tree for the detected source file, the system 100 uses the invoked parser to write, to the database, nodes of the syntax tree created for the detected source file associated with the project file (440).

After parsing the detected source file, the system 100 determines whether source files associated with the project file remain unanalyzed (445). Based on a determination that source files associated with the project file remain unanalyzed, the system 100 continues to use the crawler to search for source files associated with the project file and repeats parsing operations for any source files detected.

Based on a determination that all source files associated with the project file have been analyzed, the system 100 determines whether unanalyzed projects remain in the project directory (450). Based on a determination that unanalyzed projects remain in the project directory, the system 100 continues to use the crawler to browse the project directory and repeats crawling and parsing operations for any project files detected. Based on a determination that unanalyzed projects do not remain in the project directory, the system 100 ends mining of the project directory (455).

Figure 5:
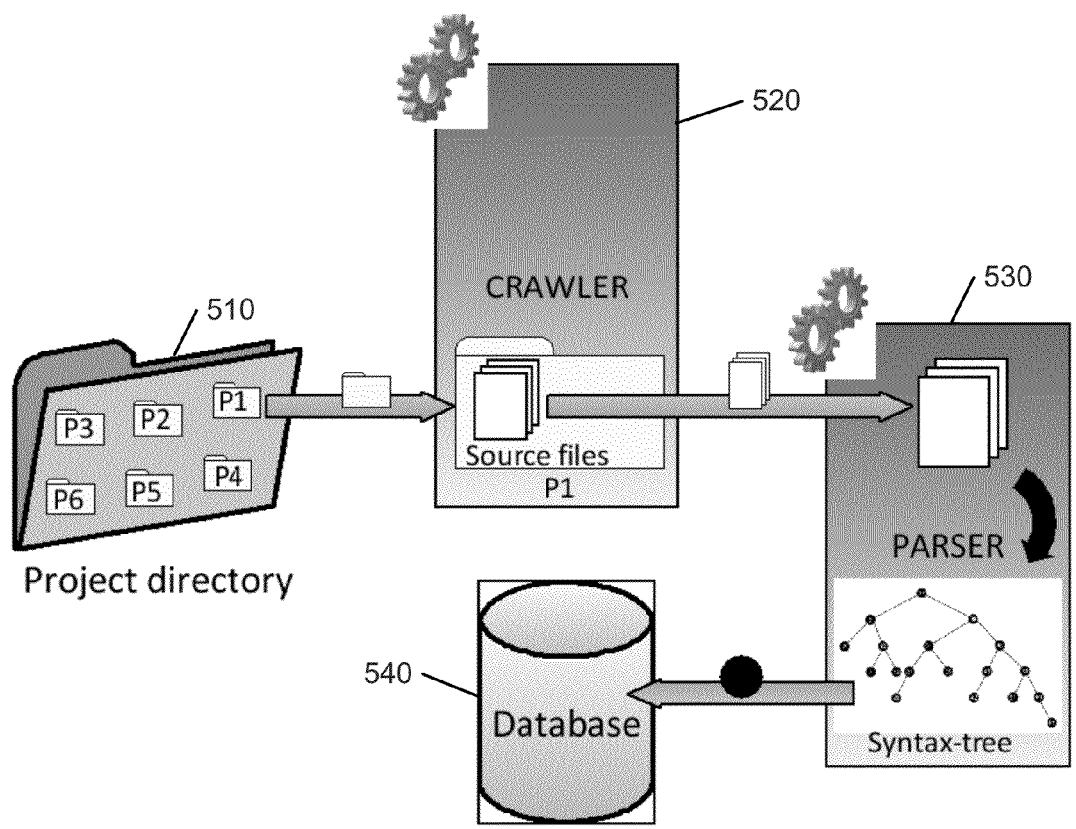

FIG. 5 illustrates an example system 500 that performs crawling and parsing operations described with respect to FIG. 4. The system 500 includes a project directory 510, a crawler 520, a parser 530, and a database 540. As shown, the information flow starts from the crawler 520 and goes through the parser 530 to end up with the database 540.

For instance, the information flow starts when downloading projects from the repository (e.g., Sourceforge) and storing them into the project directory 510. The information flow finishes when the database 540 is effectively queried to extract information.

The multithreaded crawler 520 may be a program written in the Java programming language which has the task of browsing directories containing projects to be analyzed in order to extract the related source files and consequently invoke the parser 530. Since the multithreaded crawler 520 processes a large number of projects, the multithreaded crawler 520 may use techniques to save time and space complexity. The projects may be archived on a hard-drive and two techniques may be adopted in order to reduce the time and space complexity. The first technique is based on the principle that temporary decompressed data is deleted as soon as they have been processed and the second technique exploits the parallelization of execution flows.

The parallelization of execution flows may be achieved by using a multithreaded architecture. Of course, the level of parallelism depends on the specific hardware on which the crawler 520 is run. For instance, if the machine has only one processor, the benefits of multithreading may not be exploited. Using parallelization, the execution time may be divided by a factor which is equal to the number of the machine's processors. The crawler 520 may be initially configured with the location of the project directory 510 and the number of threads to be created. After this preliminary operation, the crawler 520 starts browsing the given directory and constructs a project index which contains all the projects found in the directory. These projects may be compressed with Gzip, Zip and Tar and, therefore, the crawler 520 is able to deal with these different archiving techniques in order to decompress them and finally extract the source files. The decompression process represents only a part of a thread's process, and the threads' tasks are performed in the order of (1) extract a project from the index, (2) decompress the extracted project, (3) detect the source files, and (4) invoke the parser when the source files of a project are detected.

These operations are continuously performed by the threads until there are no more projects in the index to be assigned. Although threads do the same task, they do not interfere during their execution since they refer to different memory spaces and they do not modify any kind of shared memory. However, they read the project index to extract projects and a synchronization technique may be used to avoid concurrency problems.

Finally, the multithreaded crawler 520 is provided with a log generation mechanism to save all the information collected and to eventually report any problems encountered during the execution. This information may be used to fix bugs and to detect the corrupted project files and sources.

A core component of the system 500 is parser 530 (e.g., Java Parser), as the parser module operates in connecting the crawler 520 and the database 540 and includes most of the business logic. In order to effectively collect information from the source files (e.g., Java source files) and insert the collected information in the database 540, the system 500 parses the source files and, thus, navigates the abstract syntax tree (ASTs), interleaving this traversing with the actual insertion of data in the database 540.

The parser 530 core may be based on the Java Compiler API and on the Compiler Tree API, both available with Java 6, which allows access to the compiler API and navigates the AST in a customizable way according to the specific needs. Once the crawler 520 has retrieved project source files, all the relevant nodes of the related trees are visited through a common Visitor Pattern, and an initial thread extracts raw syntactical data suitable for our future analysis. This intermediate step allows decoupling of the parsing and the database access phase, which may benefit performance especially considering a multicore architecture.

The technique through which this separation of concerns is achieved is the so called Command Pattern, which is based on units of execution (commands) dependent on the data they have to manage and on which component concretely executes them, but which are able to encapsulate all their operations and hide them from the rest of the application. Each of these commands is associated to a particular set of raw data extracted from a single node or sometimes also from its ancestors. The work flow then goes on with a first-in, first-out (FIFO) structure in which these commands are put, until another thread responsible for their execution retrieves them starting from the oldest one, and launches its execution on the database 540. Each command contains the business logic to properly process the data collected, and exploits a shared Data Base Connector component to effectively access and update the database 540. The connector may be based on the common JDBC standard, which provides a call-level API for SQL-based Data Base access.

The system 500 may perform operations directed to synchronization between threads, concurrency, management of the internal data structures, the visiting process and database consistency. For instance, decoupling the AST traversing process from the data insertion phase requires the transfer from the logic of a stateful visitor pattern to the subsequent step of the commands execution. To address this issue, the system 500 uses both the Compiler Tree API previously mentioned, as well as ad-hoc data structures.

The process of parsing sources (e.g., Java sources) from a repository results in a very large amount of information, which includes the representation of all syntactical contents in the parsed source files. The database 540 may implement MySQL 5 to achieve simple and reliable interoperability with Java modules, including JDBC and MySQL connectors for the Java language.

The database 540 may include information on both the filesystem structure of the projects (e.g., Java projects) and the structure parsed from the source files composing the projects. For example, the information that the database stores, with respect to the project filesystem structure include, for each project (e.g., Java project), the versions that were implemented, the sub-components of which the project is composed, and the files belonging to this particular project (e.g., Source files (.java), Class files (.class), Java Archive files (.jar)).

The parsing process acquires information from the source files, and the database 540 includes all the relevant structure information that can be extracted from the code (e.g., Java code). For each source file that is part of a certain package (e.g., Java package), a number of external packages may be imported. The following elements may be recognized and filed (1) classes, interfaces, relations between classes and interfaces (e.g., superclass, nested class, implementation of interfaces, etc.), attributes, modifiers, and properties, (2) methods and constructors—declarations, implementations, method calls, types, modifiers, and parameters, (3) types, primitive types, reference types, and enum types, (4) fields and variables—declarations in classes and interfaces, types, and modifiers, (5) expressions—logical, algebraic, compares, and complex operations, and (6) statements—switch, if, while, for, block statements, try-catch-finally, expression statements, assert, return, throw and so on.

The above list is a simplified view of what is stored into the database 540 to give a general idea about the meaning of the structure of a programming language (e.g., the Java programming language). The database 540 collects all of the possible information that can be extracted from a source in order to provide a basis to carry out further analysis on the code and infer other non-trivial information.

As discussed above, a crawler and a parser extract large amounts of data from the source repository. To allow that data to be handled and made available for analysis, the data needs is given a well-defined structure in order to be meaningful for analysis purposes, and is stored into a permanent, reliable and accessible location which offers a good compromise between space and time complexity.

A repository (e.g., SourceForge) may contain a large number of source projects (e.g., Java projects). After downloading the sources made available to the public, the result will be a file system structure composed by a directory tree in which the first, highest directory level represents the available projects. Each of these directories contains one or more source files of a project, together with auxiliary files like configuration files, help files, and libraries. The file system also may contain subdirectories that in turn may contain some subprojects, modules and other auxiliary files.

A crawler and a parser, working together, accomplish the task of finding, extracting, and selecting useful information from the raw repository data. Information used in the analysis may include projects available and versions, source files and libraries used. For each source file, the information that the parser retrieves includes all of the tokens of the language (e.g., Java) that appear in the source code, and all of the relationships between elements. Classes, methods, variables, constructs, data structures, statements, expressions, and parameters are some examples of those elements that are retrieved, along with many others, and are stored in a structured manner within the designated data structure that is discussed in more detail below.

For example, the database is structured in a manner that can be queried and the system handles queries performed on the database. The queries may be defined using the SQL language, which is composed of the following constructs (1) Queries: retrieve data according to some specified requirement, (2) Statements: other commands sent to the database in order to modify its structure, or to perform some administrative task like transactions, connections and users management, (3) Clauses: sub-components of queries and statements; examples include the FROM clause or the WHERE clause, (4) Expressions: pieces of code that produce single scalar values or resultsets, and (5) Predicates: specify conditions to restrict the effect of queries and statements.

Users that want to retrieve a portion of data from the database, or some data obtained by elaborating data in the tables, may write queries starting with the declarative SELECT statement. That statement may retrieve, without modifying, data from one or more tables in the database. A typical SELECT query specifies the columns to be included in the resultset, and may include one or more of these clauses: (1) FROM clause: specifies from which tables data will be retrieved (tables can be merged in different ways using JOIN, OUTER JOIN, INNER JOIN, LEFT JOIN, RIGHT JOIN etc.), (2) WHERE clause: restricts the rows to be included in the resultset, specifying a list of conditions separated by logical operators, (3) GROUP BY clause: is used to group rows from the resultset that have some attribute value in common, (4) HAVING clause: filters the results of the GROUP BY clause, and (5) ORDER BY: sorts in ascending or descending order the results, according with the specified columns.

For example, the simple query (SELECT * FROM primitive_type p) may be performed against the database when the database is formatted as a Java Language Structure Database. FIG. 6 illustrates the resultset 600 returned in this example.

In another example, a slightly more complex query may be: SELECT c.name as class, count(m.id) as number methods from method m join class c on m.class=c.id group by c.id having count(m.id)>=100. This query, executed on the Java Structure Language database, returns the names of each class and its relative number of methods, grouping by class, where only classes with at least 100 methods are considered. FIG. 7 illustrates a fragment of the resultset 700 in this example.

Other than query language, SQL provides a Data Manipulation Language (DML) to add, update or delete data. Principal statements of the SQL DML include (1) INSERT: adds rows to an existing table, (2) UPDATE: modifies data in a set of existing tables, (3) DELETE: removes data from existing tables, (4) TRUNCATE: quickly empties an entire table, and (5) MERGE: combines data from multiple tables. SQL also supports transactions. A transaction is a list of operations that should be executed sequentially from the first one to the last one. If all of those operations are successful, the result will become permanent; otherwise the DBMS discards all the changes made and restores the database to the state it was before the execution of the first operation. The two principal commands for transaction management are COMMIT, to set the changes made in a transaction permanent, and ROLLBACK, to discard the changes made. Finally, SQL has Data Definition Language (DDL) that permits creation of an object in the database (CREATE command), removal of an object (DROP command), or modification of the structure of an object, such as adding a column in a table (ALTER command).

In some examples, the Java Structure Language Database may be a relational database running on a MySQL Server version 5. In these examples, the Java Structure Language Database supports the standard SQL language and supports many platforms. The Java Language Structure Database represents and describes all structural units of the Java language, with a particular attention to the relations among those units. A relational database can be used for this purpose. Each structural unit of the language is represented by a table and each property corresponds to an attribute. Every relation between structural units is reflected in the database accordingly to the following rules that deal with one-to-one relationships, one-to-many relationships, and many-to-many relationships.

For one-to-one relationships, the information about one entity is directly represented in the table describing the other entity. For example, in the table describing the try-catch-finally block, one or more attributes describe the try block, since each try-catch-finally may only have one try block, which in turn belongs to, and only to its try-catch-finally structure.

For one-to-many relationships, the two entities are represented using two different tables. The table of the entity appearing only once in the relation contains an attribute that is a foreign key to the table of the entity that can appear multiple times in the relation. For example, a class may contain several methods, while a method only belongs to a class, thus the method's table contains a field containing the id of the relative class.

For many-to-many relationships, in addition to the two entity tables, an additional table includes the primary keys of the two entities involved in the relation, and which represent all of the couples of related elements. As an example, consider methods and modifiers: each method may be defined with multiple modifiers, while a modifier can be applied to different methods. A table listing all of the couples (method, modifiers) found may be used.

In implementations that analyze Java programs and use a Java Language Structure Database, the database may encompass all the structures of the Java Language, including language entities, their properties and relationships. In these implementations, the contents of the Java Language Structure Database may focus on the Java syntax without taking into account the language semantics. Further, the code may not be checked for errors or meaningfulness. A piece of code that contains errors is stored anyway in the database, provided that the errors do not compromise the parsing of that piece of code. For example, an expression containing an illegal or reserved name is parsed anyway and stored, while a method without block parentheses will not be correctly recognized by the parser and thus will not be stored.

In addition, the system cannot determine, by simply reading static code, the actual target method in a method call. Java is a dynamic dispatch language and, for that reason, when the system encounters a method call, the system only stores the expression used in the call into the database without linking the call instruction to the called object.

An example syntactical description of components of the Java Language used in an example database design is discussed below. Packages and files are example components. Java sources are organized in packages. Every source file declares the package to which it belongs, and is stored in a subdirectory with the same name of the package. A class declared in a source file with no package declaration belongs to the anonymous default package.

A source file can refer to classes in other packages with the use of notation package.class, or to avoid that, the source file can import other packages or singles classes. The java.lang package is implicitly imported in each source file. Other than source files, we may find .class files and .jar compressed Java archives, but they are not directly relevant to source code analysis. They may be used for secondary purposes, such as tracking versions or determining projects space occupation.

Type is another example component. A type is a set of values and operations on them. A type is either a primitive type or a reference type. A primitive type is either Boolean or one of the numeric types char, byte, short, int, long, float and double. A reference type is either a class type defined by a class declaration or an interface type defined by an interface declaration, or an array type, or an enum type.

A variable is another example component. The purpose of a variable is to hold some data during the execution of a block statement (or method or constructor). The elements that characterize a variable declaration include (1) Type of the declared variable, (2) Unique name for the variable, (3) Initializer, i.e. the initial value assigned to the variable, which may be an expression or an array initializer, (4) Scope in which the variable is declared, and (5) Variable modifiers.

The variable can be used only in that block statement (or method or constructor), and only after its declaration. A parameter is a special kind of variable. It is declared in the parameter list of a method or constructor, and is given a value when the method or constructor is called. The parameter can be used only in that method or constructor. A field is declared inside a class, but not inside a method or constructor of the class. It can be used anywhere in the class.

Classes are another example component of the Java language. The declaration of a class has the form: class-modifiers class C extends-clause implements-clause class-body. A declaration of class C introduces a new reference type C. The class-body may contain declarations of fields, constructors, methods, nested classes and nested interfaces. The extends-clause specifies which class is directly above class C in the class hierarchy. A class can extend only one other class in Java; instead, a class may implement an arbitrary number of interfaces.

Class modifiers may be: public, and one of abstract and final for non-nested classes. For nested classes not declared within a method or constructor, possible modifiers are static, one of abstract and final, and one of private, protected and public. For other nested classes, only abstract and final are acceptable.

Methods are another example component of the Java language. A method is declared inside a class. A method declaration declaring a method m has the form: method-modifiers return-type m(formal-list) throws-clause.

Modifiers applicable to methods are abstract, or one of static, final and synchronized, and one of private, public and protected. The formal list is a comma separated list of zero or more formal parameter declarations. For each parameter, a name and its relative type is specified. Each parameter can also come with the modifier final, meaning that the parameter cannot be modified inside the method.

Method calls can be found in methods and constructors. Method calls specify an object on which to call the method, the method's name, and a list of parameters. As mentioned above, the identity of the object and method called cannot be determined at compile time.

Constructors are another example component of the Java language. The purpose of a constructor in class C is to initialize new objects (instances) of the class. A constructor declaration in class C has the form: constructor-modifiers C(formal-list) throws-clause constructor-body. The constructor modifier may be one of private, protected and public. Formal parameters are specified similarly with respect to methods.

Interfaces are another example component of the Java language. An interface describes fields and methods, but does not implement them. An interface declaration may contain field description, methods declarations, class declarations and interface declarations, in any order. An interface can, in turn, extend other interfaces. At top level, the interface may be declared along with modifier public. Inside a class or interface, the modifiers can be static (always implicitly understood) and at most one of public, protected or private.

Enum types are another example component of the Java language. An enum type is used to declare distinct enum values. An enum type is a reference type.

An enum type declaration is a specialized form of class declaration that begins with a list of enum value declarations: enum-modifiers enum t implements-clause enum-body. The enum body contains the enum values list, and then, in any order: method declarations, field declarations, constructor declarations, interface declarations. In fact, an enum type is implemented as a class and is a reference type, and there is exactly one instance of that implementation class for each declared enum value.

The enum modifiers control the accessibility of the enum type and follow the same rules as class access modifiers. The modifiers abstract and final cannot be used. An enum type may be declared to implement any number of interfaces, but cannot be declared to have a superclass. An enum type implicitly has the superclass java.lang.Enum. An enum type is implicitly final and cannot be used as a superclass. A nested enum type is implicitly static and cannot refer to instance fields of an enclosing type. An enum declaration can declare private constructors only, and an enum value cannot be explicitly created using the new instruction.

Expressions are another example component of the Java language. An expression is evaluated to obtain a value. In addition, evaluation of an expression may change the computer's state: the value of variables, fields, and array elements, the contents of files and so on. The evaluation of an expression may also result in throwing an exception, or never terminate if, for example, it calls a method that does not terminate.

Expressions are built from literals, variables, fields, operators, method calls, array access, conditional expression, the new operator and so on. Subexpressions are related together by making use of different types of operators, such Arithmetic operators (e.g., +, −, *, /, %), Logical Operators (e.g., =, ==, !=, &&, ||, &, ^, |, <, >, <=, >=, ?), Bitwise and Shift operators (e.g., ~, &, ^, |, <<, >>, >>>, <<<), and other expression operators (e.g., ++, --, ?, new, instance of, this, super, +=, -=, *=, /=, %=, |=, ^=, <<=, >>=).

The system distinguishes the compile-time type of an expression from the run-time class of an object. An expression has a type inferred by the compiler. For this analysis, the system relies on the compile-time type of expressions (static type).

Expressions can be grouped in different categories. Some categories include (1) assignment expressions in the form x=e, where x is a variable and e is an expression whose type is a subtype of the type of x, (2) conditional expressions in the form e1 ? e2: e3, where e1 is Boolean; if e1 is true, then e2 is evaluated, otherwise e3 is evaluated, (3) object creation expressions in the form new C(actual-list), that creates a new object of class C and then calls that constructor in C whose signature matches the arguments in actual-list, (4) instance test expressions, are expressions in the form e instance oft; if the value obtained evaluating e is not null and is a reference to an object of class C, where C is a subtype oft, the result is true, otherwise false, (5) field access expressions, can be in the simple form f to access field f in the local scope, or in form C.f to access the static field f in class C, or in form o.f where o is an expression of reference type, (6) member select expressions, in the form this.m, are used to access member m in the current object; keyword this in fact refers to the current object, (7) type cast expressions, in the form (t)e, where e is an expression and t is a type; a boxing, unboxing, narrowing or widening conversion is performed to specify that the resulting type of e should be t; if the cast was not successful, a ClassCastException is thrown, (8) identifier expressions, that are evaluated to obtain on object value, (9) literal expressions, that are anonymous constants, and are usually found as parts of more complex expressions, (10) Boolean expressions, that after evaluation may assume either true or false, and (11) method call expressions, that may have different forms; m(actual-list) to call a method within the local scope, super.m(actual-list) to call a method in the object of the superclass type, C.m(actual-list) to call a static method in class C, o.m(actual-list) to call a method in the object obtained by evaluating the reference o.

Statements are another example component of the Java language. A statement may change the computer's state: the value of variables, fields, array elements, the contents of files, and so on. More precisely, execution of a statement either terminates normally and lets the execution continue with the next statement, terminates abruptly by throwing an exception, exits by executing a return statement, exits a switch or loop by executing a break statement, exits the current iteration of a loop and starts a new iteration by executing a continue statement, or does not terminate at all.

Different categories of statements used by the system include the following:

Expression statement, composed by an expression followed by a semicolon. It is executed by evaluating the expression and ignoring its value. Only assignment expressions, increment and decrement expressions, method calls and object creation expressions are acceptable here.

Block statement, that is a sequence of zero or more statements or variable declarations or class declarations in any order, enclosed in braces.

If-then-else statement: has the form
if(condition)
true branch
else
false branch The condition has a Boolean type, truebranch and falsebranch are statements that are executed if the condition is true or false, respectively. The else and falsebranch part is optional.

Switch statement: has the form switch(expression)
{
case c_1: branch_1
...
case c_n: branch_n
default: branch default
}

The type of expression is in int, short, char, byte, or a boxed versions of these, or an enum type. Each constant is unique and may be a compile-time constant expression, or an unqualified enum value. The switch condition is evaluated to obtain a value v, and the execution starts where a constant is found equal to v. If no such a constant is found, the default branch is executed.

For statement: has the form for(initialization; condition; step)

Body Initialization is a variable declaration or an expression, condition is an expression of a Boolean type, step is an expression, and body is a statement. Each one of those is optional.

After initialization, the condition is evaluated. If it's false, the loop terminates, otherwise the block is executed, then the step is executed and the condition is evaluated again.

While Statement: has the form
while(condition)
body

Condition is an expression of a Boolean type, and body is a statement. The body is executed as long as the condition is true.

Do-While Statement: has the form
do
body
while(condition);

Condition is an expression of a Boolean type, and body is a statement. The body is executed as long as the condition is true, like the while statement, but in this case it is always executed at least once.

Return statement: the syntax is
return;
or
return expression;

The first form is used in methods that have void return type or in a constructor. The second form is used in methods having a return type that is a supertype of the type of expression.

If expression is present, it is evaluated to some value v. Then, the method is exited and the execution returns to the caller method, if any, and the method call expression assumes value v.

Labeled statement: has the form:
label: statement
where label is a name. The scope of label is statement. The label cannot be reused inside statement, except inside a local class.

Break statement: it is legal only inside a switch or loop and has one of the forms:
break;
break label;

Executing break exits the innermost enclosing switch or loop and continues execution after that switch or loop. Executing break label exits the enclosing statement that has label label, and continues execution after that statement.

Continue statement: it is legal only inside a loop and has one of the forms:

continue;

continue label;

Executing continue terminates the current iteration of the innermost enclosing loop and continues the execution at the step in for loops or the condition in while and do-while loops. Executing continue label terminates the current iteration of the enclosing loop that has the label label, and continues at the step or the condition.

Throw statement: has the form:

throw expression;

where the type of expression is a subtype of class Throwable. The expression is evaluated to obtain an exception object v. If it is null, then a NullPointerException is thrown, otherwise the exception object v is thrown.

Try-catch-finally statement: is used to catch particular exceptions thrown by the execution of a block of code. It has the following form:

try body catch (E1 x1) catchbody1 catch (E2 x2) catchbody2

...

finally finallybody where E1, E2, . . . are exception types, x1, x2, . . . are their relative variable names, and body, catchbody1, catchbody2 and finallybody are block statements. There can be zero or more catch clauses, and zero or one finally clauses (at least one among catch and finally clauses).

If the execution of body terminates normally, the catch clauses are ignored. If the body terminates abruptly by throwing an exception e of class E, then the first matching Ei (if any) is selected and the corresponding catch body is executed. If a finally body exists, it is executed regardless of whether the execution of body terminated normally or not.

Assert statement: has one of the forms:

assert boolean-expression;

assert boolean-expression: expression;

The boolean-expression is a Boolean type. The type of expression may be Boolean, char, double, float, int, long, a boxed version of these, or Object.

Under ordinary execution of a program, an assert statement has no effect at all. However, assertions may be enabled at run-time by specifying the option –ea or –enableassertions when executing a program. When assertions are enabled, every execution of the assert statement will evaluate the boolean-expression. If the result is true, the program execution continues normally, otherwise the assertion fails and an AssertionError is thrown. In the second form, the value of expression is passed to the AssertionError constructor.

Figure 8:
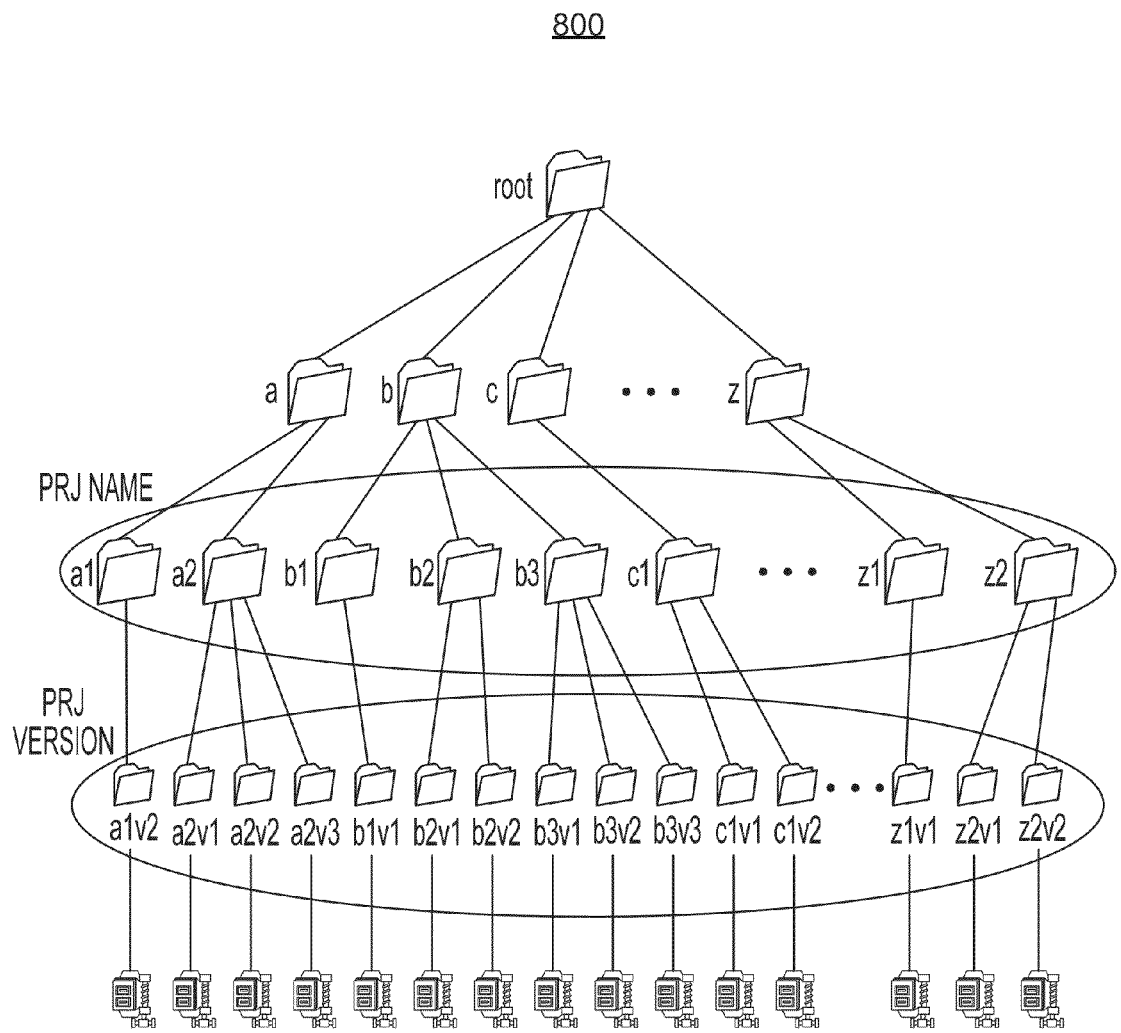
FIG. 8 is a diagram of an example directory structure.

The database includes information about parsed code from several projects. For each project, more than one version may be present. Each project may be stored in a specific, dedicated directory within the repository and different versions of a project may be stored in different subdirectories of the main project directory. Furthermore, for each project (and specifically, for each version of each project) multiple archives may exist. These may be subprojects, and may be stored in different subdirectories of the version directory. FIG. 8 illustrates an example directory tree structure 800 of a source repository.

Many other concepts of the Java language exist that were not described above because they are not relevant to the example database structure discussed. For example, exceptions are not described because an exception object is also an object of a class type. If the system were to retrieve all the exception types used in a project, the system could retrieve all the types appearing in the project that extend, directly or indirectly, from the class java.lang.Exception.

Based on the Java language components discussed above, the database may be designed as a complete and reliable container for code information retrieved from Java source repositories having an appropriate structure for each possible construct of the Java language. An example database design, including details about tables, fields and relationships among tables, is explained below. The description follows the same order used to describe the constructs of Java language to highlight how the given design for the Java Language Structure Database meets the database requirements. The role of each table is clarified by showing fragments of entity-relationship schema.

In some implementations, the Java Language Structure Database, whose architecture has been described above, may be built on a MySQL version 5 server, making use of both SQL statements and the visual tool MySQL Query Browser.

An example complete schema of the database includes 65 tables, 255 fields, and 125 foreign keys. Tables represent the entities of the Java language (e.g., methods.) Fields represent some property of entities (e.g., the return-type of a method). Foreign keys represent the dependencies of entities upon other ones. For example, if a method belongs to a class having a certain identifier, then the system ensures this identifier exists in the table listing all the existing classes.

Out of the 65 tables in the example schema of the database, 41 of them actually represent a Java language entity, such as a class, a parameter, or a constructor. 17 tables are used to handle many-to-many relationships between entities and 4 tables contain static lists of values and have been populated at design time (e.g., the lists of allowed modifiers, operators, expression types and primitive types). Finally, 3 tables are imported, and are intended to match the projects, versions and subprojects retrieved in this project with the correspondent data retrieved by authors, with the purpose to collect more information about those projects.

Figure 9A:
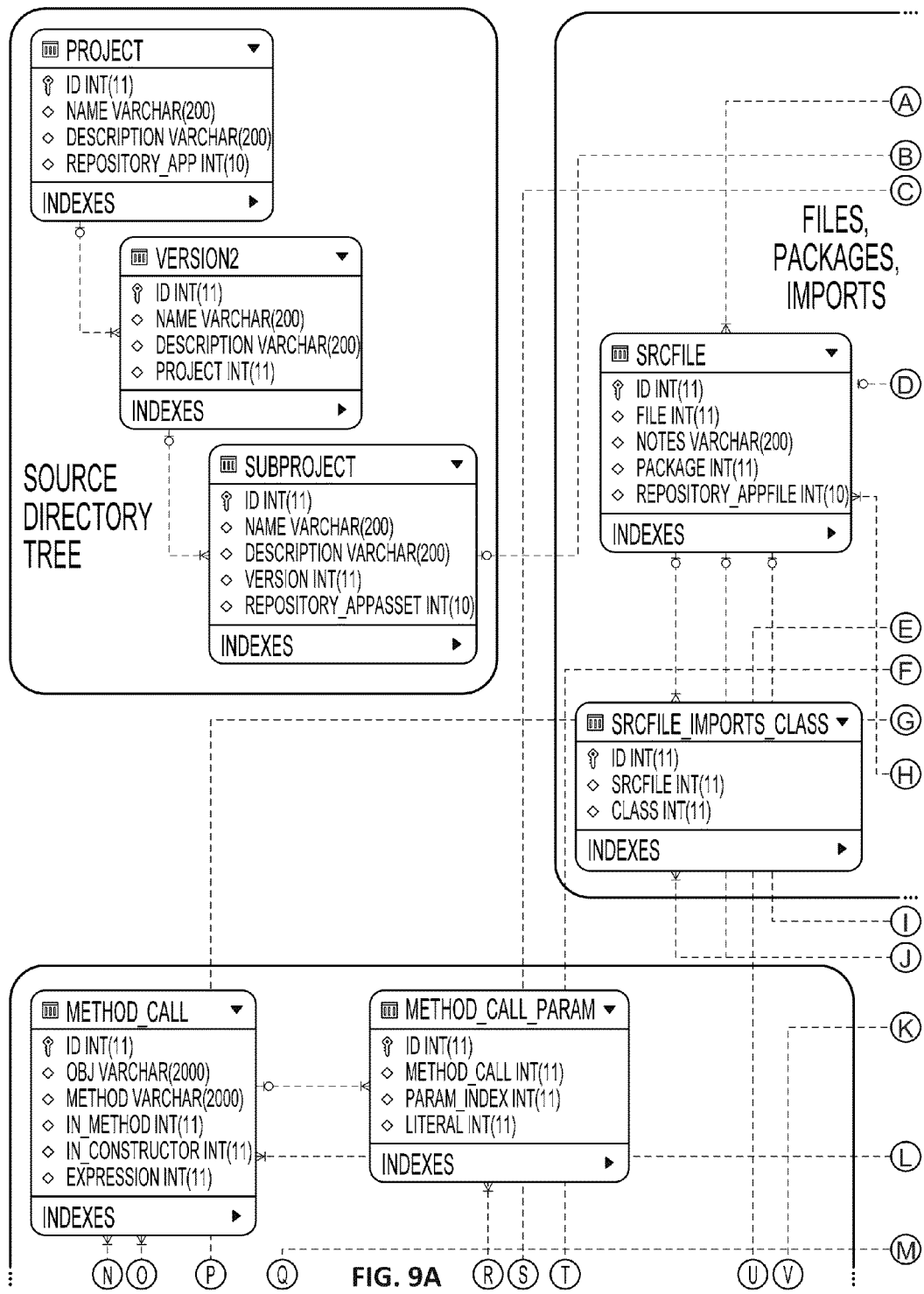
Figure 9B:
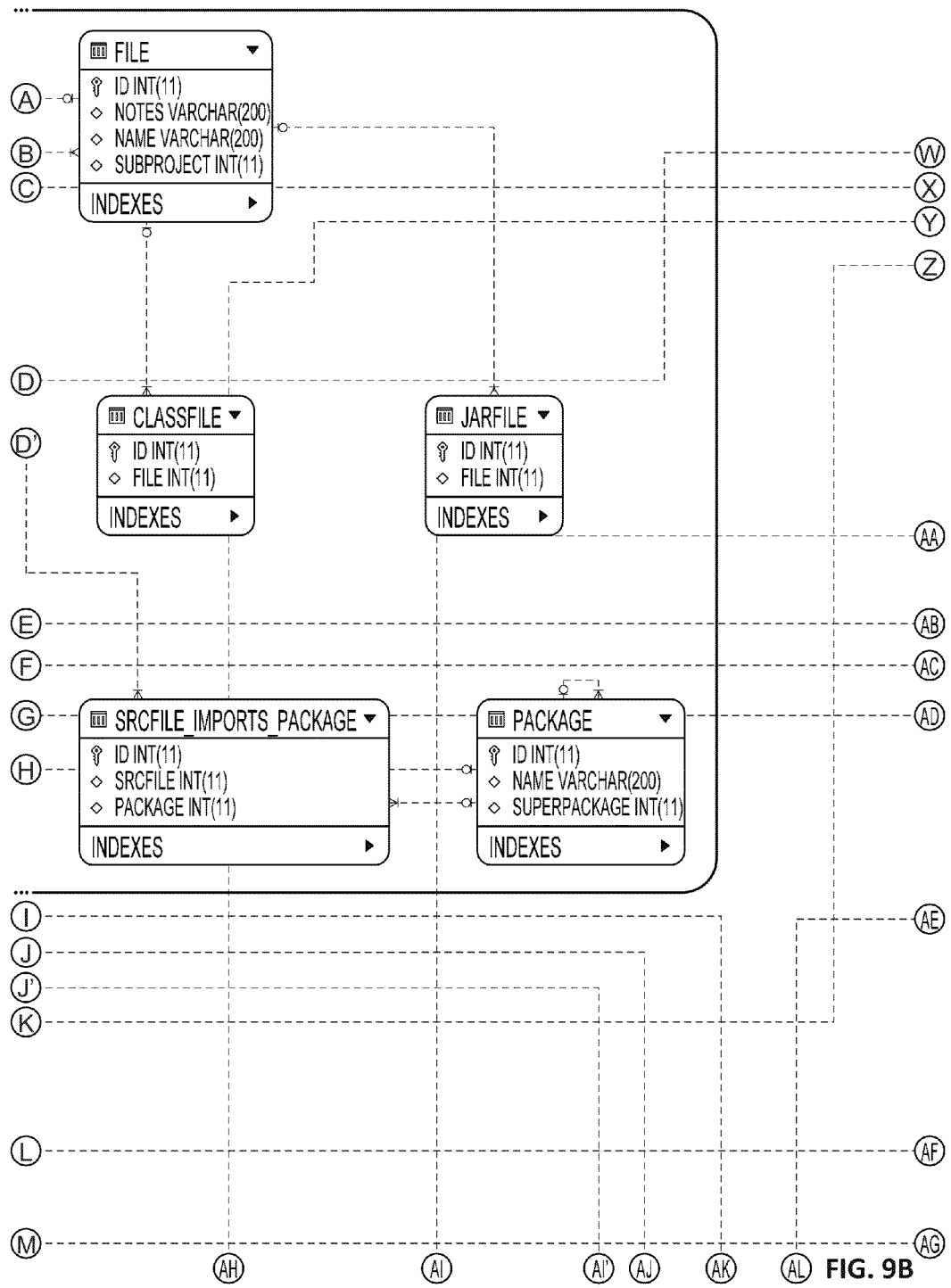
Figure 9C:
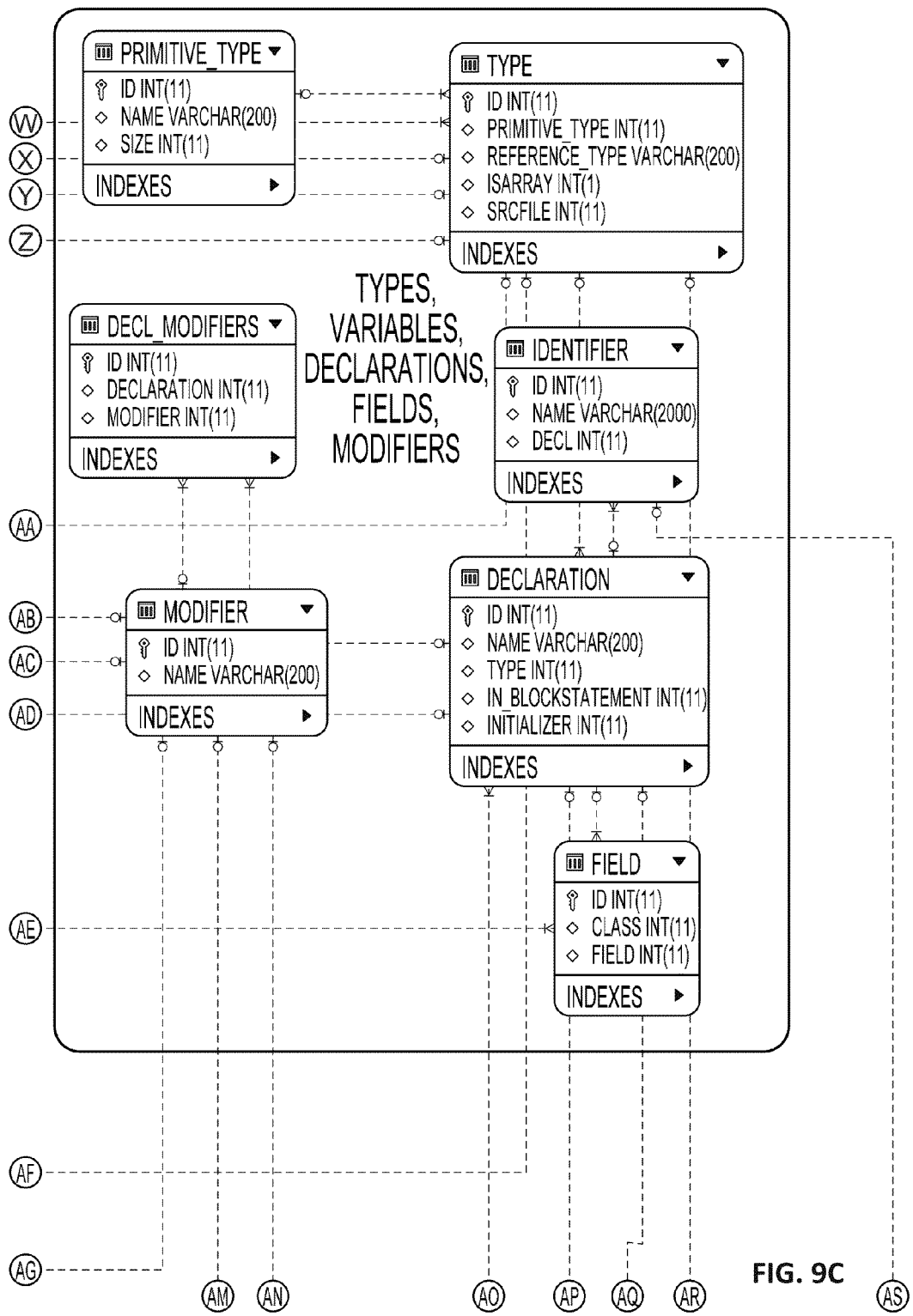
Figure 9D:
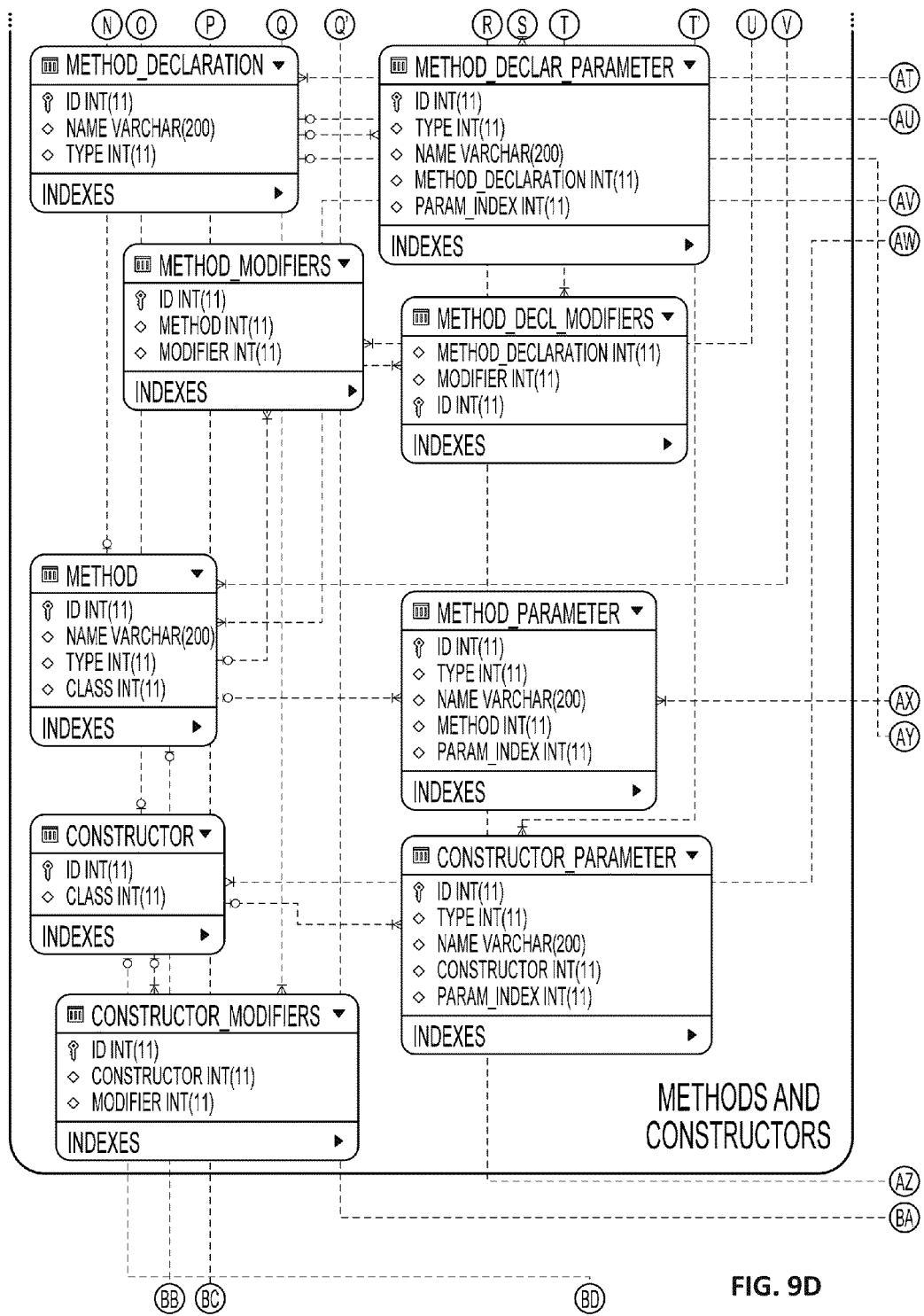
Figure 9E:
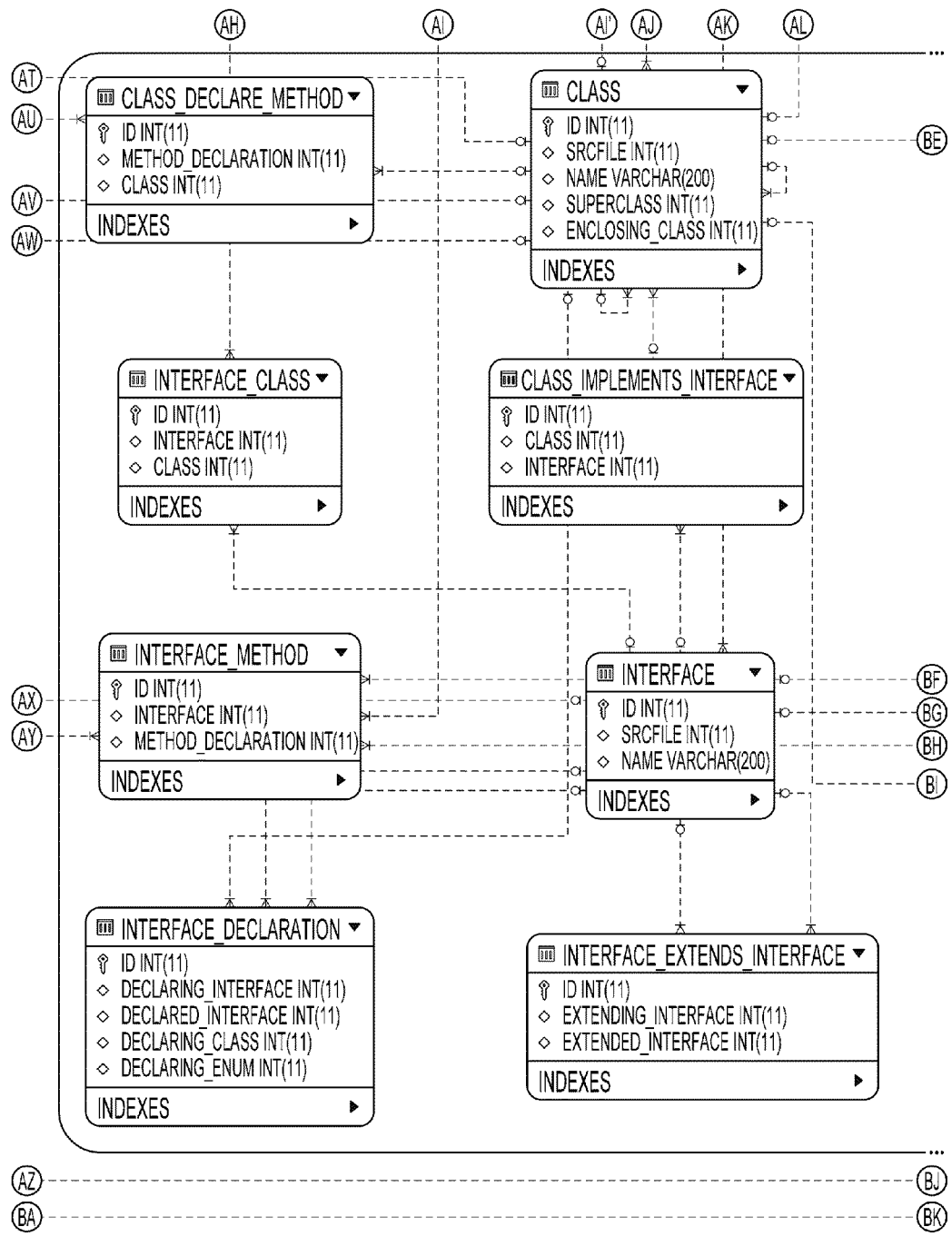
Figure 9F:
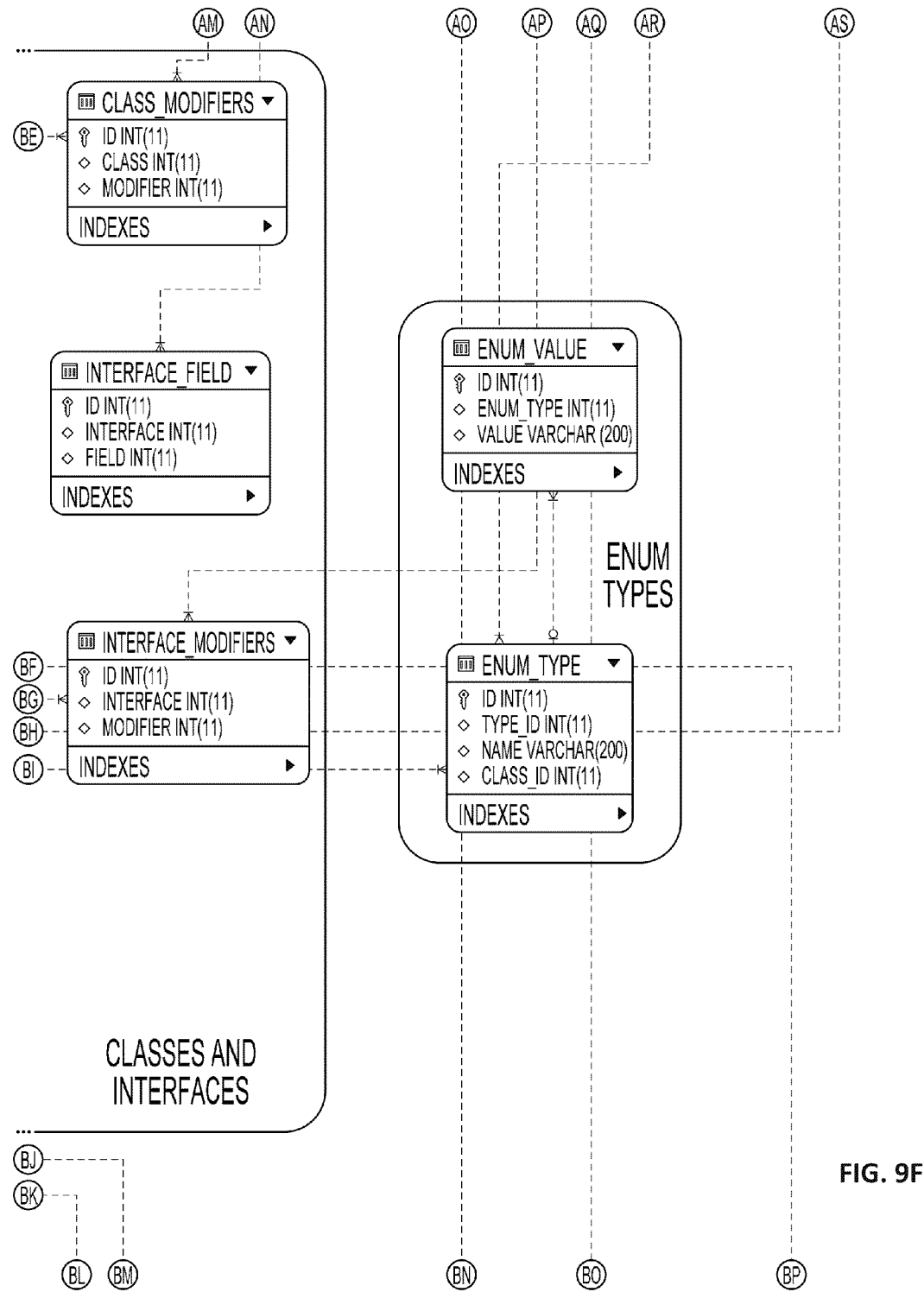
Figure 9G:
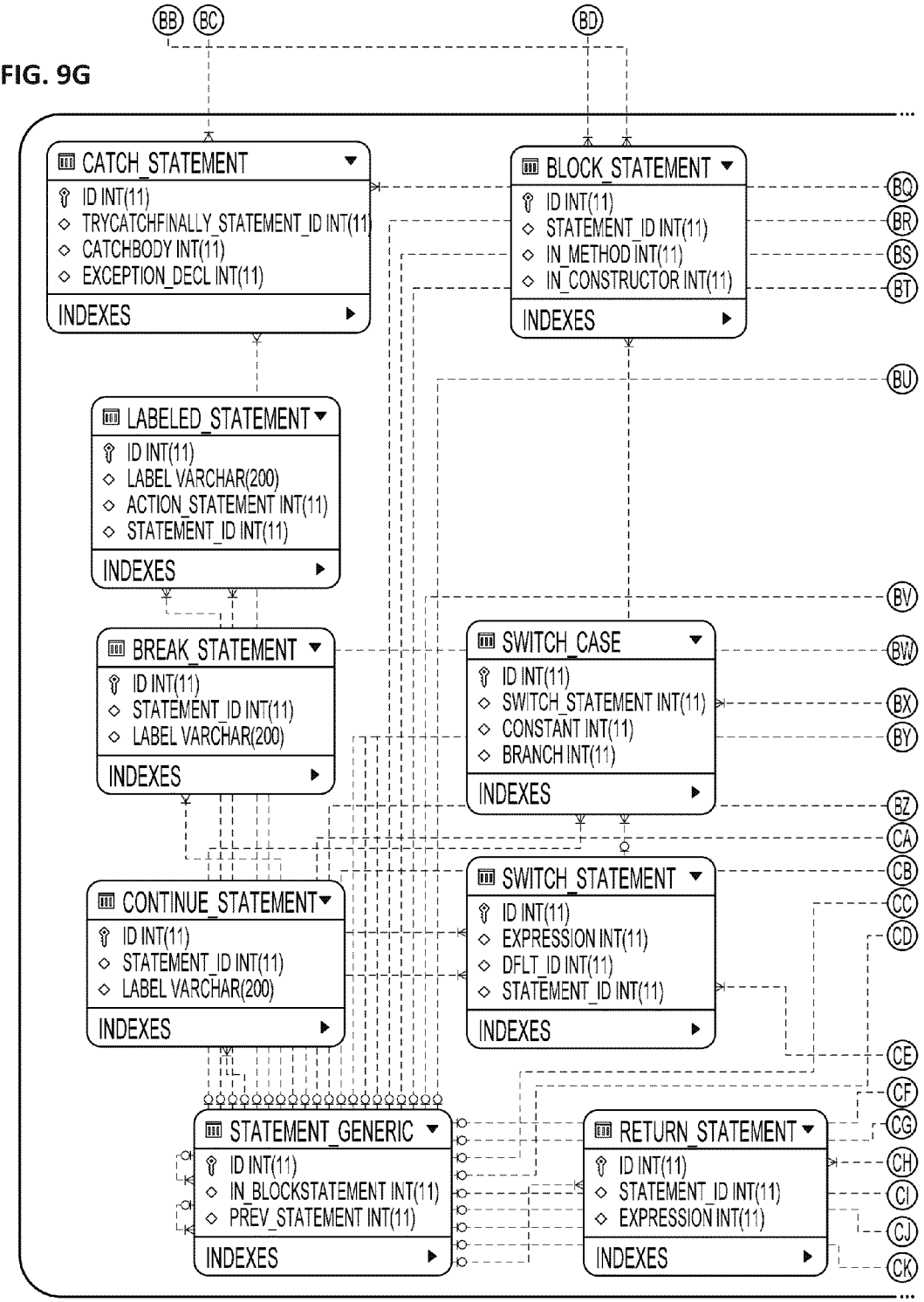
Figure 9H:
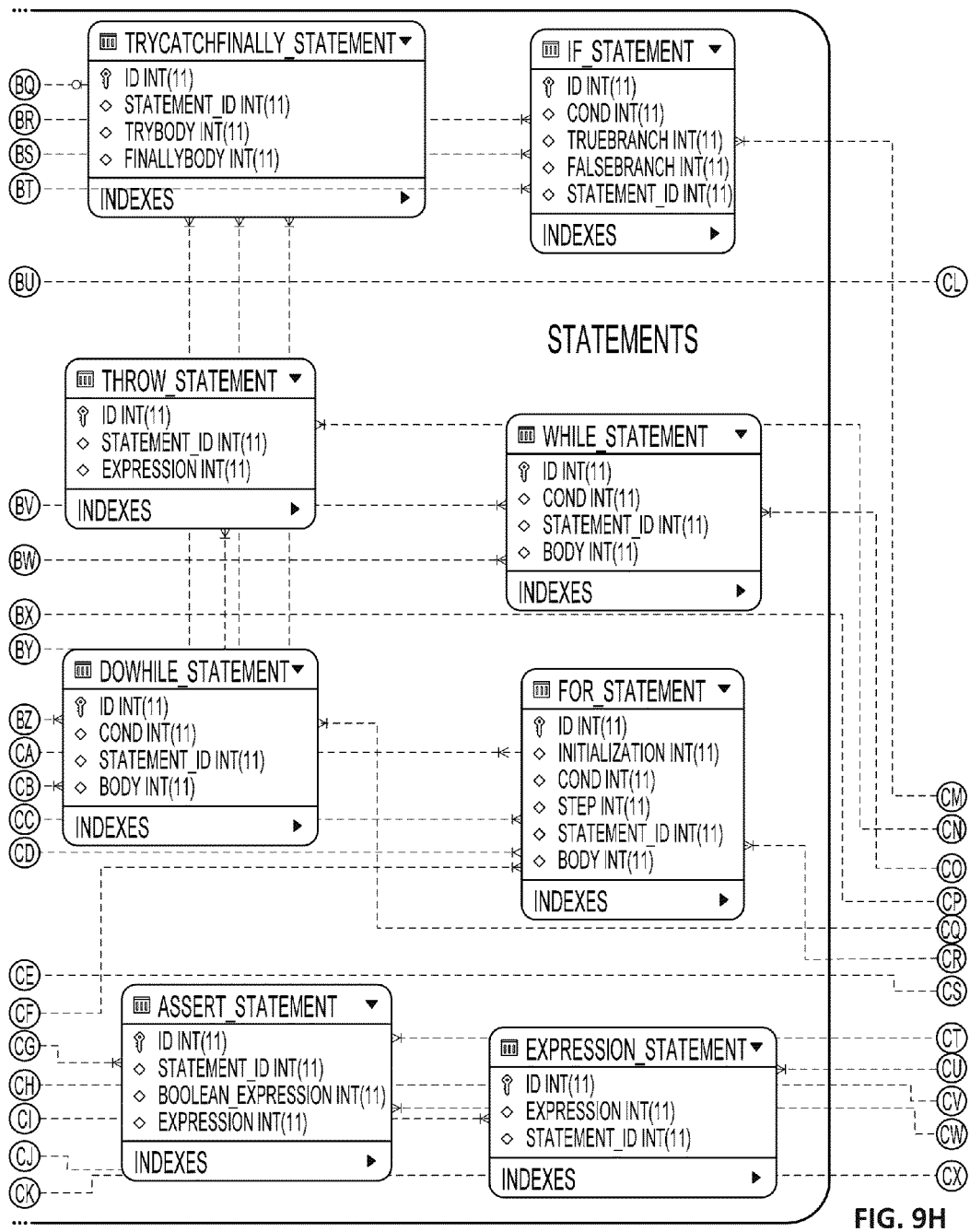
Figure 9I:
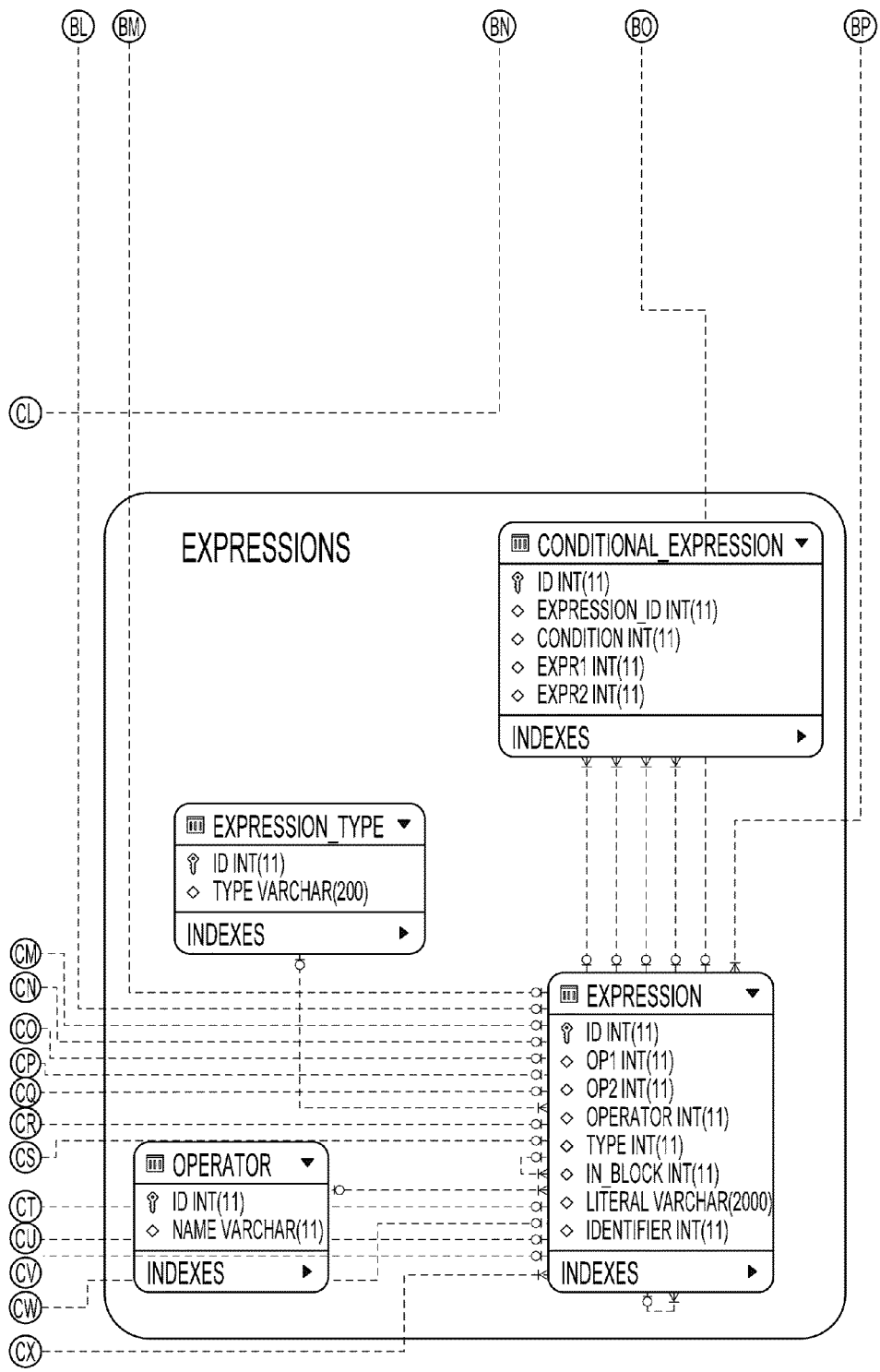

FIGS. 9A to 9I illustrate an example Entity-Relation diagram of the Java Language Structure database. In FIGS. 9A to 9I, each rectangle represents an entity, and lists all of its fields. Dashed lines between rectangles indicate dependency among them. The entities have been grouped in the following way:

at top-left of FIG. 9A—entities representing the source directory tree: projects, versions and subprojects.

at top-center spanning FIGS. 9A and 9B—entities representing files, packages and relative imports.

at top-right of FIG. 9C—entities involving types, declarations, variables, fields and modifiers.

at center-left spanning FIGS. 9A and 9D—entities relative to methods and constructors, including their parameters, modifiers etc.

at the center spanning FIGS. 9E to 9F—entities representing classes and interfaces.

at center-right of FIG. 9F—entities relative to enum types.

at bottom-left spanning FIGS. 9G and 9H—all the entities representing statements.

at bottom-right of FIG. 9I—entities that involve expressions.

The constructs of the Java language that involve the most entities to be described in a relational database are the statements, followed by methods and classes. Java provides to programmers many different statements, each one having its own structure. Methods and classes require many tables because they involve many one-to-many and many-to-many dependencies.

Figure 10:
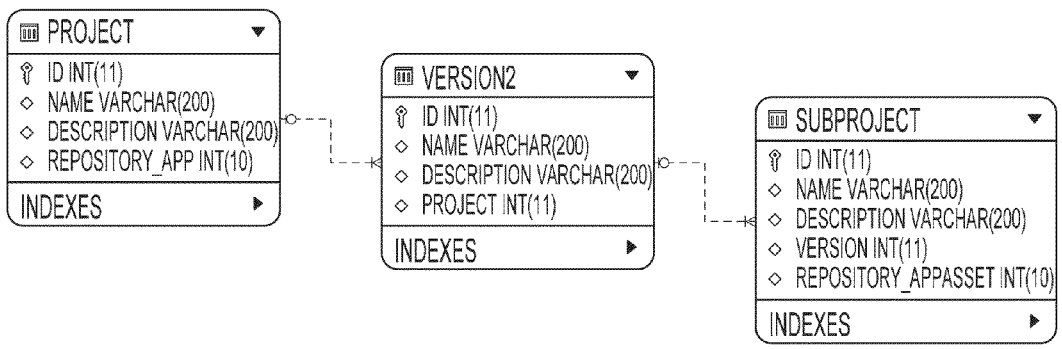

Tables representing the source repository structure store data about each project found by the crawler, all the versions available for each project, and all the archives that contain code (subprojects) for each version. FIG. 10 shows the tables 1000 created for that purpose.

Each one of projects, versions and subprojects has a name and description. The field version in table subproject is a foreign key referencing the version2 table. The project field in table version2 is a foreign key referencing the relative tuple in table project. The table containing version information has been named version2 simply to avoid using a reserved word of MySQL.

Figure 11:
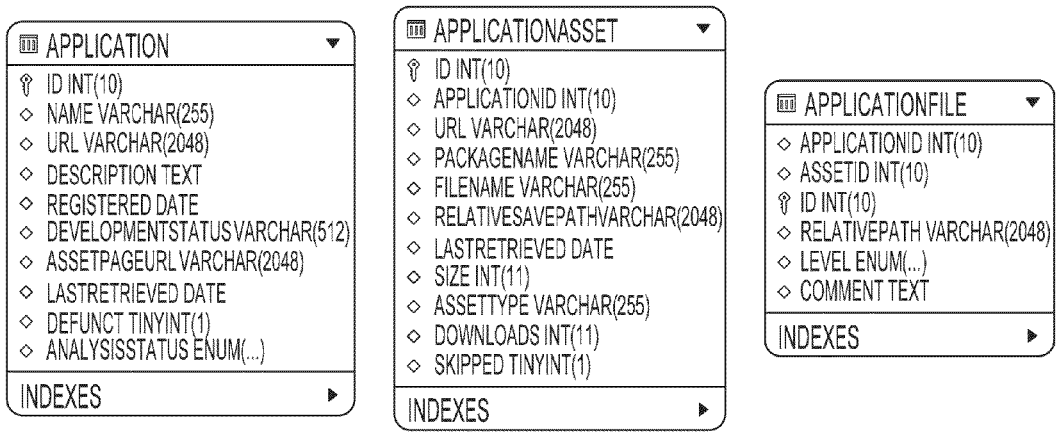

Fields repository app and repository appasset, in tables project and subproject respectively, reference the corresponding data in the tables imported from a third party database. FIG. 11 shows the tables 1100 imported from the third party database. The tables 1100 include descriptive information for applications.

Several additional pieces of information may be retrieved by matching the system collected data and the third party data. The additional pieces of information may include registration date, development status, last retrieval date, size, and number of downloads. A fraction of the database describes the file system structure of a single subproject, including source files, .class files and .jar compressed archives. For each source file, the database stores information about imported packages and classes.

Figure 12:
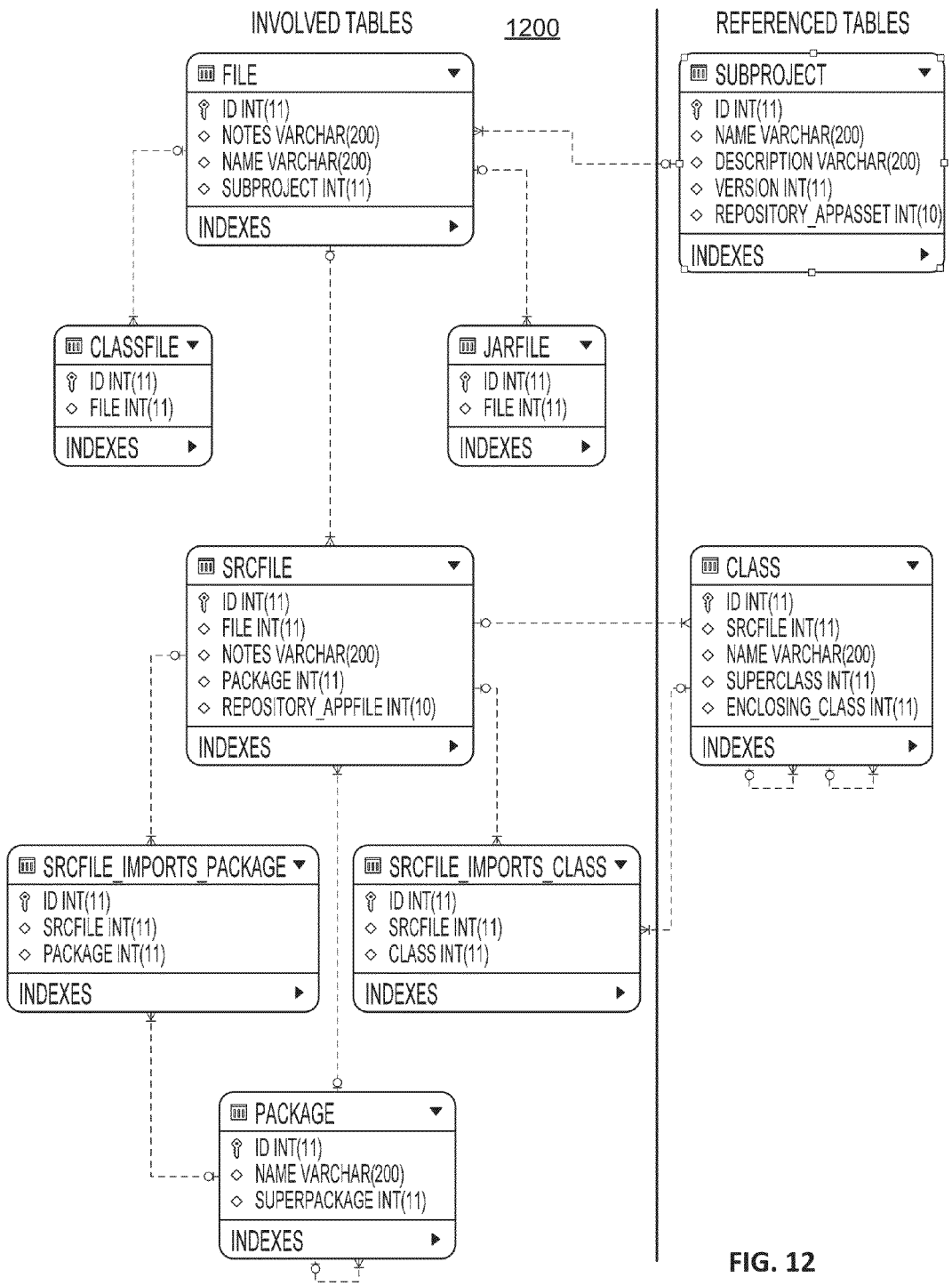

FIG. 12 shows the tables 1200 created to store that information. Each file has a filename. Directory information may not need to be stored because each file references the subproject to which it belongs. Files are possibly .jar files, .class files or source files. For each kind of file, specific information may be needed. Table srcfile has a foreign key to the corresponding table of a third party database.

Table package represents a Java package and, other than package name, contains a self-reference to enable the tracking of package hierarchies. For example, package java.lang.Object is described by three tuples: java, lang that contains a reference to java, and Object that contains a reference to lang.

FIG. 13 shows some example tuples 1300 in the populated package table. Note that some packages reference other packages, creating a hierarchy, while some packages do not reference anything because they are the root of a hierarchy.

The relation between srcfile(package) and package(Id) indicates to which package the source code belongs in that particular source file. The table srcfile imports package, instead, lists all the packages imported for each source file. This is a many-to-many relationship.

A source file also may import classes. Those imports are described in table srcfile imports class. Further, each class is linked to the source file where it is implemented.

Figure 14:
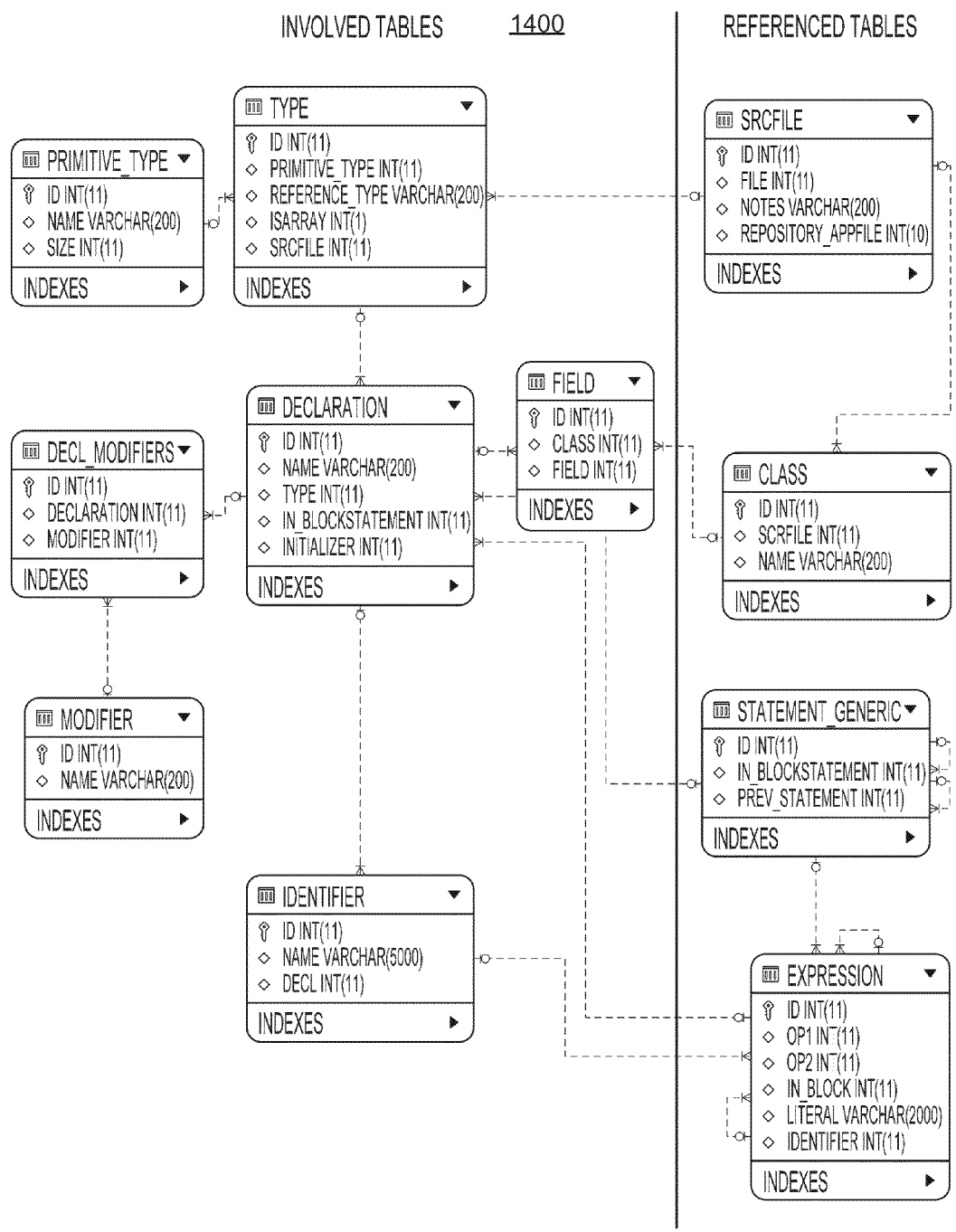

Tables may be used to store information about types, declarations, variables, fields, and modifiers. FIG. 14 shows those tables 1400 and their mutual relations.

Each type can be either a primitive type or a reference type. In the first case, the type references one tuple in primitive type table that contains the list of allowed primitive types. The list of primitive types is shown in the list 1500 in FIG. 15.

If the type is a reference type, a name is specified. In both cases, the system may set the field isArray to true if we are dealing with an array type, or to false otherwise. The field srcfile specifies the source file where the type is defined.

A declaration makes a new variable or field available of the specified type. A declaration is thus associated with a name and a type. Table decl modifiers lists all the modifiers present in each declaration. The modifiers are drawn from the table modifier, which lists all the possible modifiers for methods, classes, declarations etc. Those modifiers are listed in the list 1500 shown in FIG. 15.

The system may not make any distinction among modifiers allowed for methods, classes or declarations because the system does not check the correctness of the code. In this example, all the modifiers have the same syntactical role and, thus, can be listed altogether.

For a declaration, the corresponding scope (a block statement) is specified in the form of a reference to a tuple of the table statement generic. A declaration can also have an initializer (i.e. an initial assigned value). The initializer value is the evaluation of an expression, thus the field initializer references the table expression.

Finally, a declaration can produce a variable, or a field. In the latter case, the corresponding class is specified.

Figure 16:
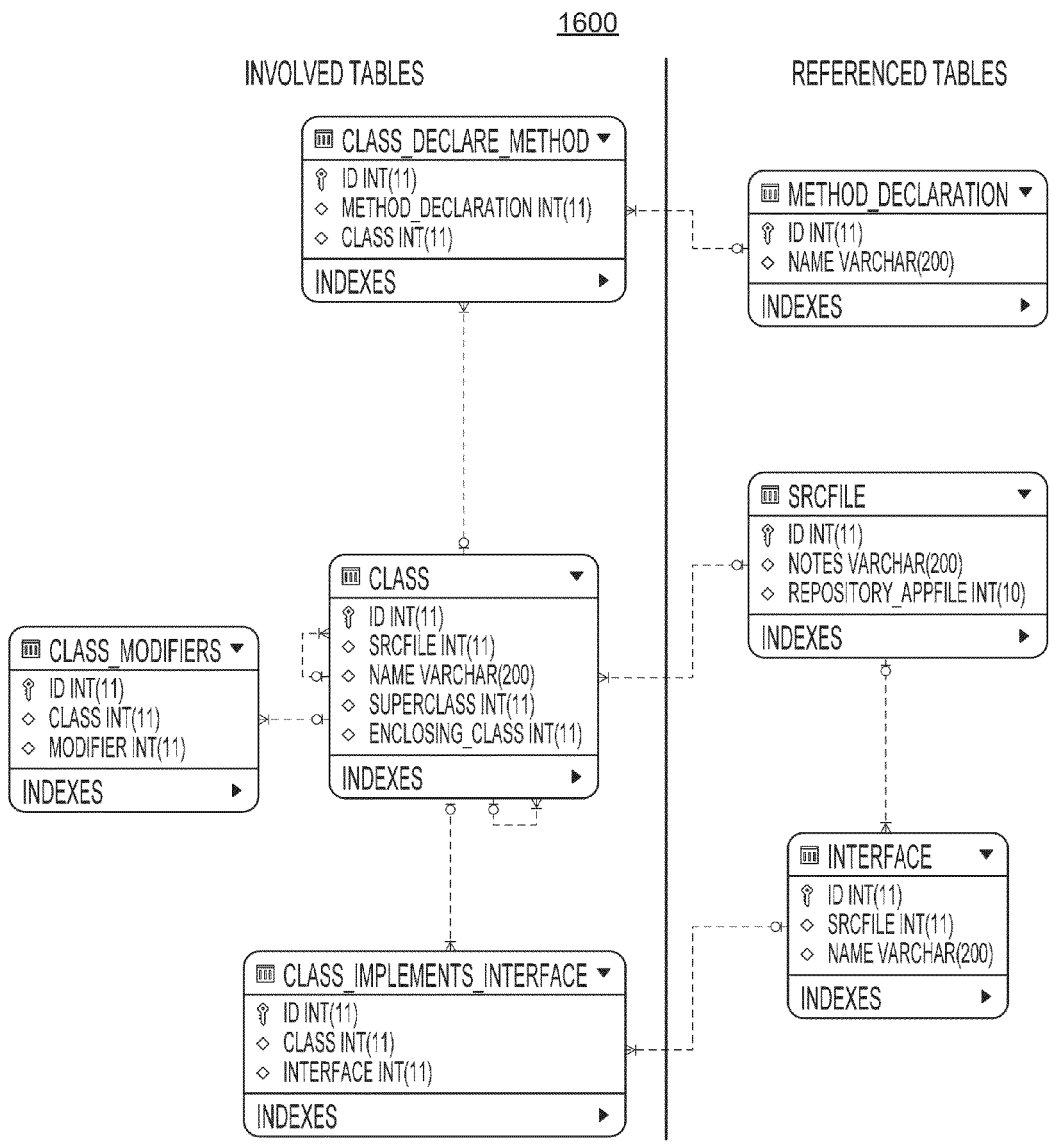

FIG. 16 illustrates the tables 1600 used to store information about classes. The table class holds the following information (1) the class' name, (2) a reference to the table srcfile, indicating in which source file the class is defined, (3) a self-reference in field superclass, indicating the superclass for this class, and (4) another self-reference in field enclosing class. This reference indicates, in the case of a nested class, in which other class this one was defined.

The table class declare method lists all the methods declared in each class. The table class modifiers lists the modifiers associated with each class. Those modifiers are drawn from the table modifier, the same containing method and declaration modifiers. The table class implements interface lists the interfaces implemented for each class.

Figure 17:
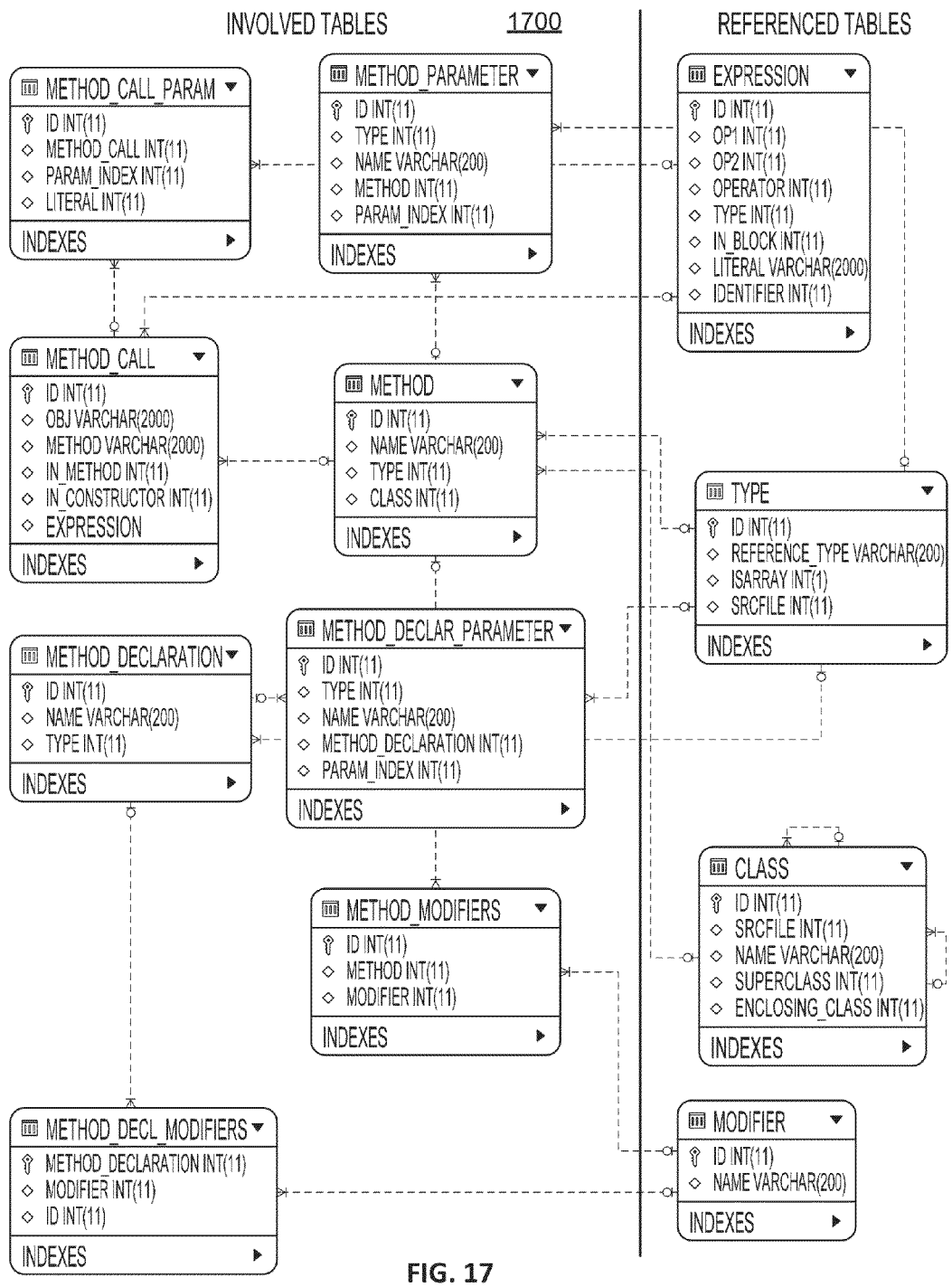

Method data includes method declarations, implementations, parameters, modifiers and method calls. FIG. 17 illustrates the tables 1700 used to store such information. Table method stores information about the implementation of a method, including: name, type (which is a reference to table type), and the reference to the class where the method is implemented.

Table method parameter stores information about formal parameters to be passed to a method: the type (referencing table type), the name, the reference to the corresponding method and a progressive number indicating the position of this parameter in the parameter list for this method.

Table method modifiers lists the modifiers applied for each method implementation.

Table method call contains information related to the invocation of a method. As discussed above, the system cannot determine at compile time the identity of the called method and its relative object. Thus, such information is represented as strings (not references) in fields obj and method. A reference is stored to the method or constructor where the method call is originated. Furthermore, a method call is a special kind of expression so, for each method call, there will exist a tuple in table expression, referenced from method call by the field expression.

Table method call param represents parameters passed in a method call. Since the type of the actual parameter cannot be statically determined, the system only stores the reference to the expression whose evaluation will give the parameter value (field literal), the reference to the relative method call, and the position of this parameter in the parameter list. Table method declaration is analogous to table method, but it refers to a method declaration (signature), not implementation. This table is referenced by tables class declare method and interface method to indicate that the declaration appears in a given class or interface. Information stored in table method declaration includes the name of the method and a reference to the type of the declared method. Table method decl parameter is similar to table method parameter and stores information relative to parameters for a method declaration. Finally, table method decl modifiers contains the modifiers specified for any given method declaration.

Figure 18:
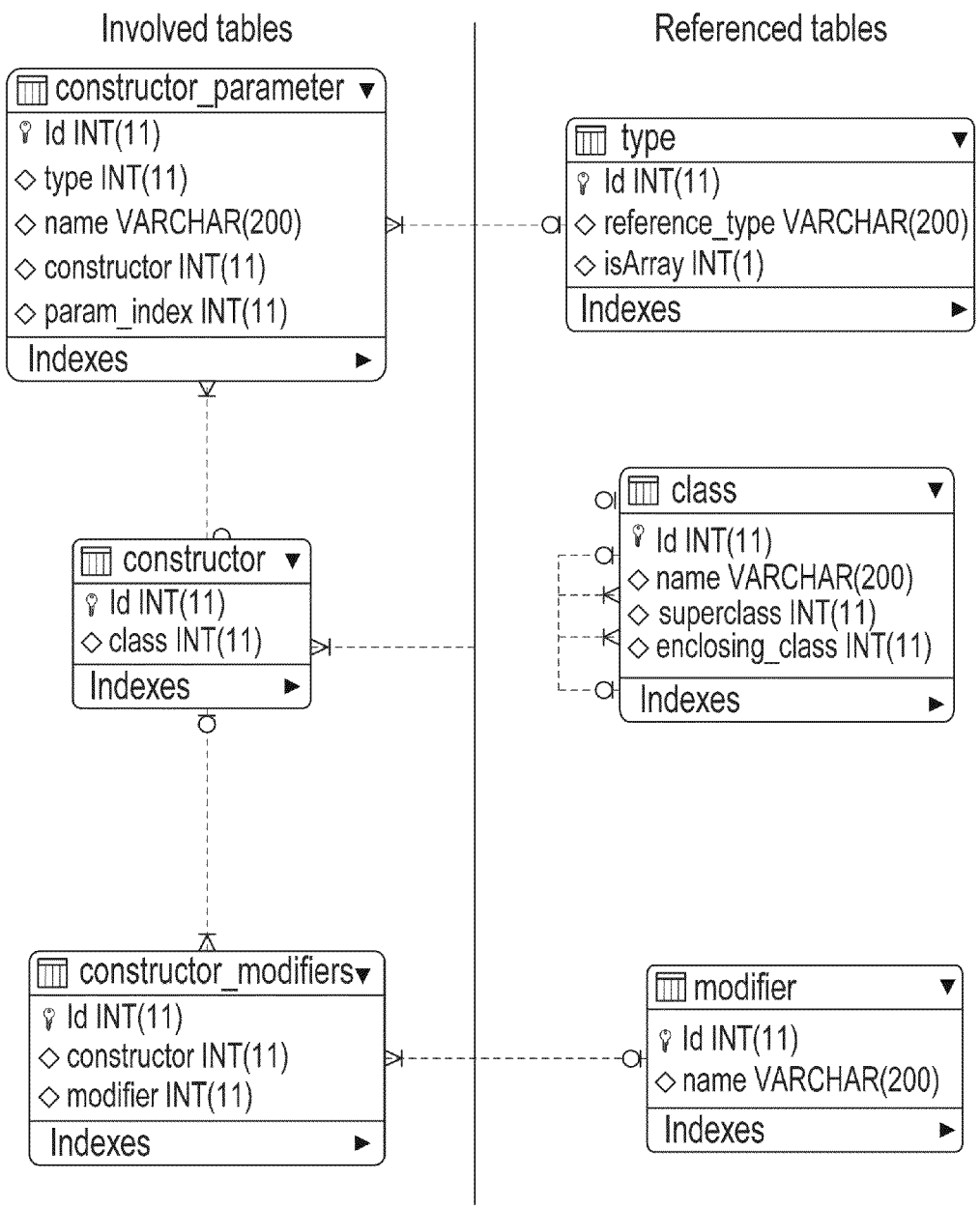

Constructor representation is similar to method representation. With constructors, the system does not need to provide a different set of tables for declarations. Further, all calls to constructors are implicit, so the system does not need to store information about constructor calls. FIG. 18 illustrates the tables 1800 used for constructors.

In table constructor, the system only keeps a reference to the class to which the constructor belongs. The system does not need to store the type because constructors do not have one, nor does the system need to store a name because constructors have the same name as their class.

Table constructor modifiers lists the modifiers applied to each constructor. Table constructor parameter describes formal parameters of constructors. This table is equivalent to method parameter for methods. For each parameter, the system stores its name, a reference to its type, a reference to its constructor, and the position of this parameter in the parameter list.

Figure 19:
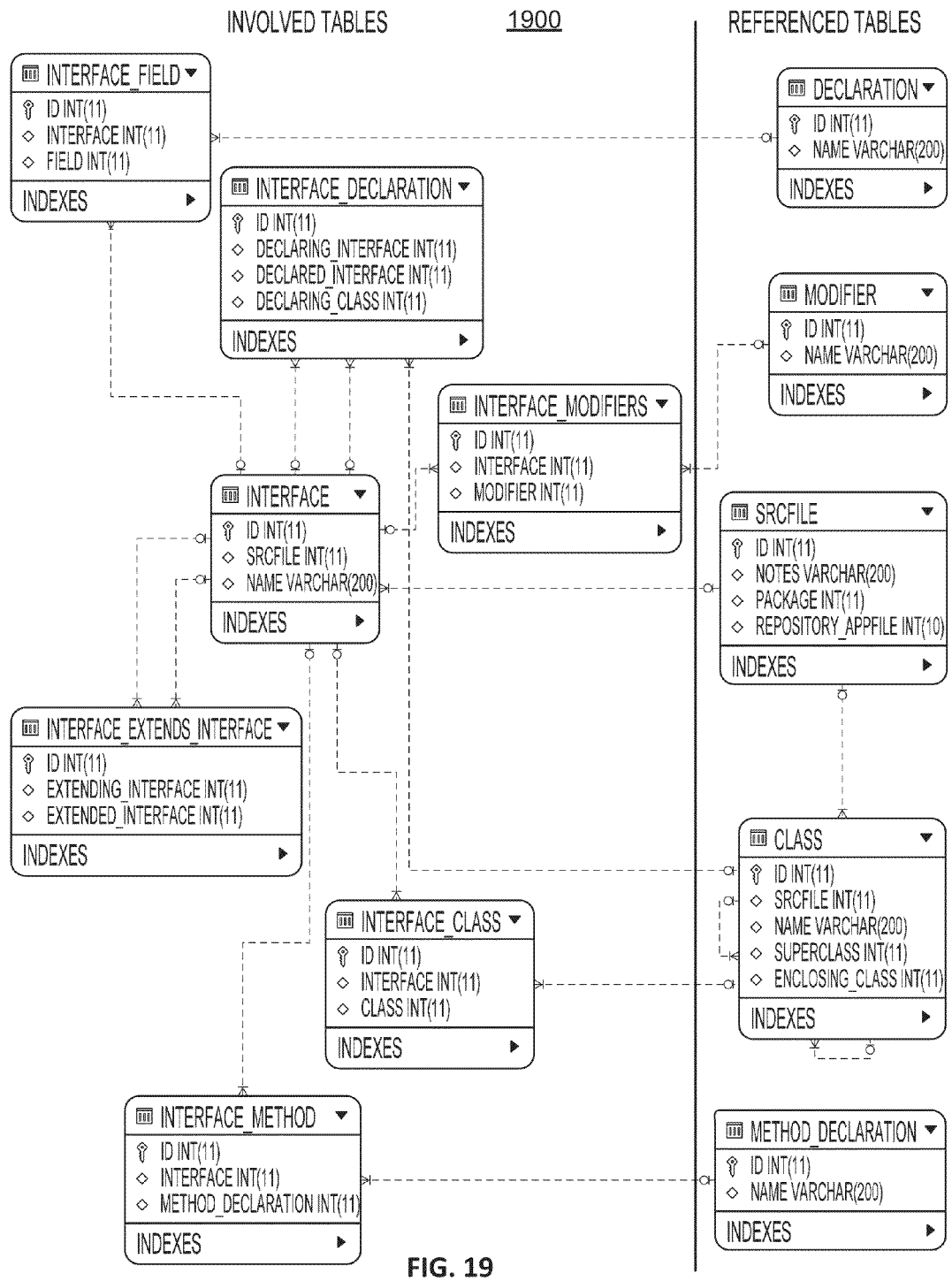

Interface-related data includes interface definitions, interface declarations, fields, modifiers, relations between interfaces, methods and classes. FIG. 19 illustrates the entity-relation subschema 1900 dedicated to interfaces.

Table interface stores the name of each interface and the reference to the source file where it is defined. Table interface modifiers contains the list of modifiers applied to each interface. Table interface field represents fields declared in each interface, and references table declaration. Table interface declaration contains data relative to interface declarations in classes or other interfaces. Each interface can implement zero or more interfaces. That information is stored in table interface extends interface. This table has two references to table interface: one for the implemented interface and one for the interface that implements it. Table interface class has the purpose to store data relative to interfaces declaring classes. Finally, table interface method stores data of interfaces declaring methods.

Figure 20:
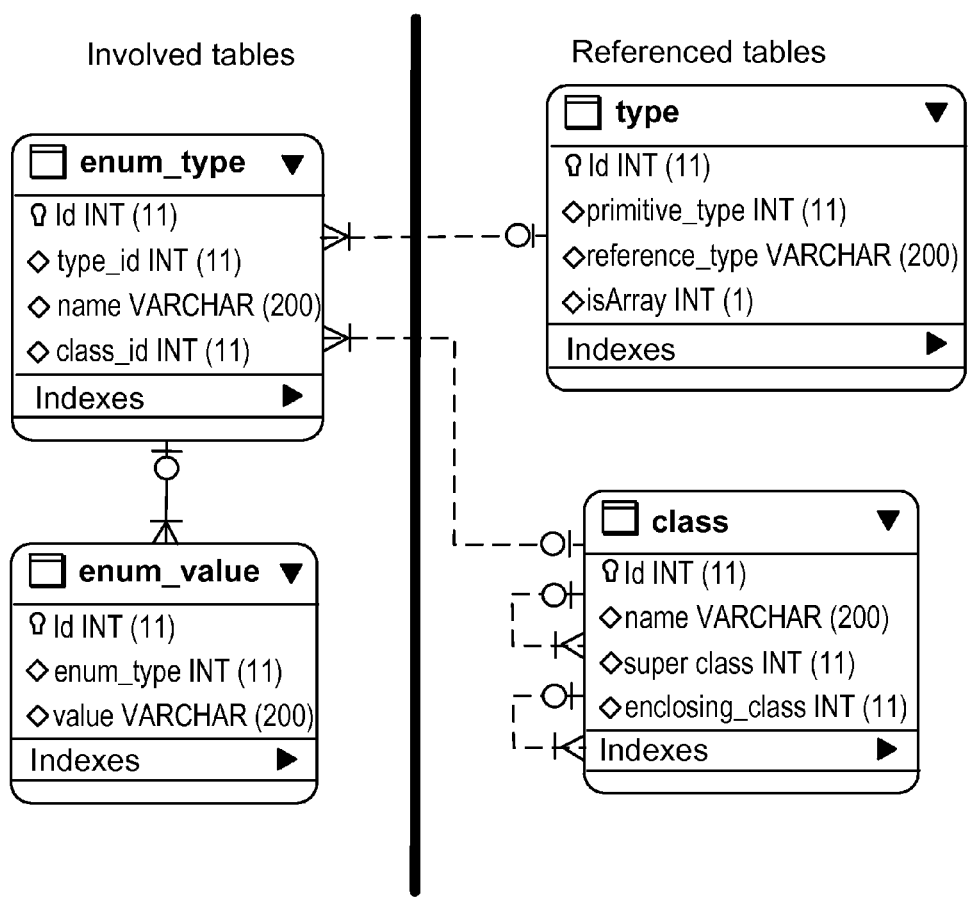

FIG. 20 illustrates the structure 2000 provided to represent information involving enum types. Table enum type contains data needed to represent an enum type:
  the name of the defined enum type;
  the reference to the corresponding element in table class.
    For instance, en enum type is a specialized version of a class, thus the system uses a tuple in table class for each enum type, and keeps a reference with the corresponding tuple in table enum type.
  the reference to the corresponding tuple in table type.
    Enum types are a kind of types and should be included in the table representing all the types.

Table enum value represents, for each enum type, all the possible values. All of the other information about enum types, including source file where they belong, declarations of methods, interfaces extended and others, are kept in structures used for classes.

Expressions cannot be evaluated at compile-time. For this reason, the system only stores information about expression syntax, and not evaluated values and types. The system represents most expressions, regardless of their type, using a recursive mechanism that works as follows:
  a complex expression can be thought as a compound operand, eventually followed by an operator and another compound operand;
  each compound operand can be recursively decomposed to a complex expression, until the system has only basic operands;
  when an operand (eventually after decomposition of a compound operand) is a basic operand, it can be either a literal (value) or an identifier (variable).

Figure 21:
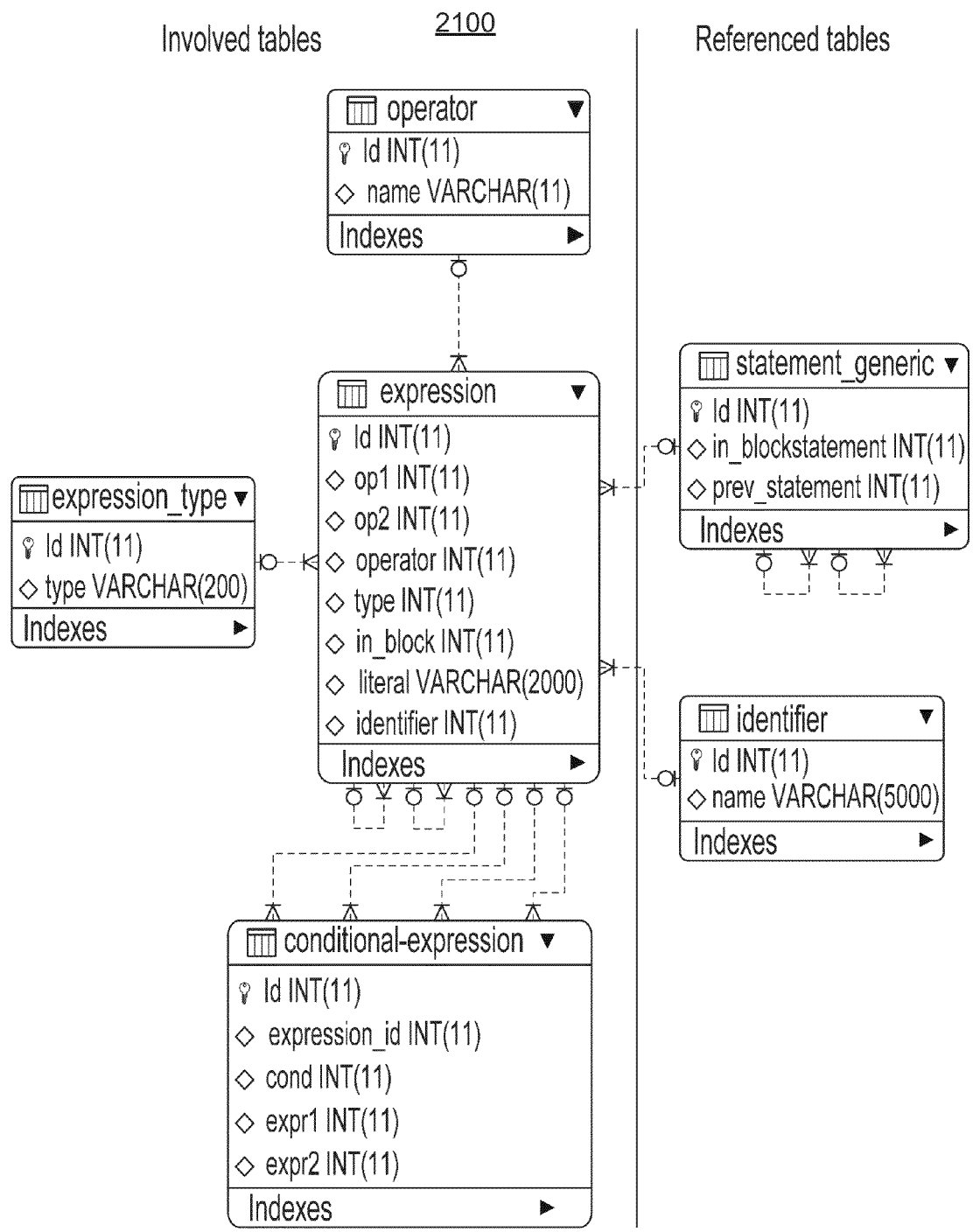

FIG. 21 shows the tables 2100 used for expressions representation. Table expression contains fields to store the above described operands (fields op1 and op2 that are self-references to expression), the operator (field operator that references an external table), and the literal value or the identifier reference. Further, table expression contains a reference to the block statement where the expression belongs, and a reference to the particular expression type.

Operators are drawn from the table operator that lists all of the operators allowed in Java. The system does not check or distinguish operators allowed for a particular expression in this example because the system does not check code correctness. FIG. 22 shows the contents of table operator 2200.

Each expression and subexpression obtained by recursive decomposition is an expression of one of the types listed in table expression. FIG. 23 shows the content of the expression table 2300. These are not the types of the evaluated values, since those are only determined at run-time. Conditional expressions have a structure that cannot be represented with the mechanism explained above. For this reason, the system does not include the specific table conditional expression in this example, but that type of table may be used in other implementations that can represent the structure of conditional expressions.

A conditional expression may have the syntax—condition-?if_true:if_false. The value of the expression is the one given by the evaluation of if true if condition is true, otherwise it is given by the evaluation of if false. Table conditional expression stores condition in field cond, if true in field expr1, if false in field expr2. A reference to table expression also may be used because a conditional expression is an expression too, and is included in that table. In table expression, the system has a tuple with expression type referencing 'Conditional' and the fields op1, op2, operand, literal and identifier set to NULL.

Method calls are handled in a different set of tables. Those tables have a reference to a tuple in table expression having fields op1, op2, operand, literal and identifier set to NULL. The corresponding expression type is MethodCall.

Expressions have a common mechanism to store most types of expressions. With statements, the system provides different structures to represent each one of the statements allowed in Java.

Figure 24A:
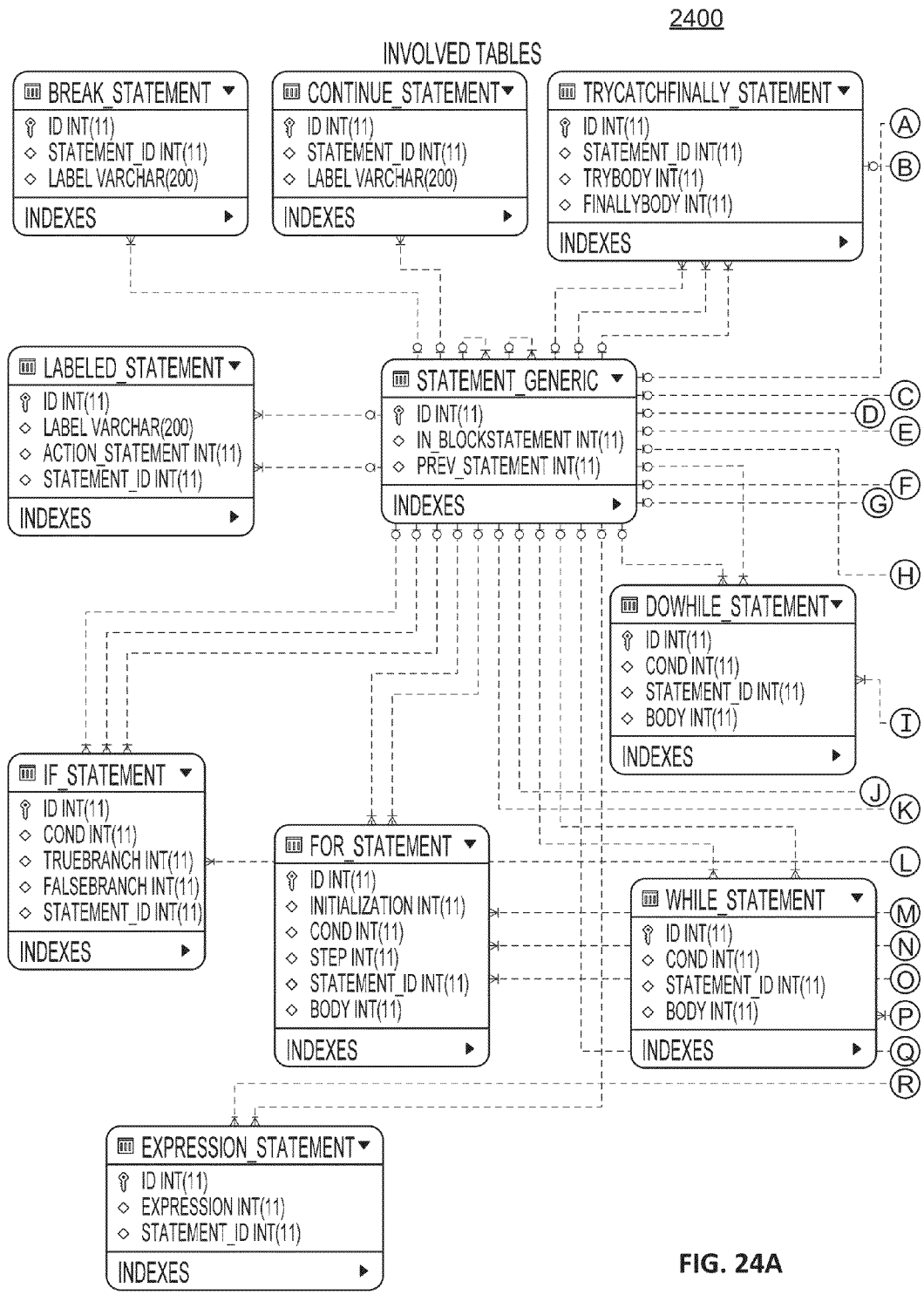
Figure 24B:
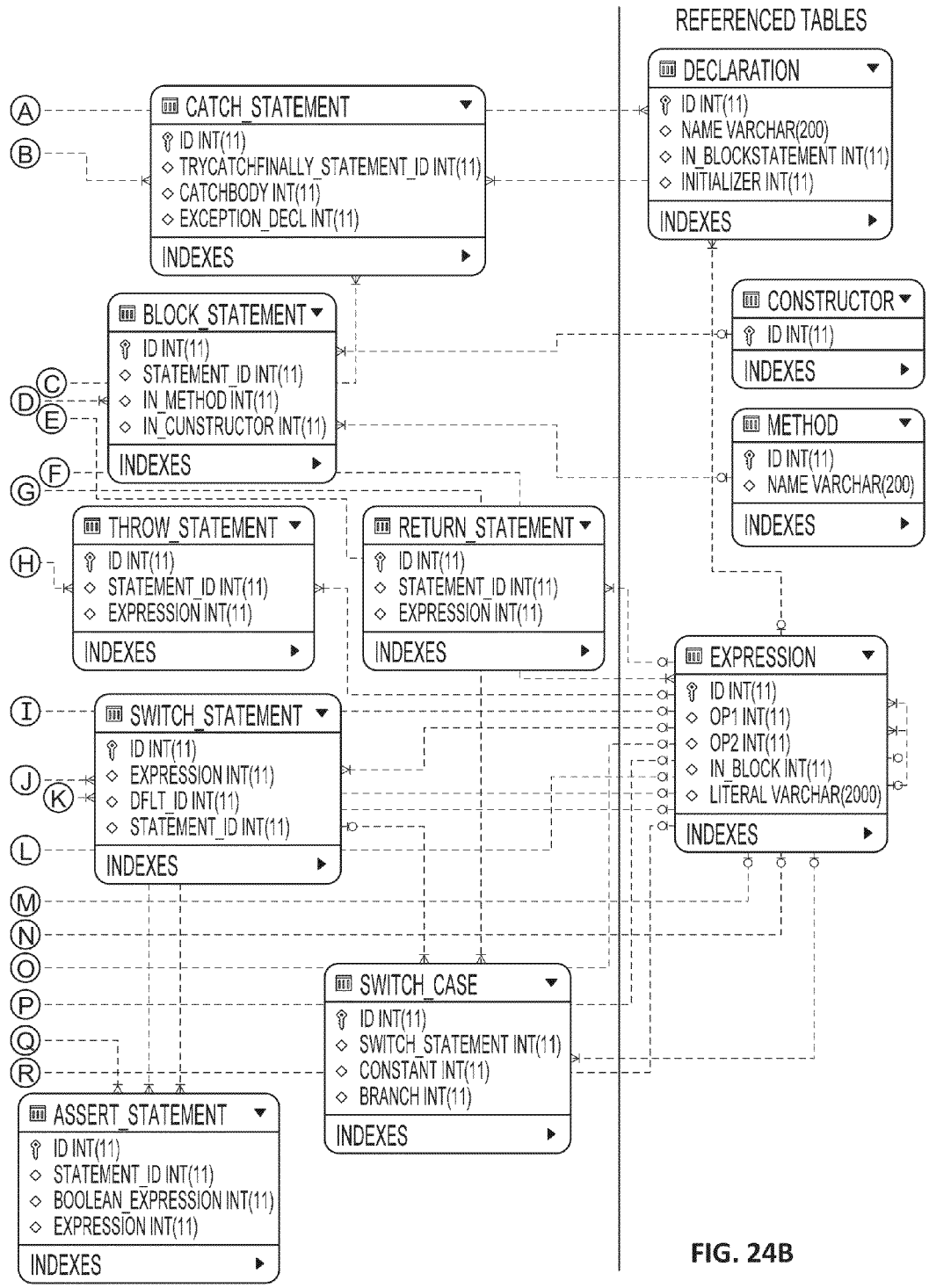

FIGS. 24A to 24B show the complete entity-relationship subschema 2400 of the Java Language Structure Database dedicated to statements. For each statement of any type, in addition to the information below, a reference to a tuple in table statement generic is made. Table statement generic table contains information about the position of each statement in source code: the block statement where it belongs (field in blockstatement), and the previous statement in the same block statement (field prev statement). In this way, it is possible to retrieve the sequence of statements in any given block statement. Both in blockstatement and prev statement are self-references to statement generic. The system uses specific tables for the following statements:
  Break and continue statements. They are represented in tables break statement and continue statement. They contain a string field for the optional label.
  Try-catch-finally statements. Table trycatchfinally statement has one field for the try body and one field for the optional finally body. Both are references to a generic statement. Multiple catch blocks may be present, thus there is a specific table for catch blocks. This table (catch statement) has one reference to the relative try-catch-finally statement, a reference to the generic statement that implements the catch body, and a reference to the declaration of an exception.

Block statements. For each block statement we store in table block statement a reference to the method or constructor where the block statement belongs.

Return statements. The table return statement stores the optional return expression in form of a reference to table expression.

Labeled statements. We need to store the label, which is a string value, and a reference to the relative action statement. That information is in table labeled statement.

Throw statements. The only information stored in throw statement is an expression whose value specifies the exception to be thrown. This is a reference to table expression.

Do-while statements. Information contained in dowhile statement includes a reference to the statement implementing the do-while body and a reference to the expression representing the loop condition.

While statements. Table while statement has an identical structure with respect to dowhile statement.

Switch statements. Table switch statement contains a reference to the generic statement implementing the default case and a reference to the expression to be evaluated. Information relative to each case is stored in table switch case: the corresponding switch statement, the case constant (referencing expression), and a reference to the first statement to be executed if this branch is taken (branch).

For statements. Table for statement contains the information about for loops: the reference to the generic statement representing the body of the loop, the expression references relative to initialization, condition, and step. If initialization involves a variable declaration, a tuple is added in table declaration with a reference to the body statement of this for loop, which will be the scope of the variable.

If-then-else statements. For those statements, table if statement contains a reference to expression for the condition of the if statement, and two references to statement generic: the block statement relative to the then case and the one relative to the optional else case.

Expression statements. Table expression statement only needs to contain the reference to the relative expression.

Assert statements. For those statements, the system stores into table assert statement two references to expression: one for the Boolean expression to be evaluated, and one for the optional expression to be used if the assertion fails.

In some implementations, normalization may be performed on the Java Language Structure Database. In these implementations, the Java Language Structure Database has, for each table, an auto-calculated integer field called Id as the primary key. In this regard, the system may insert new data into tables without paying attention to the primary key, and the system may easily handle external references because all referenced fields are integer. Further, in the case that data are only inserted, not deleted, the number of rows in each table is visible in a straightforward manner by listing table contents.

All the tables in the database may be in First Normal Form, because a unique primary key always exists and all attributes are single-valued. The database may also be in Second Normal Form. Since the primary key is a single attribute, attributes that depend only on a subset of the primary keys do not exist.

Not all of the tables are in Third Normal Form. As an example, the table enum type has its own primary key (the Id field). Since an enum type is a class, a field class id exists that references the primary key of the table class. This way, the field class id determines every non-key attribute in the enum type table.

Below, an example system setup is described, pointing out the tasks needed to achieve results. An architecture on which the system has been run in this example is described, evaluating its performance and analyzing the errors encountered.

In this example, the results are extracted by database queries which are written according to leverage the Java programming language usage. The process of writing these queries comes out after a study of the programmers common interests about Java programming language. Finally, the results obtained are shown and interpreted, reporting interesting statistics about Java programming language.

The multithreaded crawler, the Java parser and the Java Language Structure Database were run on a two core architecture. A test on the two core architecture was carried out over about 300 MB of Java projects and it took about twelve hours to be completed.

Once the Database has been populated, it contains a huge amount of data regarding the Java programming language. To extract information from the database, queries against the database are used. For example, queries may be used to extract information that answers one or more of the following questions:

Is the class "Arraylist" used more frequently than the class "Vector" as a collection of elements?
  How frequently is the "for" loop used as a non-counting loop?
  Is the command "break" frequently used to exit a loop?
  Is the statement "switch" used more frequently than the statement "if" to branch an execution flow?
  Which is the most used sorting process on a class of type "collection"?
  Which are the most used file handlers? Is Buffered writing/reading frequently used?
  Is the command "throws" used more frequently than the construct "try-catch" to deal with exceptions?
  Is the "finally" block frequently used after a "try catch" construct?
  Are the concepts of static class and multithreading strongly related?
  How does the number of variables change in different versions of the same program?
  Are the primitive types (int) used more frequently than the object types (Integer)?
  How frequently is recursion used?
  Have bugs been fixed across different versions of the same project? Do new bugs come out after fixing other bugs? How frequently?
  How often is reflection used?
  How often is the class "Enumeration" used to iterate on a list of objects?
  Which is the most frequent exception?

The above questions aim at giving an idea of the information that can be extracted from the Database. Other information can be extracted based on the queries designed to search the database.

In some examples, more than one query is needed to produce statistics. For instance, in the first question of the above list, to analyze the usage of "Arraylist" or "Vector" classes the system has to first count how many times the class java.util.Vector is utilized by searching on the joining of tables "declaration" and "type" and then, do the same for the class java.util.Arraylist. The two queries are:

SELECT count(*) AS Vcounter FROM declaration JOIN type WHERE declaration.type=type.id AND (type.reference type="java.util.Vector" OR type.reference type="Vector")

SELECT count(*) AS Acounter FROM declaration JOIN type WHERE declaration.type=type.id AND (type.reference type="java.util.Arraylist" OR type.reference type="Arraylist")

Vcounter and Acounter respectively contain the number of times the class "Vector" and "Arraylist" is used in a 250 GB repository of Java projects. The use of "OR" is due to the fact that classes sometimes are stored in the database including their belonging package and sometimes not. So the first simple analysis is done and the numerical values can be put in a table:

TABLE I

| ARRAYLIST VS. VECTOR | |
| --- | --- |
| Object Counter | Fraction |
| Acounter | Acounter/(Acounter + Vcounter) |
| Vcounter | Vcounter/(Acounter + Vcounter) |

Another interesting query that can be performed relates to comparing the number of times the "switch" and "if" statements are used to branch the execution flow of a program. Two queries are necessary:

SELECT count(*) as ifCounter FROM if statement

SELECT count(*) as switchCounter FROM switch statement

The first query returns the number of tuples of table if statement which contains all the "if" statements used, while the second query contains all the "switch" statements. By calculating the size of these two tables, we obtain respectively the "ifCounter" and the "switchCounter" that can be compared to show whether the "if" statement is preferred to the "switch" statement.

For instance, results of may be provided in the following table:

TABLE II

| IF VS. SWITCH | |
| --- | --- |
| Statement Counter | Fraction |
| ifCounter | ifCounter/(ifCounter + switchCounter) |
| switchCounter | switchCounter/(ifCounter + switchCounter) |

Moreover, it may be interesting to analyze how frequently recursion is used. Some programmers prefer to use recursion rather than loops, while others do not. In order to extract this information, the system performs a more complicated query which joins the content of the two tables "method call" and "method". The first one contains all the method calls found in the Java projects, while the second one contains the name of the methods. Once these tables have been joined, the system selects only the methods that call themselves by comparing the names of the caller and the callee. If these two names are equal, the system identifies the method as being a recursive method. The "group by" clause is necessary since a recursive method may call itself more than once, and then the query has to count it only once. Notice that the nested query returns a table of "count" entries that are also counted by the outer selection to extract the number of recursive methods.

SELECT count(*) AS recMetCounter FROM (SELECT count(*) FROM method call JOIN method WHERE method call.in method=method.id AND method call.method=method.name GROUP BY method.id) AS t1. This number is useful only if compared with the total number of methods.

SELECT count(*) AS metCounter FROM method.

The obtained results are contained in the following table:

TABLE III

| RECURSION STATISTICS | | |
| --- | --- | --- |
| Recursive Methods | Total Methods | Fraction |
| recMetCounter | metCounter | recMetCounter/metCounter |

Finally, an example query may extract the number of times the primitive type "int" is used and the number of times the complex type "Integer" is preferred. First, the system extracts the number of "Integer" class declarations by joining the content of tables "declaration" and "type":

SELECT count(*) AS integerCounter FROM declaration JOIN type WHERE declaration.type=type.id AND (type.reference type="java.lang.Integer" OR type.reference type="Integer")

Second, the system extracts the number of "int" declaration by also joining the table "primitive type":

SELECT count(*) AS intCounter FROM declaration JOIN type WHERE declaration.type=type.id AND type.primitive type=(SELECT id FROM primitive type WHERE name="int")

The results are contained in the following table:

TABLE IV

| INTEGER VS. INT | |
| --- | --- |
| Type | Fraction |
| integerCounter | integerCounter/integerCounter + intCounter |
| intCounter | intCounter/integerCounter + intCounter |

Further to the above information extracted from the database, additional information may be extracted, stored, and used to improve software quality. The system retrieved results with full statistical information, including:

Total number of elements analyzed (population size);
Population average;
Population median;
Maximum;
Minimum;
Root mean square;
Variance;
Kurtosis;
Skewness;
Confidence interval (at 95% confidence level).

The system evaluates several research questions whose scope include different aspects of the language features, from classes and methods to recursion use, from usage of type String to null assignments to static fields. FIG. 25 shows a table 2500 with example Research Questions along with the corresponding retrieved statistical data.

The system collected information about 270973 Java classes that are contained in 2080 Java applications. Out of these classes, 5827 or a little over 2% are declared as abstract.

Figure 26:
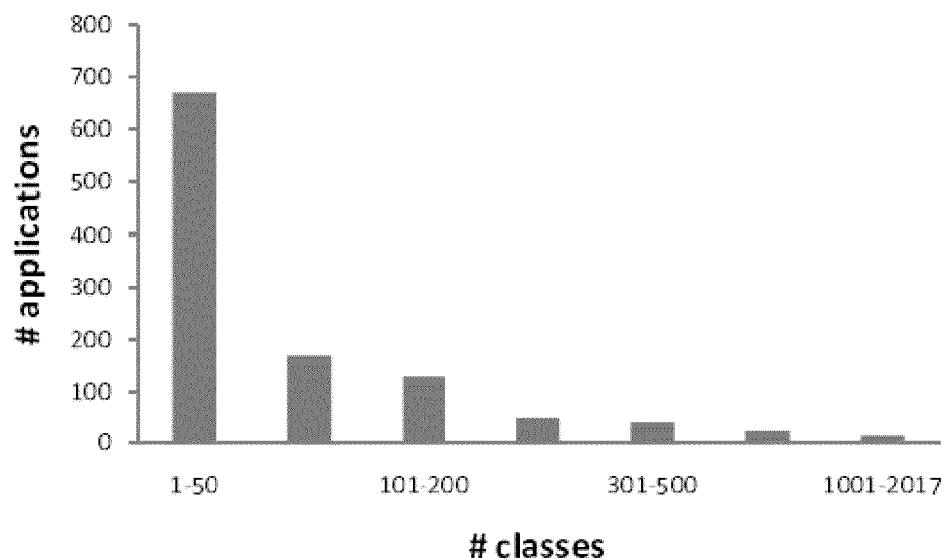

On average, a Java application contains close to 97 classes (median 33) with the range from 1 to 2017 classes. FIG. 26 illustrates a histogram 2600 of the distribution of classes per application. The horizontal axis shows the range of classes for each bar, whose height shows the number of applications that contain this range of classes.

Figure 27:
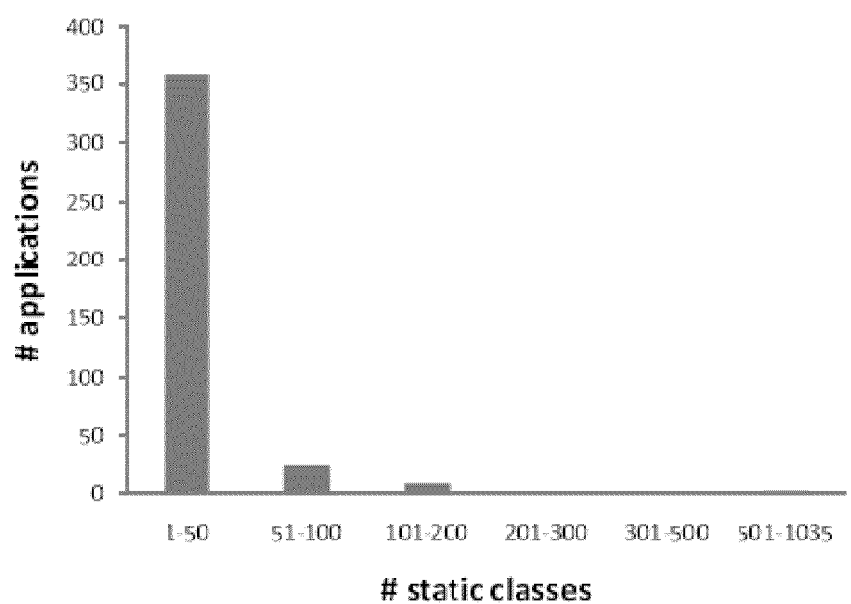

There are 7368 static classes, less than 3% of the total number of classes. In a population of Java applications that contain static classes, an application contains close to 7 static classes on average (median is equal to zero) with the range from 0 to 1035 static classes. FIG. 27 illustrates a histogram 2700 of the distribution of static classes per application.

Figure 28:
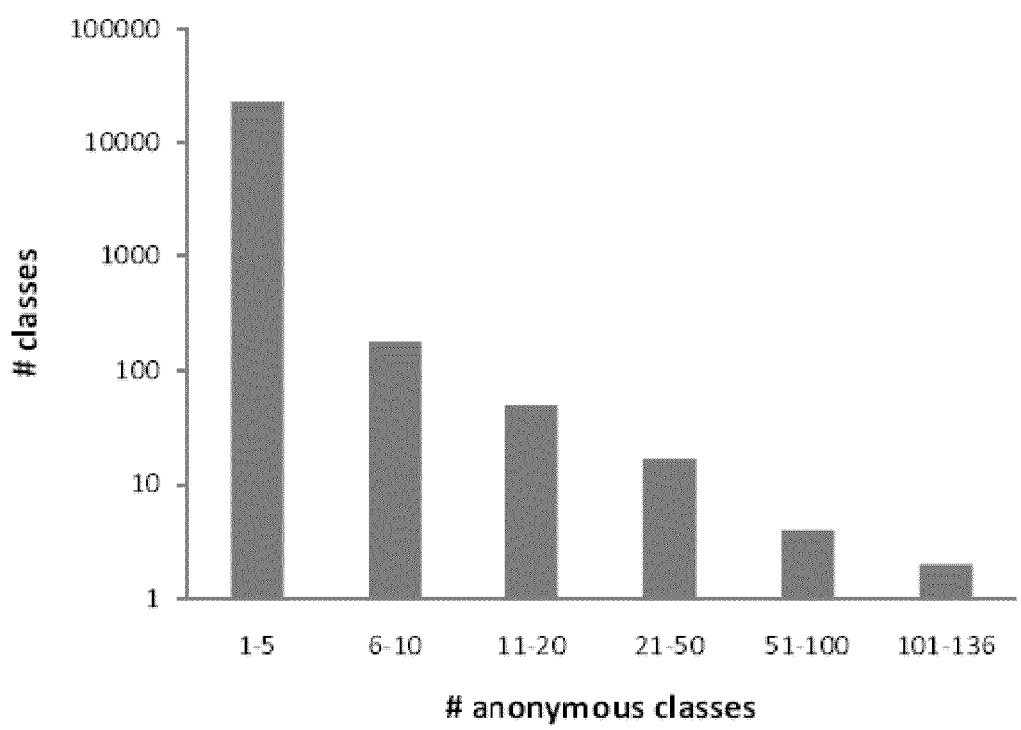

There are 29237 anonymous classes, less than 11% of the total number of classes. FIG. 28 illustrates a histogram 2800 of the distribution of anonymous classes per container class using a logarithmic scale.

Figure 29:
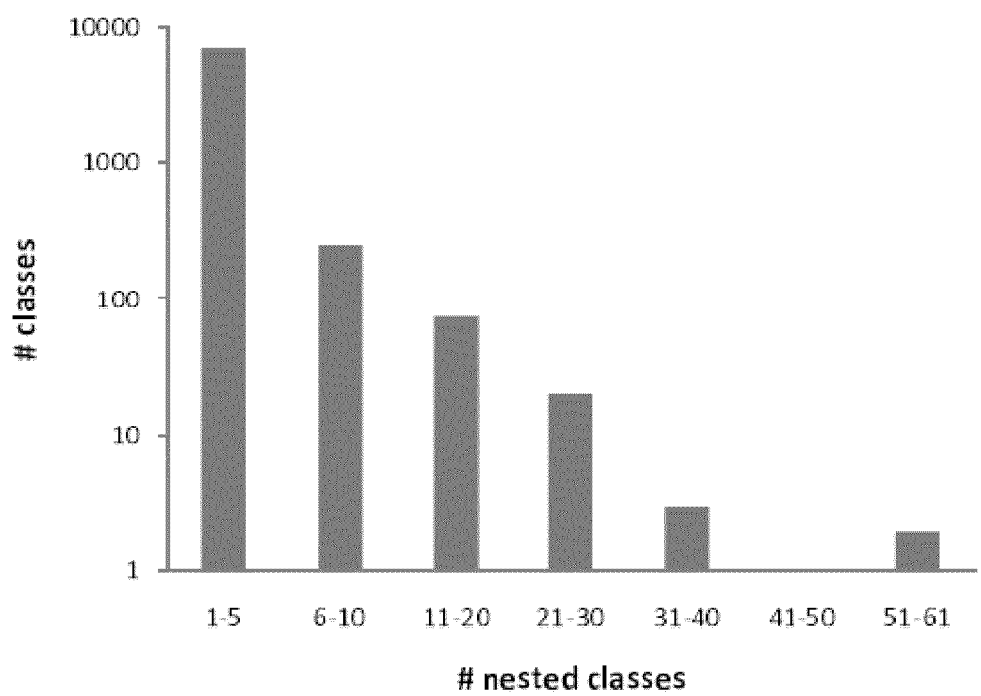

There are 14270 nested classes, less than 6% of the total number of classes. FIG. 29 illustrates a histogram 2900 of the distribution of nested classes per container class. The horizontal axis shows the range of nested classes for each bar, whose height (using the logarithmic scale) shows the number of classes that contain this range of classes.

Figure 30:
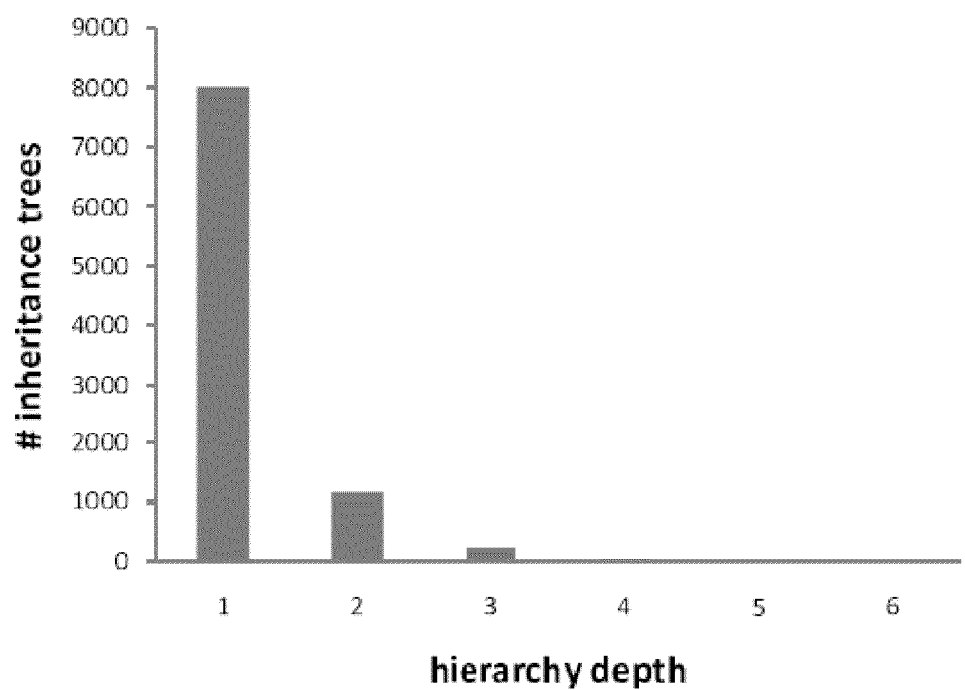

Inheritance is a mechanism of object-oriented programming that allows reuse. To determine how programmers use inheritance, the system computed all inheritance hierarchies of depth one or more. Implicitly inheriting from the class java.lang.Object was not counted. Out of a total of 11298 hierarchies, 8008 or almost 71% have depth one. The maximum inheritance depth that the system found is five. FIG. 30 illustrates a histogram 3000 of the distribution of inheritance trees per inheritance depth.

The horizontal axis shows the depth of inheritance for each bar, whose height shows the number of independent inheritance trees. For example, one application contained the maximum level of inheritance hierarchy. It contains 963 Java classes with the total of 228076 lines of code. One inheritance hierarchy is AdminIpAccess-IpAccessControl-Lockss-Servlet-HttpServlet-GenericServelet-Object. All the classes are located in the package org.lockss.uiapi.commands. The semantics of this inheritance hierarchy has something to do with implementing a command protocol. There are 115453 classes that do not inherit explicitly from any class versus 116194 classes that participate in some inheritance hierarchies. That is, almost 50% of classes are written without using inheritance.

Figure 31:
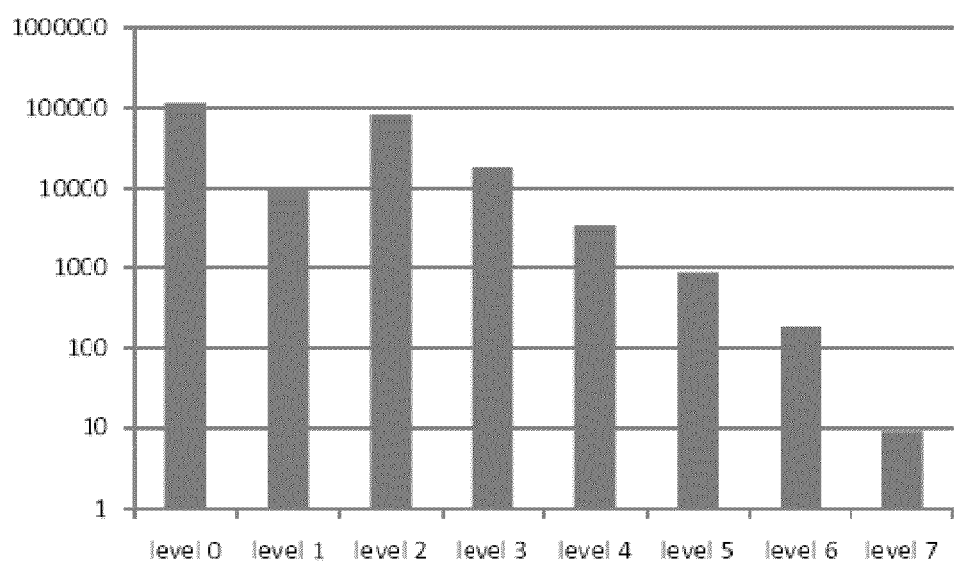
Figure 32:
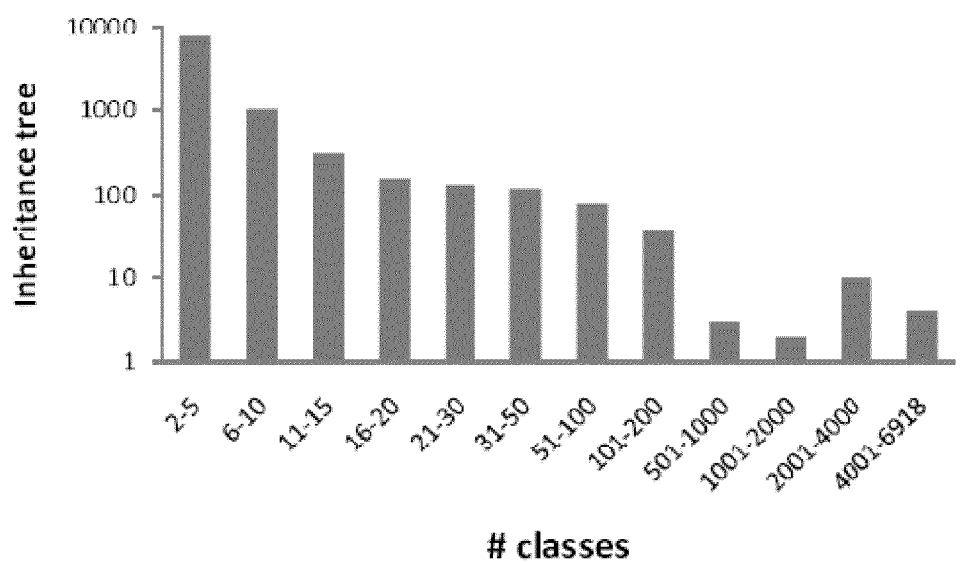

There are 9467 classes or 4% that are the roots on inheritance trees. FIG. 31 illustrates a histogram 3100 of the distribution of classes per inheritance depth using a logarithmic scale. The horizontal axis shows the depth of inheritance for each bar, whose height shows the number of classes that belong to the inheritance trees of the given depth. FIG. 32 illustrates a histogram 3200 that shows how classes are distributed among inheritance trees using a logarithmic scale. A majority of inheritance trees (i.e., more than 80%) contain from two to five classes. Less than 9% of trees contain more than ten classes. The median is three classes per inheritance hierarchy.

Figure 33:
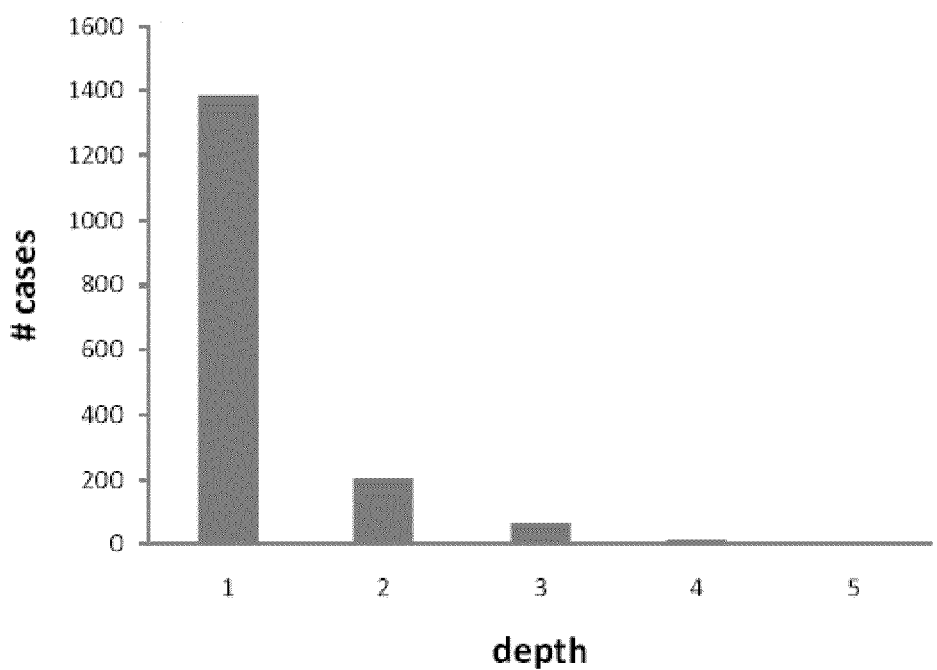

Interface implementation is a mechanism for subtyping in object-oriented programming. To determine how programmers use interface implementations, the system computed all hierarchies of depth one or more. Out of a total of 2026 interface extend hierarchies, 1664 or more than 82% have depth one or more. The maximum depth that the system found is five. FIG. 33 illustrates a histogram 3300 of the distribution of interface extend trees per depth. The horizontal axis shows the depth of interface implementation hierarchy for each bar, whose height shows the number of independent interface trees.

There are 17254 methods that are overridden in derived classes, or less than 2% of the total of 938779 found methods. The system found that, in parent/child class relationships, 1.6 methods are overridden on average with the median equal to one.

Figure 34:
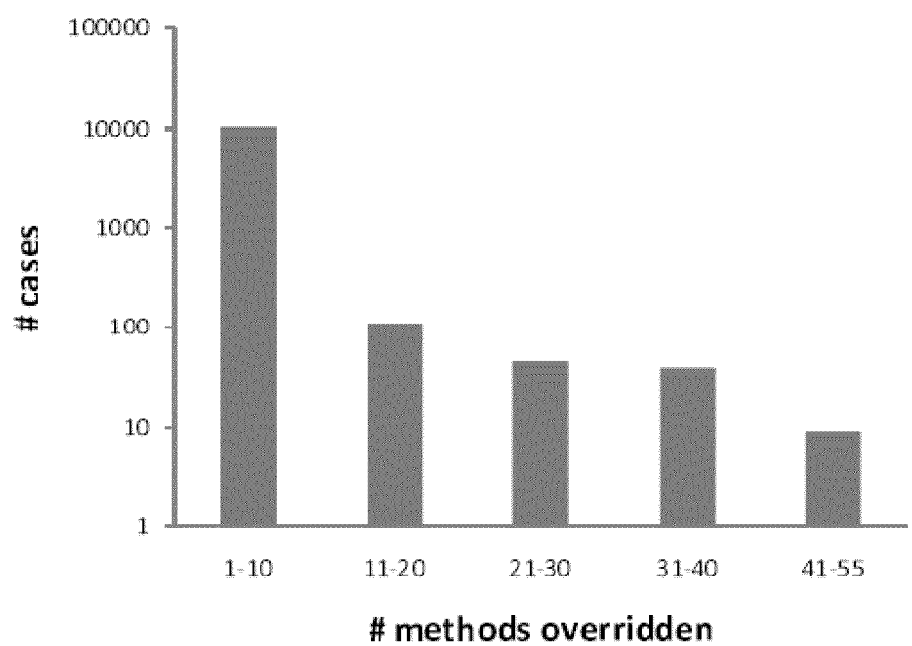

Method overriding facilitates polymorphism and this result shows that this overriding feature is used by programmers, but not actively. FIG. 34 illustrates a histogram 3400 of the distribution of method overriding cases by the number of overridden methods using the logarithmic scale. The horizontal axis shows the ranges of numbers of overridden methods for each bar, whose height shows the number of inheritance trees where the number of the overridden methods is present.

Figure 35:
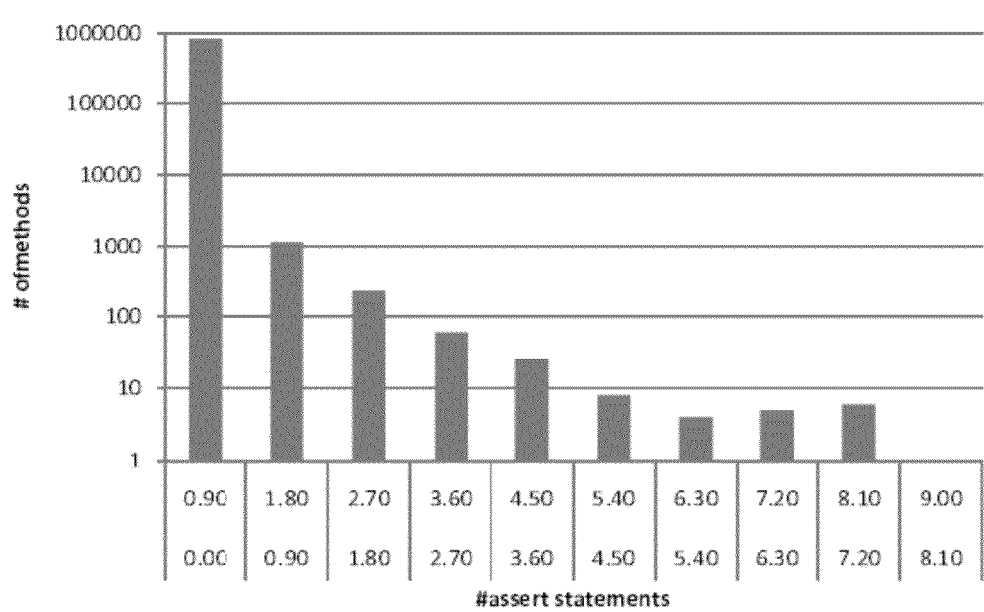

There are 2047 assert statements into Java applications. On average, one assert statement exists per 400 methods (median zero). FIG. 35 illustrates a histogram 3500 of the distribution of assert statements by the number of applications using a logarithmic scale.

The system found 938779 methods that are defined in 270973 Java classes. On average, 3.5 methods exist per class (median equal to four) with the range from 1 to 1175 methods per class.

Figure 36:
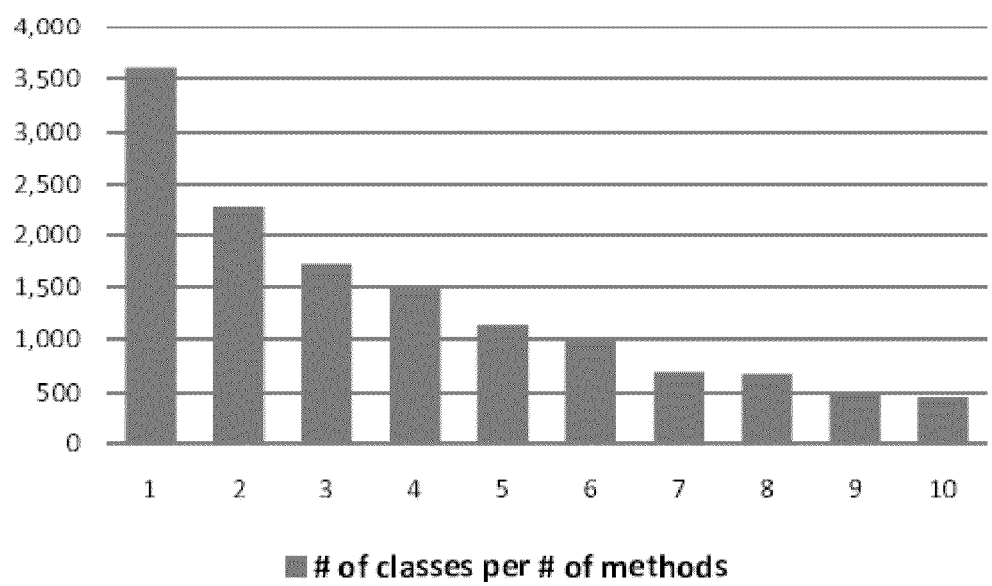
Figure 37:
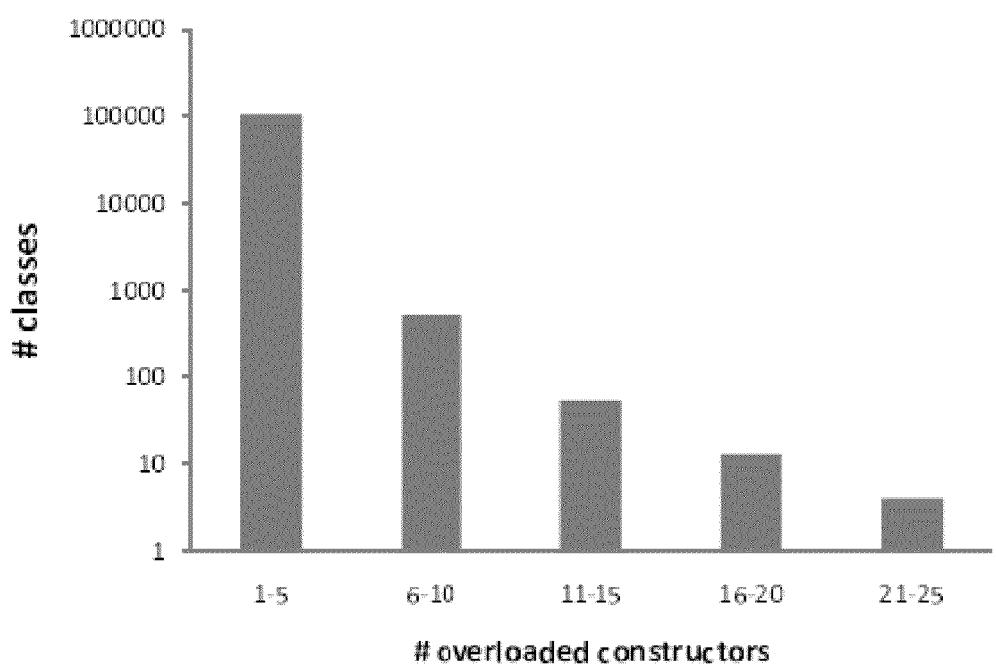

FIG. 36 illustrates a histogram 3600 of the distribution of methods per class. There are 145124 classes that do not define constructors, which is over 53% of the total number of classes. Almost 40% of classes have overloaded constructors. FIG. 37 illustrates a histogram 3700 of the distribution of the classes by the number of overloaded constructors using a logarithmic scale.

Figure 38:
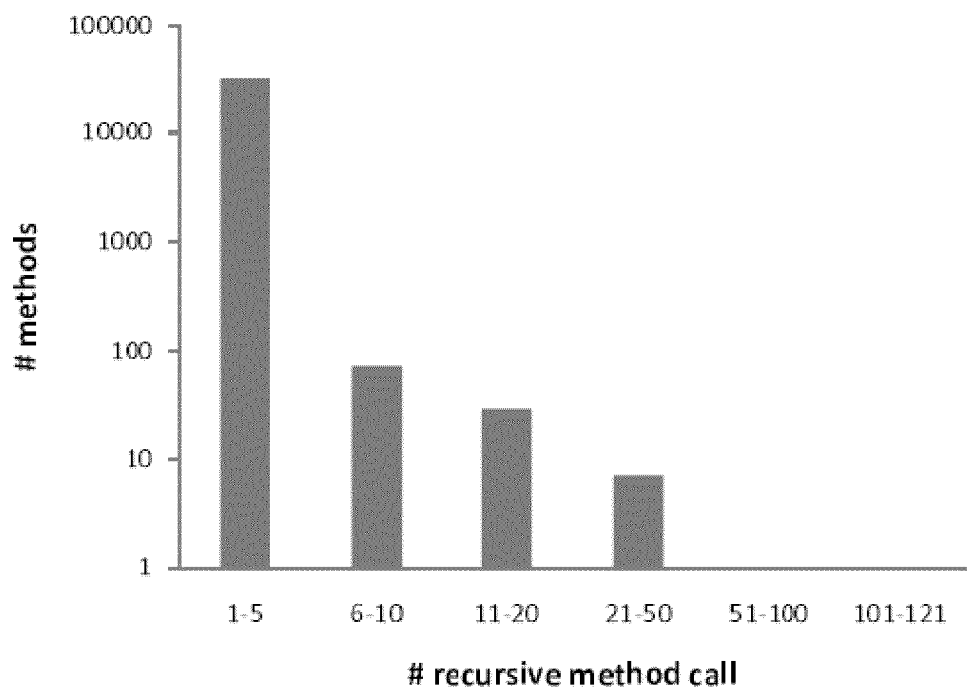

In Java, programmers can call methods recursively, and the system found 35846 occurrences of recursive method calls (the system did not count indirect recursive calls that may result in cycles in the call graph) in the definitions of 938779 methods (less than 4%). On average, one recursive call exists per 23 methods, median is zero. FIG. 38 illustrates a histogram 3800 of the distribution of the recursive method calls by the number of methods using a logarithmic scale.

Figure 39:
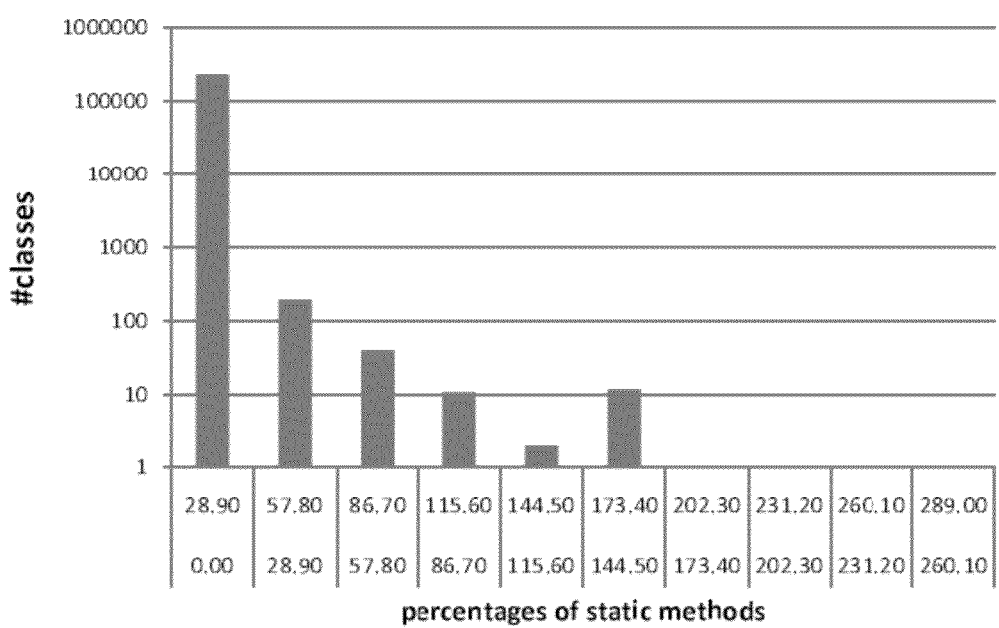

Close to 25% of methods are static (excluding the method main). On average, 0.85 static methods exist per class (median equal to zero) with the range from 1 to 289 static methods per class. FIG. 39 illustrates a histogram 3900 of the distribution of static methods per class.

Figure 40:
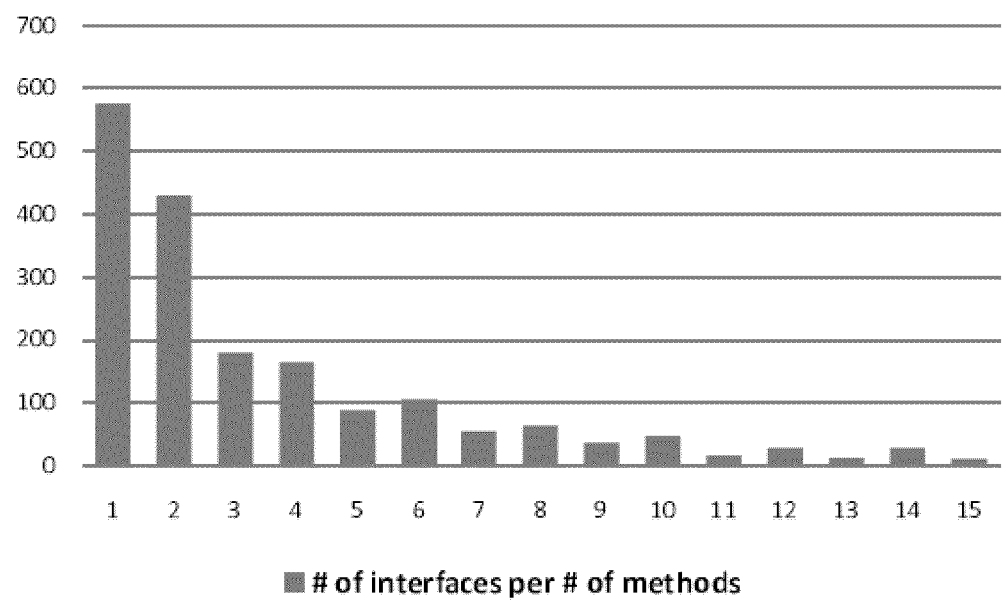

The system found 84130 methods that are declared in 24875 Java interfaces. On average, 3.4 methods exist per interface (median equal to three) with the range from 1 to 558 methods per interface. FIG. 40 illustrates a histogram 4000 of the distribution of methods per interface.

Figure 41:
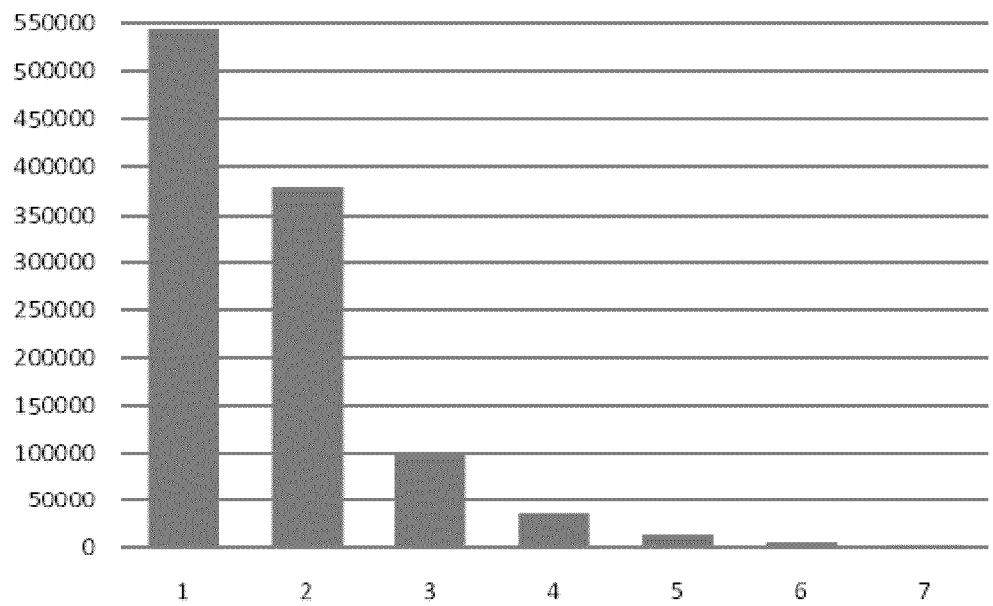

The arity of a method is the number of arguments that the method takes. We found that over 42% of methods do not take any arguments, that is their arity is zero. The remaining 544324 methods take from one to the maximum of 30 arguments, with the average of 1.5 arguments per method (median is equal to one). FIG. 41 illustrates a histogram 4100 of the distribution of arities of methods.

Methods that do not return values (i.e., return type void) constitute over 44% of all methods. On average, classes that contain methods that do not return values have 5.1 methods versus 5.8 methods that return values of some type. A total of 91423 methods take no arguments and do not return any values.

A total of 24744 methods or less than 3% return arrays. Counting only classes that contain these methods, the system found that there are two methods per class on average (median is one) with maximum of 137 methods per class.

The keyword this is used in 840937 methods and constructors in 3979285 invocations of methods (i.e., this.methodname( . . . )). That is, the keyword this is used in almost 90% of methods.

Counting only methods that contain this, the system found that there are 2.2 uses of this per method on average with the maximum of 785 uses per method.

Figure 42:
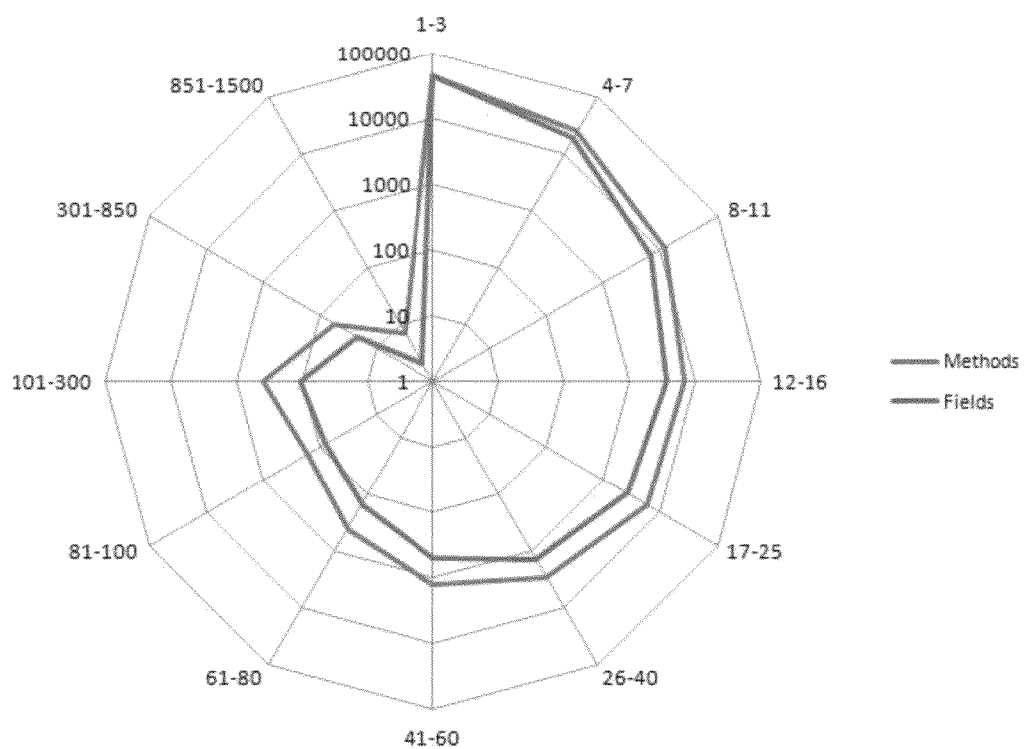

FIG. 42 illustrates a graph 4200 for correlating the number of methods with the number of fields in classes. The correlation coefficient is equal to 0.99, which suggests that the number of fields in a class is strongly correlated with the number of methods in the same class. This result may have different implications for the tasks of maintenance and evolution of applications, for example, to predict different metrics by knowing how many fields a class holds.

Figure 43:
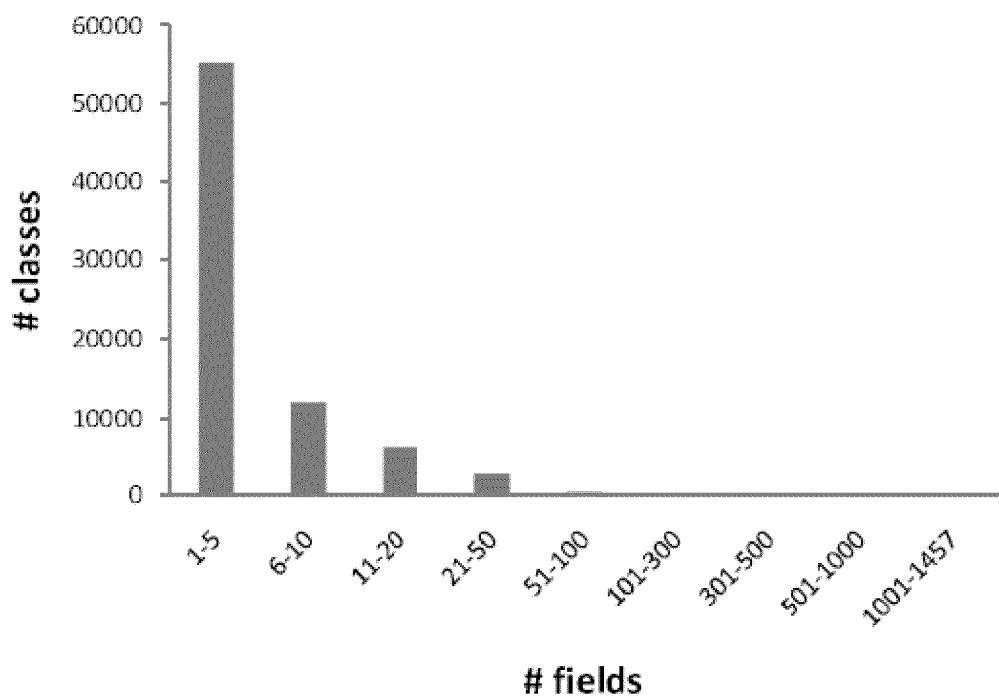

The system collected information about 448898 fields that are declared in 270973 Java classes. On average, a Java class contains close to two fields (median zero) with the range from zero to 1457 fields. FIG. 43 illustrates a histogram 4300 of the distribution of fields per class.

Figure 44:
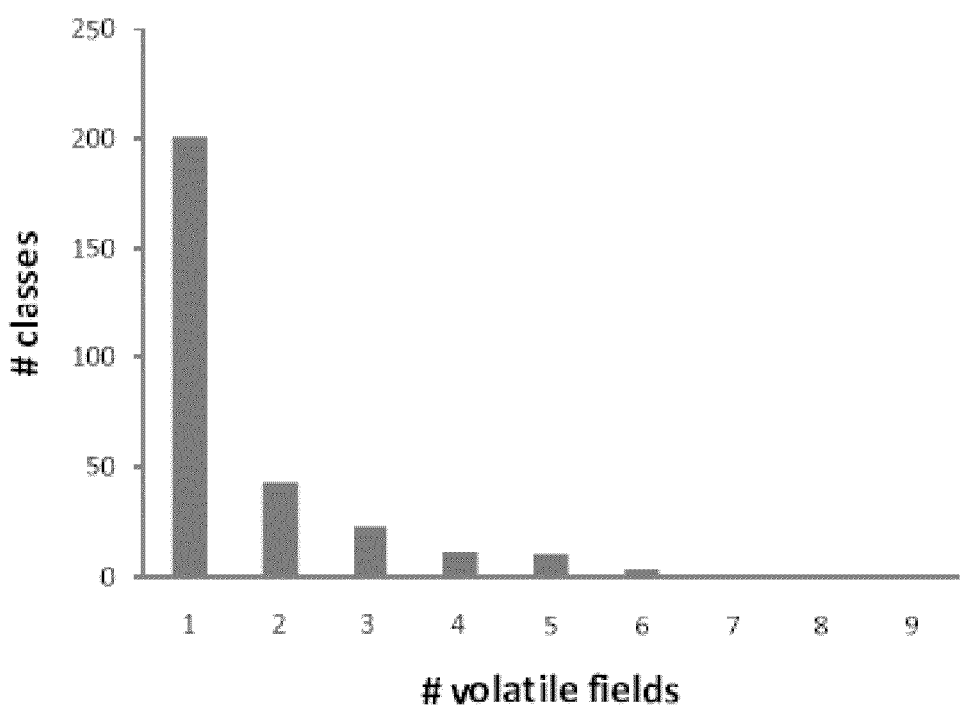

In Java, threads can access shared variables and keep private working copies of the variables to achieve a more efficient implementation of multiple threads. Java offers a mechanism to programmers, called volatile fields to ensure that working copies of variables should be reconciled with the master copies in the shared main memory when objects are locked or unlocked. The system found a total of 492 volatile fields out of a total of 448898 fields. On average, one in 500 Java classes contains volatile fields (median zero) with the range from zero to nine volatile fields. FIG. 44 illustrates a histogram 4400 of the distribution of volatile fields per class.

Figure 45:
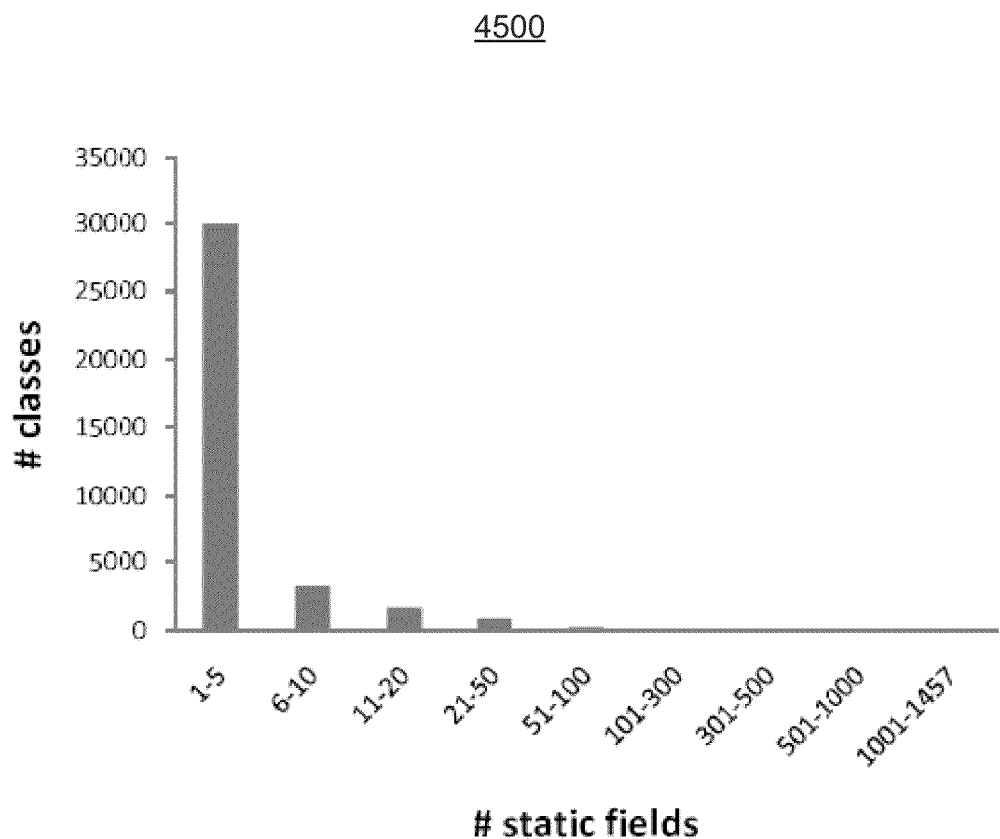

Transient fields are not saved as part of the persistent states of Java objects. The system detected a total of 2305 transient fields. FIG. 45 illustrates a histogram 4500 of the distribution of transient fields per class.

Figure 46:
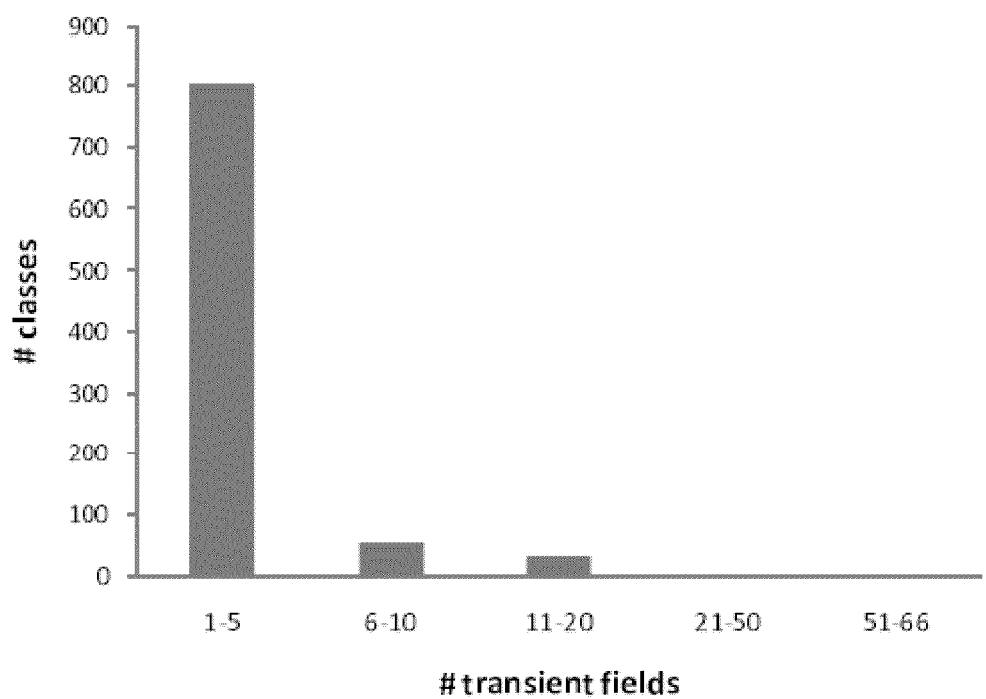

Out of 448898 fields, 154067 or 34% are declared static. On average, a Java class contains close to 0.7 static fields (median zero) with the range from zero to 1457 fields. FIG. 46 illustrates a histogram 4600 of the distribution of static fields per class.

Assignments of null to static fields signal garbage collector that objects that used to be assigned to fields can be collected from memory. Knowing how often programmers assign null to static fields can serve as a rule-of-thumb for researchers to develop tools and techniques that use this heuristic to improve memory management. The system found a total of 831 assignments of null to static fields, out of a total of 29907 assignments to static fields. In less than 2.8% of these assignments programmers used the value null.

Out of 448898 fields, 231647 or almost 52% have the type String. Approximately one in three classes has between one to 432 fields of the type String, making it one of the most popular types.

Figure 47:
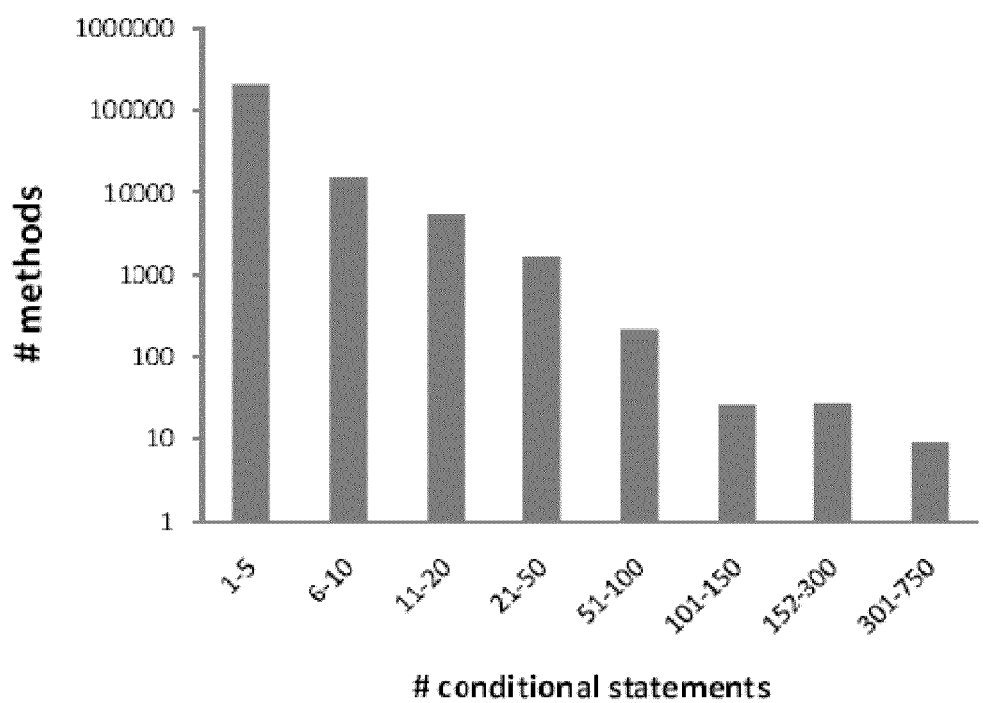

The system found 620419 conditional statements (e.g., if-else, switch, for, while, do-while) that are used in 938779 methods, out of which 397605 methods or approximately 64% do not have any conditional statements. Approximately 42% of the switch statements do not contain the default path. On average, approximately 0.8 statements exist per method (median equal to zero) with the range from 0 to 750 statements per method. FIG. 47 illustrates a histogram 4700 of the distribution of these statements per method.

Figure 48:
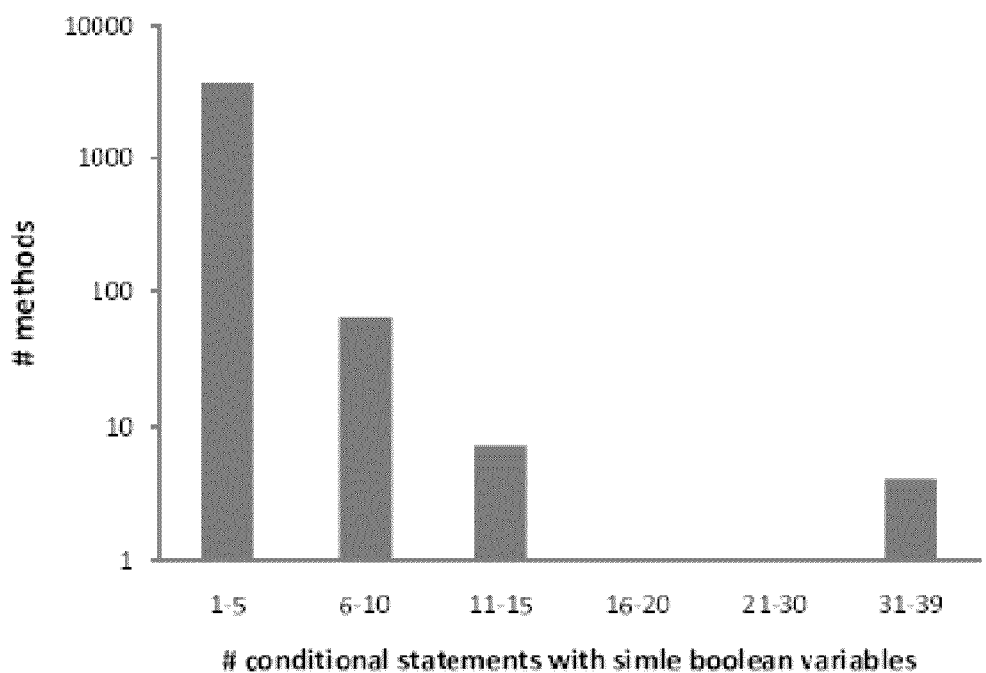

Out of 620419 conditional statements, only 4956 (less than 1%) use simple Boolean variables as their conditions. That is, most statements use expressions, and thus analyzing code to determine execution paths requires sophisticated reasoning. FIG. 48 illustrates a histogram 4800 of the distribution of these statements per method.

Figure 49:
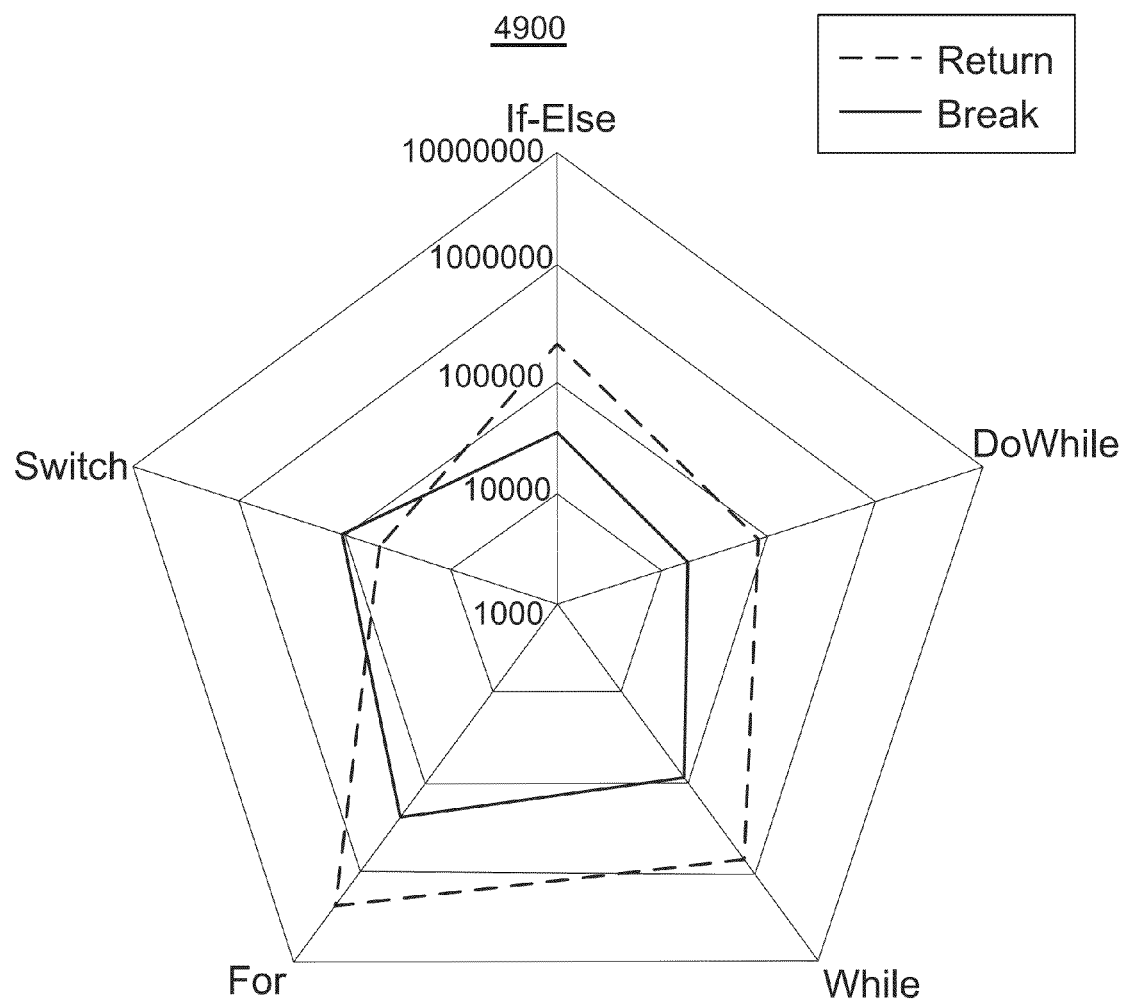

FIG. 49 illustrates a graph 4900 for usages of the keyword return versus break within conditional statements. The keyword return is most popular with for statements—the system counted 2333777 occurrences and the least popular with the switch statements—only 46044 occurrences.

Conversely, the keyword break is most popular with for statements—the system counted 245502 occurrences (the statement switch comes next with 102454 occurrences) and the least popular with the do-while statements—only 16975 occurrences. In general, the keyword return is used much more often than break for all types of conditional statements except for switch, where break is used more than twice as often.

Figure 50:
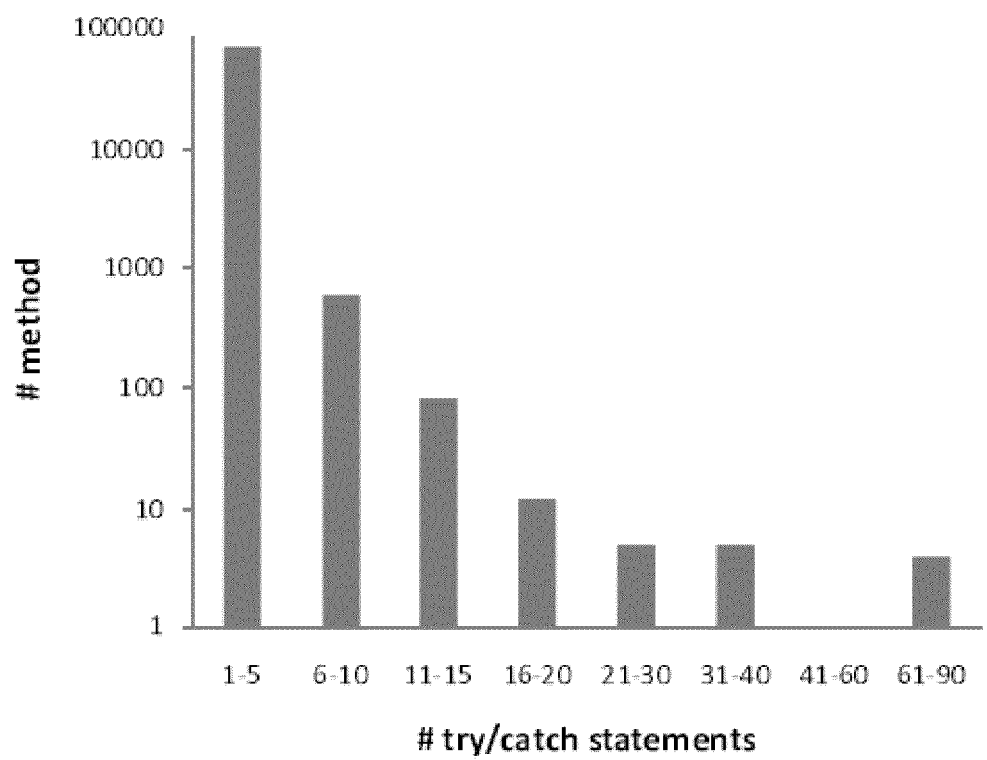

The system found 93714 try/catch statements, on average one statement per ten methods (median equal to zero) with the range from 0 to 90 statements per method. The block finally is used in 6.8% cases after try/catch statements. FIG. 50 illustrates a histogram 5000 of the distribution of these statements per method.

The system found 19181 exceptions that are thrown using the keyword throw.

Figure 51:
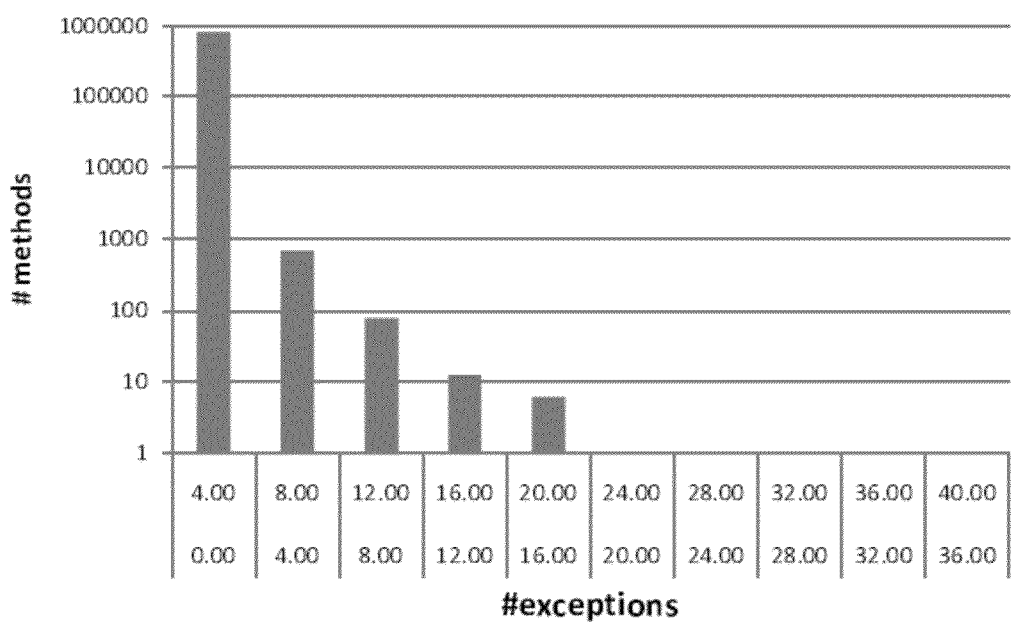
Figure 52:
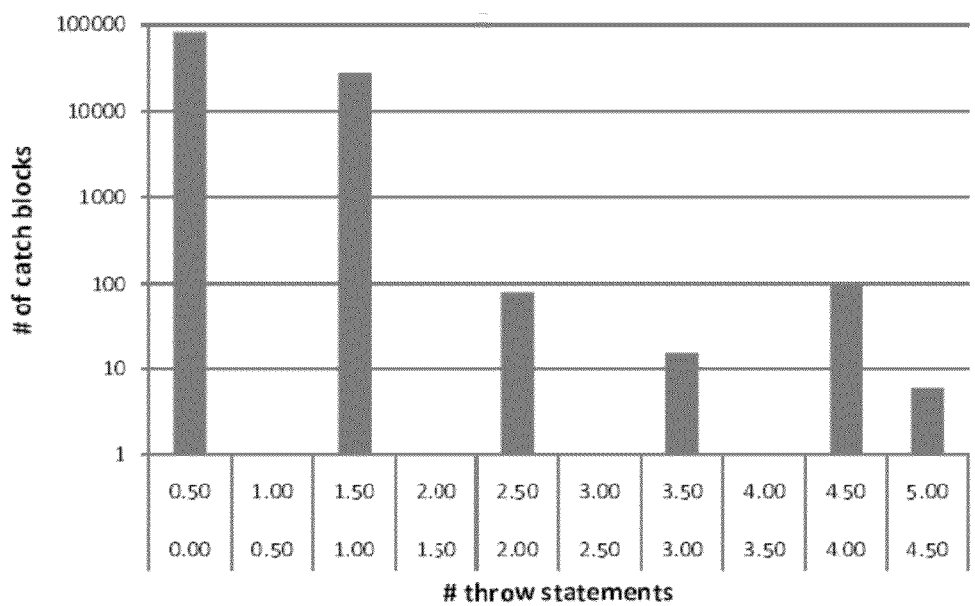

Considering only methods that throw exceptions, on average, close to one method throws an exception (median equal to zero) with the range from 0 to 40 exceptions thrown per method. FIG. 51 illustrates a histogram 5100 of the distribution of exceptions per method. Exception propagation is a standard technique for throwing exceptions from catch blocks to propagate these exceptions to desired points at execution where they will be handled. The system found 110740 propagated exceptions. Approximately 14% of exceptions are propagated with 0.26 propagated exceptions per catch block on average (median equal to zero) with the range from 0 to 5 exceptions thrown per catch block. FIG. 52 illustrates a histogram 5200 of the distribution of propagations per catch block.

Figure 53:
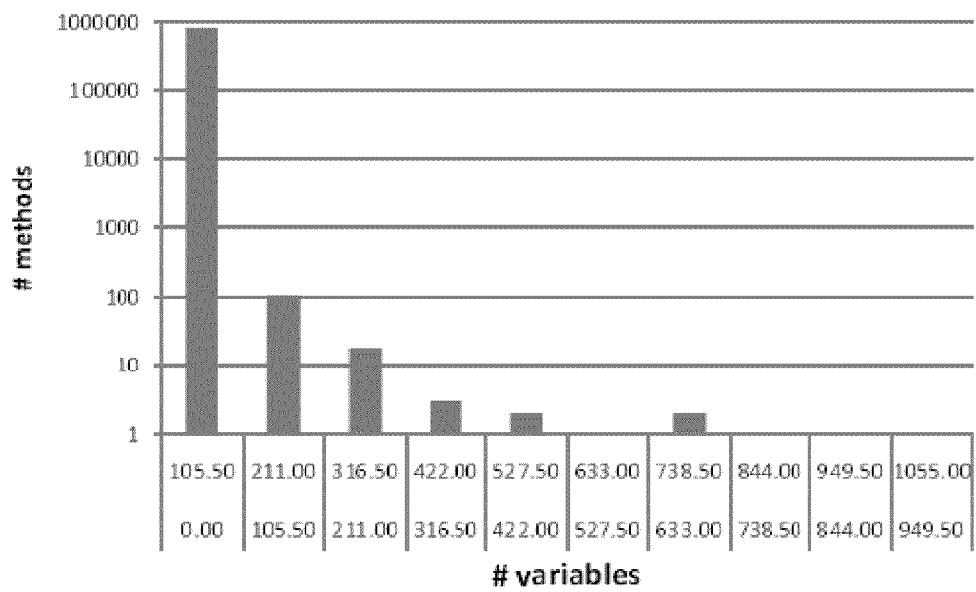

The system collected information about 5775367 local variables that are declared in method scopes. On average, a method contains close to three local variables (median zero) with the range from zero to 1055 variables. Out of these variables, approximately 10% are declared final. FIG. 53 illustrates a histogram 5300 of the distribution of variables per method using a logarithmic scale.

Figure 54:
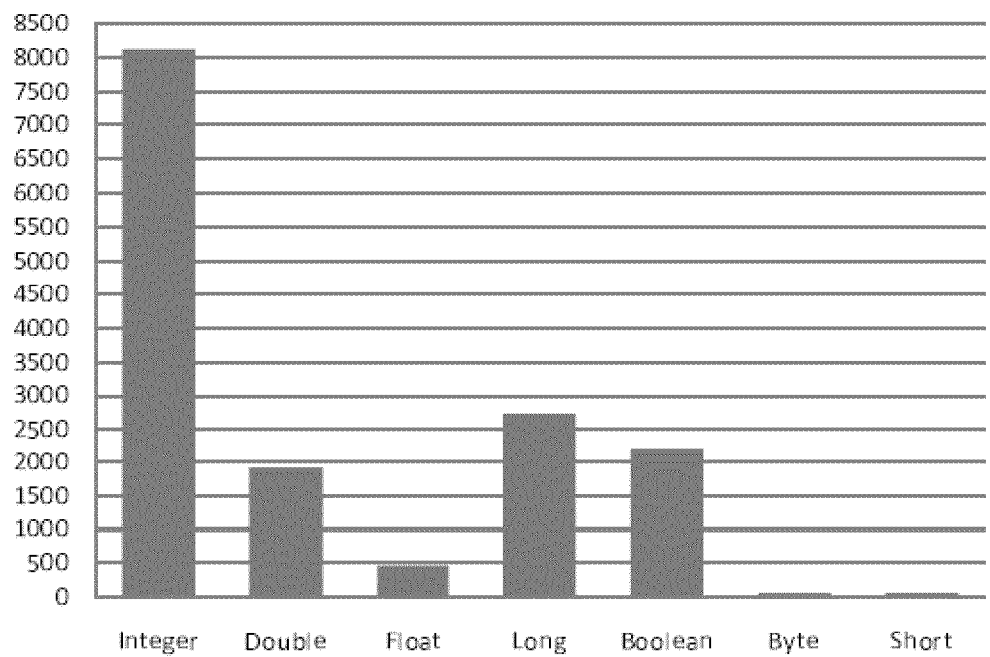
Figure 55:
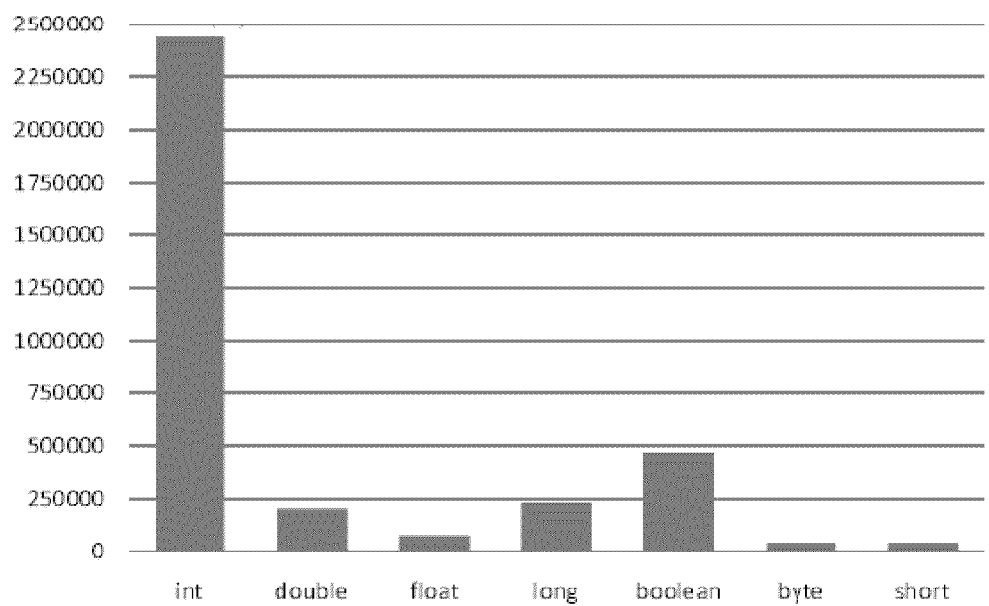

Analyzing the use of basic types versus classes that represent these types, the system found that programmers prefer to use basic types (e.g., int, Boolean) to their corresponding class-based types (e.g., Integer, Boolean). The difference is close to two orders of magnitude in favor of basic types. The most used basic type is int followed by Boolean followed by long followed by double, float, byte, and short in this order. The order for class-based types is a bit different—Long and Boolean switch their respective positions. FIGS. 54 and 55 illustrate histograms 5400 and 5500 of the distribution of class and basic types, respectively.

In evaluating use of increment++ and decrement -- operators, the system found 25523 uses of the increment operator versus only 2005 uses of decrements. That is, the number of increments is greater by more than one order of magnitude than the number of decrements.

Above, an example system that stores Java source code in a relational database has been described, and results of some operations performed by the system have been presented. In order to accomplish these tasks, three components were developed: the Multithreaded Crawler, the Java Parser and the Java Language Structure Database. The system provides an infrastructure for researchers to perform empirical research in source code artifacts, and to produce answers to research questions. The information obtained may be used to help companies that produce software to improve the quality of their products and to reduce their financial losses due to bugs and long testing phases.

For example, a company may have a desire to locate one or more applications that each has particular source code attributes. In this example, the one or more applications that each has the particular source code attributes may be desired to use as test applications for a new application being developed that tests or evaluates other software applications. To locate the one or more applications that each has the particular source code attributes, the system may receive a query to identify applications having one or more specific source code attributes and search the attributes in the database based on the query. The system may identify one or more applications that have the one or more specific source code attributes based on searching the attributes in the database and output a result based on the identified one or more applications that have the one or more specific source code attributes. In this manner, the company may quickly locate applications that have specific source code attributes, even though information about source code attributes is not readily available from typical metadata without actual inspection of source code. The query may search for any combination of language constructs and source code statistics (or other attributes) described throughout this disclosure.

In some implementations, as discussed above, the system may query the database to collect information about the attributes of the applications, generate statistics descriptive of source code attributes of the applications based on the collected information, and output the generated statistics. The system may use the generated statistics to assess quality of an application being developed or being considered for usage. For instance, the system may compare the generated statistics to attributes of a new application being developed or being considered for usage (e.g., purchase) and, based on the comparison, determine whether the new application being developed or being considered for usage has attributes that are similar to those of typical software applications. When the system detects that the new application being developed or being considered for usage has attributes that fall outside of norms for typical applications, the system may flag the new application being developed or being considered for usage as potentially having quality issues.

The computer system also may use the generated statistics to assess whether source code attributes of a computer-generated benchmark application fall within norms of source code attributes of applications developed by human programmers. For example, the system may compare the generated statistics to attributes of a computer-generated benchmark application (e.g., a random benchmark program) and, based on the comparison, determine whether the computer-generated benchmark application has attributes that are similar to those of typical software applications. When the system detects that the computer-generated benchmark application has attributes that fall outside of norms for typical applications, the system may flag the computer-generated benchmark application as being unrealistic and unacceptable for use as a benchmark program.

In some implementations, the system may access performance metrics for the applications and correlate the generated statistics with the accessed performance metrics. In these implementations, the performance metrics may include rankings, usage statistics (e.g., download frequency), measured performance analysis in terms of speed, reliability, etc., or any other metric that suggests whether a software application is of relatively high or relatively poor quality. From the correlation, the system may determine a set of source code attributes that are common for applications having relatively high performance based on the correlation of the generated statistics with the accessed performance metrics and use the set of source code attributes to assess quality of an application being developed or being considered for usage. For instance, the system may compare the set of source code attributes that are common for applications having relatively high performance to attributes of a new application being developed or being considered for usage (e.g., purchase) and, based on the comparison, determine whether the new application being developed or being considered for usage has attributes that are similar to those of the set of source code attributes that are common for applications having relatively high performance. When the system detects that the new application being developed or being considered for usage has attributes that are not similar to the set of source code attributes that are common for applications having relatively high performance (and/or that are similar to a set of source code attributes that are common for applications having relatively poor performance), the system may flag the new application being developed or being considered for usage as potentially having quality issues. When the system detects that the new application being developed or being considered for usage has attributes that are similar to the set of source code attributes that are common for applications having relatively high performance, the system may rate the new application being developed or being considered for usage as likely having relatively high quality. Any measures of quality may be correlated to the generated statistics and multiple correlations may be performed for different types of quality measures. In this regard, a company may choose a measure of quality deemed important and assess quality of an application for that quality measure using the appropriate correlation of the generated statistics to that measure.

In addition, the system may query the database to collect information about source code attributes of multiple versions of each of one or more applications and analyze the collected information to determine how the source code attributes of the multiple versions of each of the one or more applications evolved over time. Based on the determination of how the source code attributes of the multiple versions of each of the one or more applications evolved over time, the system may identify source code attributes of the multiple versions of each of the one or more applications that changed over time and use the identified source code attributes to assess quality of an application being developed or being considered for usage. For instance, the system may determine how source code attributes of software applications typically evolve over time (or how source code attributes of a particular type of software application evolve over time) and determine whether the application being developed or being considered for usage has attributes that are similar to earlier versions or later versions of software applications. When the system determines that the application being developed or being considered for usage has attributes that are similar to earlier versions (or that the application being developed or being considered for usage has attributes that typically change over time), the system may flag the application being developed or being considered for usage as having potential quality issues that likely will need to be improved over time. In this regard, the system may assist in speeding up the development of a software application and help a programmer reach a more complete and final product more quickly.

Further, the system may update the database with data from new applications or new versions of existing applications. For example, the system may identify new applications and new versions of existing applications in one or more repositories and programmatically analyze source code included in the new applications and new versions of existing applications. In this example, the system may derive attributes of the new applications and new versions of existing applications based on the analysis of the source code included in the new applications and new versions of existing applications and store, in the database, the derived attributes of the new applications and new versions of existing applications with identification data that identifies the new applications and new versions of existing applications. In this regard, the system may continue to update the database with new data without having to reanalyze existing data that already exists in the database from past processing. Accordingly, the system may keep current statistics of programming norms, and track evolution of software development for particular software applications and software applications in general.

Figure 56:
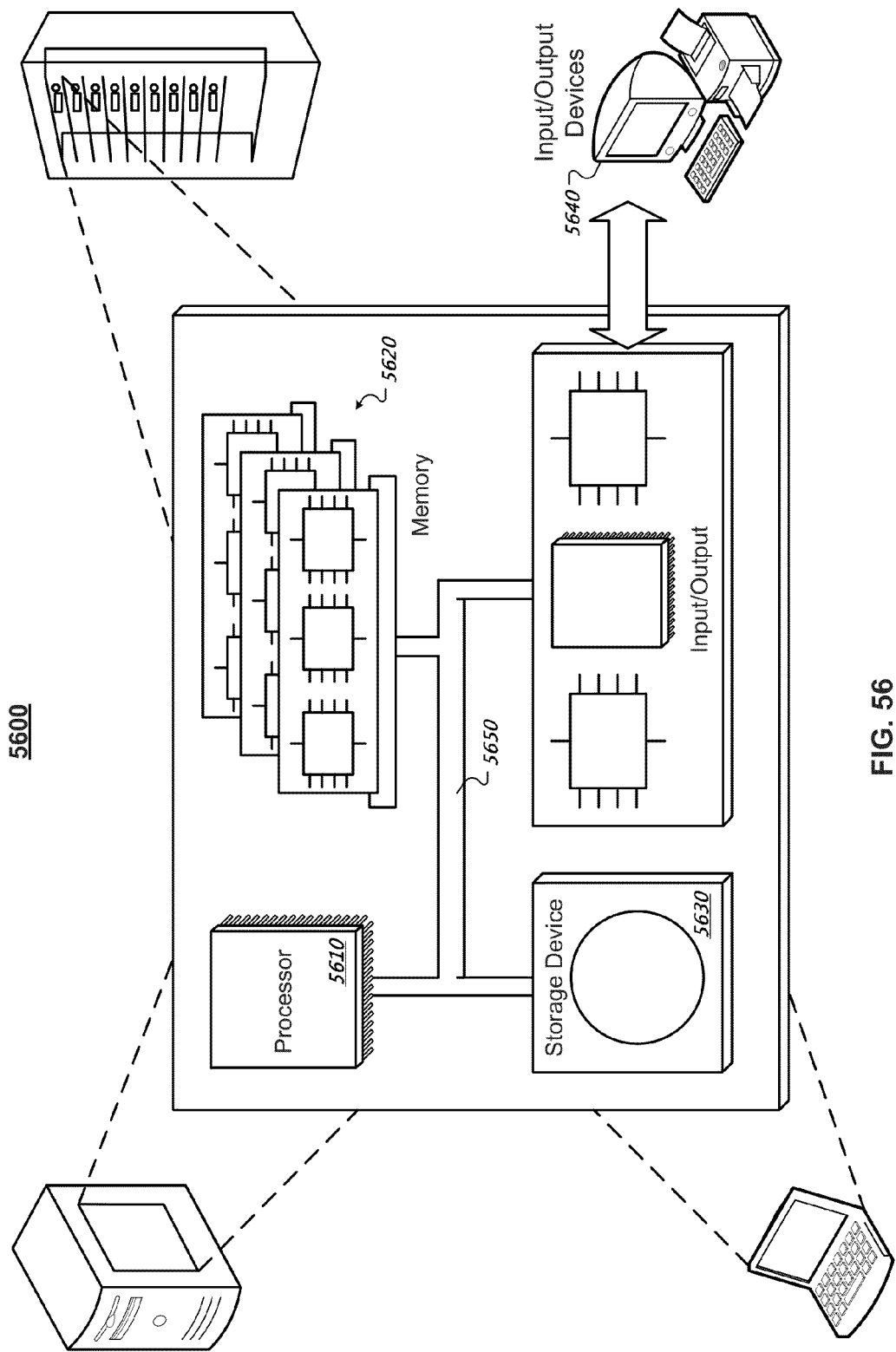

FIG. 56 is a schematic diagram of an example of a generic computer system 5600. The system 5600 may be part of the system 100 and used to implement techniques and processes described throughout this disclosure. The system 5600 includes a processor 5610, a memory 5620, a storage device 5630, and an input/output device 5640. Each of the components 5610, 5620, 5630, and 5640 are interconnected using a system bus 5650. The processor 5610 is capable of processing instructions for execution within the system 5600. In one implementation, the processor 5610 is a single-threaded processor. In another implementation, the processor 5610 is a multi-threaded processor. The processor 5610 is capable of processing instructions stored in the memory 5620 or on the storage device 5630 to display graphical information for a user interface on the input/output device 5640.

The memory 5620 stores information within the system 5600. In one implementation, the memory 5620 is a computer-readable medium. In another implementation, the memory 5620 is a volatile memory unit. In yet another implementation, the memory 5620 is a non-volatile memory unit.

The storage device 5630 is capable of providing mass storage for the system 5600. In one implementation, the storage device 5630 is a computer-readable medium. In various different implementations, the storage device 5630 may be a floppy disk device, a hard disk device, an optical disk device, or a tape device.

The input/output device 5640 provides input/output operations for the system 5600. In one implementation, the input/output device 5640 includes a keyboard and/or pointing device. In another implementation, the input/output device 5640 includes a display unit for displaying graphical user interfaces.

The features described can be implemented in digital electronic circuitry, or in computer hardware, or in combinations of computer hardware and firmware or software. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the disclosure.

What is claimed is:

1. A system comprising:
   a database configured to store attributes of applications that are descriptive of source code for the applications, the attributes having been determined through analysis of the source code retrieved from one or more repositories in which the source code is stored, wherein the attributes include a number of recursive method calls for each application, the number of recursive method calls having been derived through programmatic analysis of the source code included in the applications; and a computer system configured to handle queries for information about the applications and provide output based on handling of queries for information about the applications by:
  querying the database to collect information about the attributes of a subset of the applications;
  determining first constructs used in the source code of the subset of the applications using the collected information;
  generating statistics of the subset of the applications based on the determined first constructs including generating statistics descriptive of recursive method calls used in the subset of the applications; and
  providing the generated statistics for presentation on a display.

2. The system of claim 1, wherein the computer system is configured to:
  query the database multiple times with the same query to collect information about the attributes of multiple versions of some applications in the subset of the applications;
  determine statistics of each of the multiple versions of the some of the applications using the collected information; and
  maintain current statistics of programming standards and tracking evolution of software development for particular software applications using the statistics.

3. The system of claim 1, wherein the computer system is configured to handle queries for information about the applications and provide output based on the handling of queries for information about the applications by:
  receiving a query to identify applications having one or more specific constructs;
  searching the one or more specific constructs in the database using the query;
  identifying one or more applications that have the one or more specific constructs based on searching the one or more specific constructs in the database; and
  outputting a result based on the identified one or more applications that have the one or more specific constructs.

4. The system of claim 1, wherein the computer system is configured to handle queries for information about the applications and provide output based on the handling of queries for information about the applications by:
  querying the database to collect information about second constructs of multiple versions of each of one or more applications;
  analyzing the collected information to determine how the second constructs of the multiple versions of each of the one or more applications evolved over time;
  based on the determination of how the second constructs of the multiple versions of each of the one or more applications evolved over time, identifying third constructs of the multiple versions of each of the one or more applications that changed over time; and
  using the identified third constructs to assess quality of an application being developed or being considered for usage.

5. The system of claim 1, wherein the computer system is configured to use the generated statistics to assess quality of an application being developed or being considered for usage.

6. The system of claim 1, wherein the computer system is configured to:
  access performance metrics for the applications;
  correlate the generated statistics with the accessed performance metrics;
  determine a set of second constructs that are common for applications having relatively high performance based on the correlation of the generated statistics with the accessed performance metrics; and
  use the set of determined second constructs to assess quality of an application being developed or being considered for usage.

7. The system of claim 1, wherein the computer system is configured to update the database by:
  identifying new applications and new versions of existing applications in the one or more repositories;
  programmatically analyzing source code included in the new applications and new versions of existing applications;
  deriving attributes of the new applications and new versions of existing applications based on the analysis of the source code included in the new applications and new versions of existing applications; and
  storing, in the database, the derived attributes of the new applications and new versions of existing applications.

8. The system of claim 1, wherein the computer system is configured to mine the attributes of the applications from the one or more repositories in which the applications are stored by programmatically analyzing the source code included in the applications and deriving the attributes based on the analysis of the source code included in the applications.

9. The system of claim 8, wherein programmatically analyzing the source code included in the applications and deriving the attributes based on the analysis of the source code included in the applications comprises:
  using a crawler to detect source code files stored in the one or more repositories, the source code files for at least some of the applications;
  parsing syntax data from the source code files detected by the crawler; and
  storing, in the database, a representation of the syntax data parsed from the source code files detected by the crawler.

10. The system of claim 9:
  wherein parsing syntax data from the source code files detected by the crawler comprises constructing a syntax tree for each of the source code files detected by the crawler; and
  wherein storing the representation of the syntax data parsed from the source code files detected by the crawler comprises storing, in the database, information describing nodes of the syntax tree constructed for each of the source code files detected by the crawler.

11. The system of claim 9, wherein using the crawler to detect source code files for applications stored in the one or more repositories comprises:
  using the crawler to browse a project directory from the one or more repositories;
  detecting a project file in the project directory based on browsing of the project directory by the crawler;
  based on detecting the project file, using the crawler to search for source code files associated with the project file;
  detecting a source code file associated with the project file based on using the crawler to search for source code files associated with the project file; and
  parsing, using a parser, syntax data from the source code files detected by the crawler based on detecting the source code file associated with the project file.

12. The system of claim 11, wherein using the crawler to detect source code files for applications stored in the one or more repositories comprises storing, in the database, attributes related to creation of the source code file based on detecting the source code file associated with the project file.

13. The system of claim 12, wherein using the crawler to detect source code files for applications stored in the one or more repositories comprises:
- determining whether source code files associated with the project file remain unanalyzed; and
- continuing to use the crawler to search for source code files associated with the project file based on a determination that source code files associated with the project file remain unanalyzed.

14. The system of claim 13, wherein using the crawler to detect source code files for applications stored in the one or more repositories comprises:
- determining whether unanalyzed projects remain in the project directory based on a determination that all source code files associated with the project file have been analyzed;
- continuing to use the crawler to browse the project directory based on a determination that unanalyzed projects remain in the project directory; and
- ending mining of the project directory based on a determination that unanalyzed projects do not remain in the project directory.

15. The system of claim 1, wherein the database is configured to store the applications and identification data that references a location of the applications stored in the database and associates each of the stored attributes with the corresponding application.

16. The system of claim 1, wherein the attributes include an inheritance hierarchy for each application, the inheritance hierarchy having been derived through programmatic analysis of the source code included in the applications.

17. The system of claim 1, wherein determining first constructs used in the source code of the subset of the applications using the collected information comprises determining one or more of i) statements, ii) methods, iii) class declarations, iv) commands, or v) expressions used in the source code of the subset of the applications using the collected information.

18. A system comprising:
- a database configured to store attributes of applications that are descriptive of source code for the applications, the attributes having been determined through analysis of the source code retrieved from one or more repositories in which the source code is stored; and
- a computer system configured to handle queries for information about the applications and provide output based on handling of queries for information about the applications by:
  - querying the database to collect information about the attributes of a subset of the applications;
  - determining first constructs used in the source code of the subset of the applications using the collected information;
  - generating statistics of the subset of the applications based on the determined first constructs;
  - assessing whether constructs of a computer-generated benchmark application fall within norms of constructs of applications developed by human programmers using the generated statistics; and
  - providing the generated statistics for presentation on a display.

19. A method comprising:
- maintaining a database that stores attributes of applications that are descriptive of source code for the applications, the attributes having been determined through analysis of the source code retrieved from one or more repositories in which the source code is stored, wherein the attributes include a number of recursive method calls for each application, the number of recursive method calls having been derived through programmatic analysis of the source code included in the applications;
- handling, by a computer system, queries against the attributes of the applications stored in the database by:
  - querying the database to collect information about the attributes of a subset of the applications;
  - determining first constructs used in the source code of the subset of the applications using the collected information; and
  - generating statistics of the subset of the applications based on the determined first constructs including generating statistics descriptive of recursive method calls used in the subset of the applications; and
- providing the generated statistics for presentation on a display.

20. At least one computer-readable storage medium encoded with executable instructions that, when executed by at least one processor, cause the at least one processor to perform operations comprising:
- maintaining a database that stores attributes of applications that are descriptive of source code for the applications, the attributes having been determined through analysis of the source code retrieved from one or more repositories in which the source code is stored, wherein the attributes include a number of recursive method calls for each application, the number of recursive method calls having been derived through programmatic analysis of the source code included in the applications;
- handling queries against the attributes of the applications stored in the database by:
  - querying the database to collect information about the attributes of a subset of the applications;
  - determining first constructs used in the source code of the subset of the applications using the collected information; and
  - generating statistics of the subset of the applications based on the determined first constructs including generating statistics descriptive of recursive method calls used in the subset of the applications; and
- providing the generated statistics for presentation on a display.

* * * * *